(12) United States Patent
Wang et al.

(10) Patent No.: US 9,304,237 B1
(45) Date of Patent: Apr. 5, 2016

(54) TUNABLE BAND-PASS FILTER

(71) Applicant: Semrock, Inc., Rochester, NY (US)

(72) Inventors: Ligang Wang, Cupertino, CA (US);
Turan Erdogan, Spencerport, NY (US)

(73) Assignee: Semrock, Inc., Rochester, NY (US)

( * ) Notice: Subject to any disclaimer, the term of this patent is extended or adjusted under 35 U.S.C. 154(b) by 541 days.

(21) Appl. No.: 13/710,367

(22) Filed: Dec. 10, 2012

(51) Int. Cl.
*G02B 5/28* (2006.01)

(52) U.S. Cl.
CPC . *G02B 5/28* (2013.01); *G02B 5/285* (2013.01)

(58) Field of Classification Search
CPC .......... G02B 5/28; G02B 5/281; G02B 5/282; G02B 5/283; G02B 5/284; G02B 5/285; G02B 5/286; G02B 5/287; G02B 5/288; G02B 5/289
USPC ........... 359/485.03, 485.04, 489.07, 589, 590
See application file for complete search history.

(56) References Cited

U.S. PATENT DOCUMENTS

| | | | |
|---|---|---|---|
| 2,406,318 | A | 8/1946 | Brace |
| 2,670,400 | A | 2/1954 | Grunwald |
| 3,306,158 | A | 2/1967 | Makabe et al. |
| 3,390,604 | A | 7/1968 | Makabe |
| 3,492,478 | A | 1/1970 | Smith |
| 3,666,351 | A | 5/1972 | Pao |
| 3,759,604 | A | 9/1973 | Thelen |
| 3,861,788 | A | 1/1975 | Webster |
| 3,864,037 | A | 2/1975 | Johnson |
| 4,009,453 | A | 2/1977 | Mahlein |
| 4,082,464 | A | 4/1978 | Johnson, Jr. |
| 4,084,909 | A | 4/1978 | Mathisen |
| 4,141,653 | A | 2/1979 | Arnold |
| 4,176,916 | A | 12/1979 | Carpenter |
| 4,373,782 | A | 2/1983 | Thelen |
| 4,410,272 | A | 10/1983 | Beauvineau et al. |
| 4,461,532 | A | 7/1984 | Sato et al. |
| 4,684,255 | A | 8/1987 | Ford |
| 4,733,926 | A | 3/1988 | Title |
| 4,738,535 | A | 4/1988 | Webster |
| 4,772,798 | A | 9/1988 | Craig |

(Continued)

FOREIGN PATENT DOCUMENTS

| | | |
|---|---|---|
| DE | 20 2008 016 287 U1 | 4/2009 |
| EP | 1 130 432 A2 | 9/2001 |

(Continued)

OTHER PUBLICATIONS

A. Thelen, "Nonpolarizing edge filters," J. Opt. Soc. Am., vol. 71, pp. 309-314 (Mar. 1981)(6 pages).

(Continued)

*Primary Examiner* — Frank Font
(74) *Attorney, Agent, or Firm* — Finnegan, Henderson, Farabow, Garrett & Dunner, LLP

(57) ABSTRACT

Optical filters and methods of making optical filters are provided. The optical filter can include a first and second stack of layers. The first stack of layers can be configured to provide a cut-on edge for s-polarized radiation incident at a second wavelength value and a cut-off edge for s-polarized radiation incident at a third wavelength value. The second stack of layers can be configured to provide a cut-off edge for s-polarized radiation incident on the second stack of layers at a fourth wavelength value. Further, the fourth wavelength value can lie between the second wavelength value and the third wavelength value. Furthermore, a curve or line of full-width half-maximum (FWHM) values of the optical filter pass-band can define a first derivative with respect to angle-of-incidence values at at least one angle-of-incidence value that is substantially positive or substantially zero.

54 Claims, 27 Drawing Sheets

(56) References Cited

U.S. PATENT DOCUMENTS

| | | | |
|---|---|---|---|
| 4,775,234 | A | 10/1988 | Shimomura |
| 5,034,613 | A | 7/1991 | Denk et al. |
| 5,132,826 | A | 7/1992 | Johnson et al. |
| 5,149,578 | A | 9/1992 | Wheatley et al. |
| 5,221,957 | A | 6/1993 | Jannson et al. |
| 5,400,174 | A | 3/1995 | Pagis et al. |
| 5,410,431 | A * | 4/1995 | Southwell ................ 359/580 |
| 5,449,413 | A | 9/1995 | Beauchamp et al. |
| 5,481,402 | A | 1/1996 | Cheng et al. |
| 5,559,634 | A * | 9/1996 | Weber ..................... 359/638 |
| 5,591,981 | A | 1/1997 | Heffelfinger et al. |
| 5,767,965 | A | 6/1998 | Zhou et al. |
| 5,781,332 | A | 7/1998 | Ogata |
| 5,781,341 | A | 7/1998 | Lee |
| 5,796,512 | A | 8/1998 | Wachman et al. |
| 5,852,498 | A | 12/1998 | Youvan et al. |
| 5,926,317 | A | 7/1999 | Cushing |
| 5,953,169 | A | 9/1999 | Tsai |
| 6,075,599 | A | 6/2000 | Milman et al. |
| 6,110,337 | A | 8/2000 | Sullivan et al. |
| 6,115,180 | A | 9/2000 | Hirai et al. |
| 6,217,720 | B1 | 4/2001 | Sullivan et al. |
| 6,292,299 | B1 | 9/2001 | Liou |
| 6,344,653 | B1 | 2/2002 | Webb et al. |
| 6,362,904 | B1 | 3/2002 | Cormack |
| 6,611,378 | B1 | 8/2003 | Wang et al. |
| 6,700,690 | B1 | 3/2004 | Buchsbaum et al. |
| 6,781,757 | B2 | 8/2004 | Cormack |
| 6,785,052 | B2 | 8/2004 | Ockenfuss et al. |
| 6,798,553 | B1 * | 9/2004 | Scobey et al. ................ 359/260 |
| 6,809,859 | B2 | 10/2004 | Erdogan et al. |
| 6,879,619 | B1 | 4/2005 | Green et al. |
| 6,894,838 | B2 | 5/2005 | Mizrahi et al. |
| 6,933,001 | B2 | 8/2005 | Hiroyuki et al. |
| 6,943,938 | B1 | 9/2005 | Liu et al. |
| 7,050,224 | B2 | 5/2006 | Kawamata et al. |
| 7,068,430 | B1 | 6/2006 | Clarke et al. |
| 7,119,960 | B1 | 10/2006 | Erdogan et al. |
| 7,123,416 | B1 | 10/2006 | Erdogan et al. |
| 7,411,679 | B2 | 8/2008 | Erdogan et al. |
| 7,420,678 | B2 | 9/2008 | Lundgren et al. |
| 7,453,568 | B2 | 11/2008 | Kawamata et al. |
| 8,049,824 | B2 * | 11/2011 | Tan et al. ................ 349/9 |
| 8,059,327 | B1 | 11/2011 | Erdogan et al. |
| 8,441,710 | B2 | 5/2013 | Wang et al. |
| 2002/0054614 | A1 | 5/2002 | Jin |
| 2004/0240093 | A1 | 12/2004 | Yoshikawa et al. |
| 2005/0171630 | A1 | 8/2005 | Dinauer et al. |
| 2006/0007547 | A1 | 1/2006 | Kamikawa |
| 2006/0158991 | A1 | 7/2006 | Hatano et al. |
| 2006/0228089 | A1 | 10/2006 | Shimokozono et al. |
| 2007/0268568 | A1 | 11/2007 | Higashi et al. |
| 2008/0037129 | A1 | 2/2008 | Hodgson et al. |
| 2008/0055584 | A1 | 3/2008 | Pradhan et al. |
| 2008/0055716 | A1 | 3/2008 | Erdogan et al. |
| 2008/0055717 | A1 | 3/2008 | Pradhan et al. |
| 2011/0170164 | A1 | 7/2011 | Wang et al. |

FOREIGN PATENT DOCUMENTS

| | | |
|---|---|---|
| JP | S61-289305 A | 12/1986 |
| JP | S64-061717 A | 3/1989 |
| JP | 2000-292715 A | 10/2000 |
| JP | 2003-329841 A | 11/2003 |
| JP | 2004-252214 A | 9/2004 |
| JP | 2006-023602 A | 1/2006 |
| WO | WO 2004/061490 A1 | 7/2004 |
| WO | WO 2004/111717 A1 | 12/2004 |
| WO | WO 2006/080422 A1 | 8/2006 |

OTHER PUBLICATIONS

A. Thelen, "Nonpolarizing edge filters: Part 2," Appl. Optics, vol. 23, pp. 3541-3543 (Oct. 15, 1984) (3 pages).

P. Yeh, *Optical Waves in Layered Media* John Wiley & Sons, New York, 1988, pp. v-x, 144-165, and 254-297 (38 pages).

A. Thelen, *Design of Optical Interference Coating*, McGraw-Hill, New York, 1989, pp. v-viii, 177-196, and 250-251 (16 pages total).

R.-Y. Tsai, et al., "Comparative Study of Ultraviolet-Infrared Cutoff Filters Prepared by Reactive Electron-Beam Deposition and Reactive Ion-Assisted Deposition", Opt. Eng., May 1998, pp. 1475-1481 (7 pages).

T.R. Jensen, et al., "Environmentally Stable UV Raman Edge Filters", Society of Vacuum Coaters 43rd Annual Technical Conference Proceedings (2000) pp. 1-5 (5 pages).

H.A. Macleod, Thin-Film Optical Filters, Third Edition, Taylor & Francis, NY, 2001, pp. vii-xi, 20-37, 46-50, 210-392 (213 pages total).

B.E. Perilloux, "Thin-Film design", pp. i-xvi, 1-116 (SPIE Press, Bellingham Washington) (2002) (68 pages total).

M. Lequime, "Tunable thin-film filters: review and perspectives," Proc. SPIE vol. 5250, (*Advances in Optical Thin Films*, Ed. by C. Amra, N. Kaiser, H.A. McLeod) pp. 302-311 (2004) (10 pages).

P.W. Baumeister, *Optical Coating Technology*, SPIE Press, Bellingham WA, 2004, pp. v-xviii, "5-41"—"5-43", "7-76"—"7-77", "8-11"—"8-17", and "10-9"—"10-13" (33 pages total).

German Cancer Research Center Office of Technology Transfer, *Technology Offer* "Device for tuning of color beam splitters (P-382)," Apr. 2009 (2 pages).

Wang "Constrain of Coating Thickness on LaserMux," Semrock Memorandum (Jan. 9, 2007) and Attachment #1: Newport Tutorials entitled "Gaussian Beam Optics Tutorial" (Dec. 17, 2008) (6 pages total).

D.S. Kliger, *Polarized Light in Optics and Spectroscopy*, pp. v-vii, 27-58, and 237-274 (Academic Press, Inc. Boston, MA) (1990) (40 pages total).

T. Baur "A New Type of Beam Splitting Polarizer Cube" (Meadowlark Optics, Inc.) (2005) (9 pages total).

"Basic Polarization Techniques and Devices" (Meadowlark Optics, Inc.) (2005) (7 pages total).

H. Fabricius et al., "Optimizing the phase retardation caused by optical coatings," Advances in Optical Thin Films III, Ed. By N. Kaiser et al., Proc. of SPIE vol. 7101, (2008) pp. 71011I-1-71011I-12 (12 pages total).

H. Fabricius, "Synthesis andfunctioning of SMART coatings for application in compact instruments and sensors," DOPS-Nyt 1-2001, (2001) p. 28-38 (The Quarterly Journal of the Danish Optical Society) (11 pages total).

Software Spectra, *TFCalc Thin Film Design Software for Windows, Ver. 3.5* (1985-2002) (Portland, OR) (144 pages total).

K.V. Popov et al., "Broadband high-reflection multilayer coatings at oblique angles of incidence," Apr. 1, 1997, vol. 36, No. 10, Applied Optics, pp. 2139-2151 (1997) (13 pages total).

A.V. Tikhonravov, "Some theoretical aspects of thin-film optics and their applications," Oct. 1, 1993, vol. 32, No. 28, Applied Optics, pp. 5417-5426 (1993) (10 pages total).

G. Ockenfuss et al., "Ultra-low Stress coating process: an enabling technology for extreme performance thin film interference filters," Optical Society of America. OFC Postdeadline Papers, Paper FA8 (Mar. 2002) (14 pages total).

D. Derickson et al., "Advancements in thin film filters for telecommunications applications," Proceedings of SPIE vol. 5246, 595-607 (2003) (13 pages total).

G. Ockenfuss et al. "Ultra-low Stress Thin Film Interference Filters" (Optical Society of America, 2004) Paper ThE2 (3 pages total).

U.S. PTO Office Action for U.S. Appl. No. 12/684,871 with a mailing date of Jan. 8, 2010 (11 pages total).

International Search Report and Written Opinion mailed Mar. 10, 2011 for PCT/US2011/020438 (corresponding to U.S. Appl. No. 12/684,871) (10 pages total).

Office Action from Japanese Patent Office for Japanese Patent Appl. No. 2012-548130 (corresponding to U.S. Appl. No. 12/684,871) dated Feb. 4, 2014 and English language translation (7 pages total).

* cited by examiner

TUNABLE BAND-PASS FILTER

FIELD

This disclosure relates to materials, components, and methods directed to the fabrication and use of tunable band-pass filters.

BACKGROUND

Wavelength bands of light or other radiation can be isolated in a system. For example, a system with a detector can be configured such that a detector receives as input only a narrow range of wavelengths, while eliminating, as input to the detector, as much light at other wavelengths as possible, where such other light can be considered "noise." Optical components that isolate one or more bands of wavelengths are called "band-pass filters." The width of a pass-band for conventional near-UV, visible, and near-IR optical band-pass filters can range from less than 1 nm to a few nm (or less than about 1% of the center wavelength of the pass-band) for so-called "narrowband" filters to several tens of nm (about 1 to 10% of the center wavelength) for most band-pass filters—such as those used in fluorescence detection and imaging systems. The width of some band-pass filters can be several tens of percent of the center wavelength wide.

A thin-film interference filter conventionally referred to as a "narrow-band-pass" (i.e., NBP) filter can be constructed from a series of "quarter-wave" layers of material that alternate between a high-index-of-refraction material and a low-index-of-refraction material. A "quarter-wave" layer is a thin layer of material with an optical thickness that is equal to $\frac{1}{4} \lambda$ (or an odd-integer multiple of $\frac{1}{4} \lambda$), where $\lambda$ is the wavelength associated with a center of the transmission band. (The "optical thickness" of a layer of material with an index of refraction n and a geometrical thickness t is the product n×t.) A series of quarter-wave layers can create a "stop band" that is approximately centered about the wavelength $\lambda$ by which the quarter-wave layers are calibrated (where the "quarter-wave" layers can have an optical thickness of $(2z+1)(\frac{1}{4}\lambda)$ where z can be 0, 1, 2, . . . ). The "stop band" is a region of low transmittance, which is created due to destructive interference between internally-reflected and incident light through the layers of material. An NBP filter can be constructed from a series of layers by interspersing, within a stack of quarter-wave layers, resonant "cavity" layers. A "cavity" layer in an NBP filter can be an integral multiple of half-wave layers (i.e., its optical thickness is equal to: $\frac{1}{2} \lambda$; $1 \lambda$; $1\frac{1}{2} \lambda$; etc.) of the $\lambda$ associated with the quarter-wave layers. The presence of cavity layers interspersed within quarter-wave layers (where the quarter-wave layers are responsible for a stop band) can cause a relatively narrow portion of the stop band to transmit light rather than block light. A quarter-wave stack with more than one resonant cavity is referred to as a "multi-cavity" filter. The presence of multiple cavity layers can have the effect of increasing both the steepness of the cut-on edge of a transmitting region of the stop band and the steepness of the cut-off edge of the transmitting region of the stop band.

FIG. 1 depicts the structure of a conventional multi-cavity band-pass filter 100 that can provide the functionality of a NBP filter. As depicted in FIG. 1, a half-wave cavity layer 110-1 is adjacent to a quarter-wave layer 120-1, which is adjacent to a quarter-wave layer 130-1, which is adjacent to a quarter-wave layer 120-2, etc. The reference wavelength associated with the structure in FIG. 1 is $\lambda_a$. In FIG. 1, the optical thickness of each quarter-wave layer is approximately $\frac{1}{4} \lambda_a$ (where in general the optical thickness can be $(2z+1)(\frac{1}{4} \lambda_a)$ where z can be 0, 1, 2, . . . ), and the optical thickness of each cavity layer is approximately $\frac{1}{2} \lambda_a$ (where, in general, the optical thickness can be integer multiples of approximately $\frac{1}{2} \lambda_a$). As indicated by the hash-fill in the drawing, the material of the quarter-wave layer 120-1 in the depicted example can be the same as the material of the quarter-wave layer 120-2. Furthermore, the material of the half-wave cavity layer 110-1 in the depicted example can be the same as the material of the quarter-wave layer 130-1. As indicated by the suffix "n" used in FIG. 1, a quarter-wave layer 130-n can correspond to an nth repeated quarter-wave layer adjacent to (or "below," in the figure) the quarter-wave layer 130-1. Moreover, a quarter-wave layer 120-(n+1) can correspond to an (n+1)th repeated quarter-wave layer below the quarter-wave layers 120-1 and 120-2. An additional half-wave cavity layer 110-2 can be below the half-wave cavity layer 110-1 and the series of quarter-wave layers beginning with quarter-wave layer 120-1 and ending with the quarter-wave layer 120-(n+1). Again the material of the half-wave cavity layer 110-2 in the depicted example can be the same material as the half-wave cavity layer 110-1 and the quarter-wave layers 130-1 and 130-n.

FIG. 2 depicts an exemplary transmission curve 211 associated with the multi-cavity band-pass filter 100 for s-polarized light over a wide range of wavelengths (graph 250-1) and over a smaller range of wavelengths associated with the transmission curve 210 in the immediate vicinity of the narrow-band-pass region (graph 250-2). Graph 250-1, depicting a wide range of wavelengths, depicts the cut-off edge 212 associated with the quarter-wave layer stop band for s-polarized light, and also depicts the cut-on edge 214 associated with the quarter-wave layer stop band for s-polarized light.

Graph 250-2 depicts the relatively narrow transmission band for s-polarized light, located approximately in the center of the stop band, and associated with the added cavity layers 110-1, 110-2, etc. The transmission curve 210 has an associated cut-on wavelength 220 for s-polarized light within the stop band and a cut-off wavelength 225 for s-polarized light within the stop band. Although the transmission curve 210 at the cut-on wavelength 220 and the cut-off wavelength 225 that is depicted in FIG. 2 (and elsewhere) is shown with a relatively steep slope, an actual "edge" at the cut-on and cut-off wavelengths can exhibit some discernible slope. Accordingly, as used herein, a cut-on wavelength associated with an edge is the wavelength that is approximately half-way between the wavelength at the approximately 10% transmission point and the wavelength at the approximately 90% transmission point as part of the rising edge of the transmission curve. Further, as used herein, a cut-off wavelength associated with an edge is the wavelength that is approximately half-way between the wavelength at the approximately 90% transmission point and the wavelength at the approximately 10% transmission point as part of the falling edge of the transmission curve.

FIGS. 3 and 4 depict a set of exemplary transmission curves 310-1, 310-2, and 310-3 in the vicinity of the narrow-pass-band region associated with the multi-cavity band-pass filter 100 for s-polarized light, where incident s-polarized light 303-1, 303-2, and 303-3 strikes the multi-cavity band-pass filter 100 at different incident angles. The multi-cavity band-pass filter 100 at a particular angle of incidence is indicated in FIG. 3 by a suffix "X" in the reference number 100-X, where: multi-cavity band-pass filter 100-1 is at normal incidence to incident s-polarized radiation 303-1; multi-cavity band-pass filter 100-2 is between normal incidence and 60 degrees angle-of-incidence to incident s-polarized radiation 303-2; and multi-cavity band-pass filter 100-3 is at approximately 60 degrees angle-of-incidence to incident s-polarized radiation 303-3.

Each transmission curve 310-X (where, as depicted, "X" can take on the values of "1," "2," and "3") has an associated cut-on wavelength 420-X and a cut-off wavelength 425-X. Moreover, each depicted transmission curve 310-X has an associated full-width-half-maxima ("FWHM") value 430-X in the narrow-pass-band region. In each graph 350-X, the regions immediately outside of the FWHM values 430-X are part of the stop band associated with the plurality of quarter-wave layers 120-x and 130-x as depicted in FIGS. 1 and 2 (where x can be 1, 2, . . . n).

Graph 350-1 in FIGS. 3 and 4 depicts an exemplary transmission curve 310-1 for s-polarized light where the incident s-polarized light 303-1 strikes the multi-cavity band-pass filter 100-1 at normal incidence. The transmission curve 310-1 depicts a cut-on wavelength 420-1 and a cut-off wavelength 425-1 and a FWHM value 430-1.

Graph 350-2 depicts an exemplary transmission curve 310-2 for s-polarized light where the incident s-polarized light 303-2 strikes the multi-cavity band-pass filter 100-2 at an angle-of-incidence 302-2 between normal incidence and approximately 60 degrees from normal incidence. The transmission curve 310-2 depicts a cut-on wavelength 420-2 and a cut-off wavelength 425-2 and a FWHM value 430-2.

Graph 350-3 depicts an exemplary transmission curve 310-3 for s-polarized light where the incident s-polarized light 303-3 strikes the multi-cavity band-pass filter 100-3 at an angle-of-incidence 303-3 at approximately 60 degrees from normal incidence. The transmission curve 310-3 depicts a cut-on wavelength 420-3 and a cut-off wavelength 425-3 and a FWHM value 430-3.

As depicted in FIGS. 3 and 4, there are at least two general features of the transmission curves 310-X for s-polarized light that can change as the angle of incidence 302-X progresses between approximately normal angle of incidence and approximately 60 degrees angle of incidence. One general feature that can change is that the FWHM value 430-X of the series of transmission curves 310-X will tend to decrease as the angle of incidence 302-X progresses from approximately normal to approximately 60 degrees from normal. Further still, both the cut-on wavelength 420-X and the cut-off wavelength 425-X will tend to shift to lower wavelengths. Accordingly, although there is a shifting of both the cut-on wavelength 420-X and the cut-off wavelength 425-X as a function of the angle of incidence 302-X, there is also a decrease in the FWHM value 430-X as a function of the angle of incidence 302-X. Both of these general features are generically depicted in FIG. 5. That is, as used herein, a "center wavelength" is the arithmetic average of the cut-on wavelength and the cut-off wavelength associated with a transmission pass-band. For example, a center wavelength of the transmission curves depicted in FIG. 4, as a function of an angle of incidence of the multi-cavity band-pass filter 100 to incident s-polarized radiation, is the arithmetic average of the cut-on wavelengths 420-X and the cut-off wavelength 425-X at each angle of incidence (which is represented by the possible values of X). Further a full-width-half-max ("FWHM") value 430-X of the transmission curves depicted in FIG. 4 as a function of an angle of incidence of the multi-cavity band-pass filter 100 to incident s-polarized radiation is the full width of the pass-band at the half-maximum value of the absolute peak of the transmission curve 310-X in the transmission pass-band region. Curve 500-1 in FIG. 5 depicts a set of center wavelength values of s-polarized light, where the general trend of a center wavelength value as a function of increasing angle-of-incidence is to decrease; and curve 500-2 depicts a set of FWHM values of s-polarized light, where the general trend of a FWHM value as a function of increasing angle-of-incidence is also to decrease.

SUMMARY

In one aspect, the present disclosure is directed to an optical filter configured to provide a wavelength-tunable pass-band to incident s-polarized electromagnetic radiation. The optical filter can include a first stack of layers and a second stack of layers. The first stack of layers can include a plurality of quarter-wave layers and at least two half-wave cavity layers, where an optical thickness value of each quarter-wave layer in the first stack of layers can be approximately an odd-integer multiple of one-fourth of a first wavelength value. An optical thickness value of each half-wave cavity layer in the first stack of layers can be approximately an integer multiple of one-half of the first wavelength value. In addition, the first stack of layers can be configured to provide a cut-on edge for s-polarized radiation incident on the first stack of layers at a second wavelength value and a cut-off edge for s-polarized radiation incident on the first stack of layers at a third wavelength value, the second wavelength value and the third wavelength value being functions of angle-of-incidence for a set of non-normal angle-of-incidence values, and the third wavelength value being greater than the second wavelength value at the set of non-normal angle-of-incidence values. The second stack of layers can be configured to provide a cut-off edge for s-polarized radiation incident on the second stack of layers at a fourth wavelength value, the fourth wavelength value being a function of angle-of-incidence for the set of non-normal angle-of-incidence values. Further, the fourth wavelength value can lie substantially between the second wavelength value and the third wavelength value at the set of non-normal angle-of-incidence values. Further still, a pass-band determined by the second wavelength value and the fourth wavelength value can have a set of associated full-width half-maximum values as a function of angle-of-incidence for the set of non-normal angle-of-incidence values, the set of associated full-width half-maximum values substantially defining at least one of: a FWHM curve as a function of angle-of-incidence and a FWHM line as a function of angle-of-incidence. Furthermore, the at least one of a FWHM curve and a FWHM line can define a first derivative with respect to angle-of-incidence values at at least one angle-of-incidence value of the set of non-normal angle-of-incidence values that is at least one of: substantially positive and substantially zero.

In another aspect, the present disclosure is directed to an optical filter, wherein the optical filter includes a surface with a normal vector at an angle-of-incidence value to a direction of incident s-polarized electromagnetic radiation. The optical filter can also include a multi-cavity band-pass filter and at least one other filter. The multi-cavity band-pass filter can be configured to provide a tunable cut-on edge for s-polarized radiation at a first wavelength value as a function of the angle-of-incidence value, and a tunable cut-off edge for s-polarized radiation at a second wavelength value as a function of the angle-of-incidence value. The at least one other filter can be configured to provide a tunable cut-off edge for s-polarized radiation at a third wavelength value as a function of the angle-of-incidence value. Moreover, for a set of non-normal angle-of-incidence values, the third wavelength value can lie substantially between the first wavelength value and the second wavelength value. Further still, a tunable pass-band determined by the first wavelength value and the third wavelength value can have a set of associated full-width half-maximum values as a function of the angle-of-incidence value, the set of associated full-width half-maximum values substantially defining at least one of: a FWHM curve as a function of the angle-of-incidence value and a FWHM line as a function of the angle-of-incidence value. Furthermore, the at least one of a FWHM curve and a FWHM line can define a first derivative with respect to the angle-of-incidence value at at least one angle-of-incidence value of the set of non-normal angle-of-incidence values that is at least one of: substantially positive and substantially zero.

In a further aspect, the present disclosure is directed to a method of making an optical filter configured to provide a wavelength-tunable pass-band to incident s polarized electromagnetic radiation. The method can include depositing a first stack of layers on a structure, where the first stack of layers can include a plurality of quarter-wave layers and at least two half-wave cavity layers. The method can also include depositing a second stack of layers. An optical thickness value of each quarter-wave layer in the first stack of layers can be approximately an odd-integer multiple of one-fourth of a first wavelength value. An optical thickness value of each half-wave cavity layer in the at least two half-wave cavity layers can be approximately an integer multiple of one-half of the first wavelength value. In addition, the first stack of layers can be configured to provide a cut-on edge for s-polarized radiation incident on the first stack of layers at a second wavelength value and a cut-off edge for s-polarized radiation incident on the first stack of layers at a third wavelength value, the second wavelength value and the third wavelength value being functions of angle-of-incidence for a set of non-normal angle-of-incidence values, and the third wavelength value being greater than the second wavelength value at the set of non-normal angle-of-incidence values. The second stack of layers can be configured to provide a cut-off edge for s-polarized radiation incident on the second stack of layers at a fourth wavelength value. Further, the fourth wavelength value can lie substantially between the second wavelength value and the third wavelength value at the set of non-normal angle-of-incidence values. Further still, a pass-band determined by the second wavelength value and the fourth wavelength value can have a set of associated full-width half-maximum values as a function of angle-of-incidence for the set of non-normal angle-of-incidence values, the set of associated full-width half-maximum values substantially defining at least one of: a FWHM curve as a function of angle-of-incidence and a FWHM line as a function of angle-of-incidence. Furthermore, the at least one of a FWHM curve and a FWHM line can define a first derivative with respect to angle-of-incidence values at at least one angle-of-incidence value of the set of non-normal angle-of-incidence values that is at least one of: substantially positive and substantially zero.

In another aspect, the present disclosure is also directed to a method of making an optical filter, wherein the optical filter includes a surface with a normal vector at an angle-of-incidence value to a direction of incident s-polarized electromagnetic radiation. The method can include depositing a first stack of layers on a structure, the first stack of layers including a multi-cavity band-pass filter. The method can also include depositing a second stack of layers, the second stack of layers including at least one other filter. The multi-cavity band-pass filter can be configured to provide a tunable cut-on edge for s-polarized radiation at a first wavelength value as a function of the angle-of-incidence value, and a tunable cut-off edge for s-polarized radiation at a second wavelength value as a function of the angle-of-incidence value. The at least one other filter can be configured to provide a tunable cut-off edge for s-polarized radiation at a third wavelength value as a function of the angle-of-incidence value. Moreover, for a set of non-normal angle-of-incidence values, the third wavelength value can lie substantially between the first wavelength value and the second wavelength value. Further still, a tunable pass-band determined by the first wavelength value and the third wavelength value can have a set of associated full-width half-maximum values as a function of the angle-of-incidence value, the set of associated full-width half-maximum values substantially defining at least one of: a FWHM curve as a function of the angle-of-incidence value and a FWHM line as a function of the angle-of-incidence value. Furthermore, the at least one of a FWHM curve and a FWHM line can define a first derivative with respect to the angle-of-incidence value at at least one angle-of-incidence value of the set of non-normal angle-of-incidence values that is at least one of: substantially positive and substantially zero.

Additional features and advantages will be set forth in part in the description which follows, being apparent from the description of or learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the embodiments, as claimed.

BRIEF DESCRIPTION OF THE DRAWINGS

The accompanying drawings, which are incorporated in and constitute a part of this specification, illustrate embodiments and, together with the description, serve to explain the features, advantages, and principles of the disclosed embodiments.

DETAILED DESCRIPTION

Reference will now be made in detail to the one or more embodiments, characteristics of which are illustrated in the accompanying drawings. Wherever possible, the same reference numbers will be used throughout the drawings to refer to the same or like parts.

Figure 1:
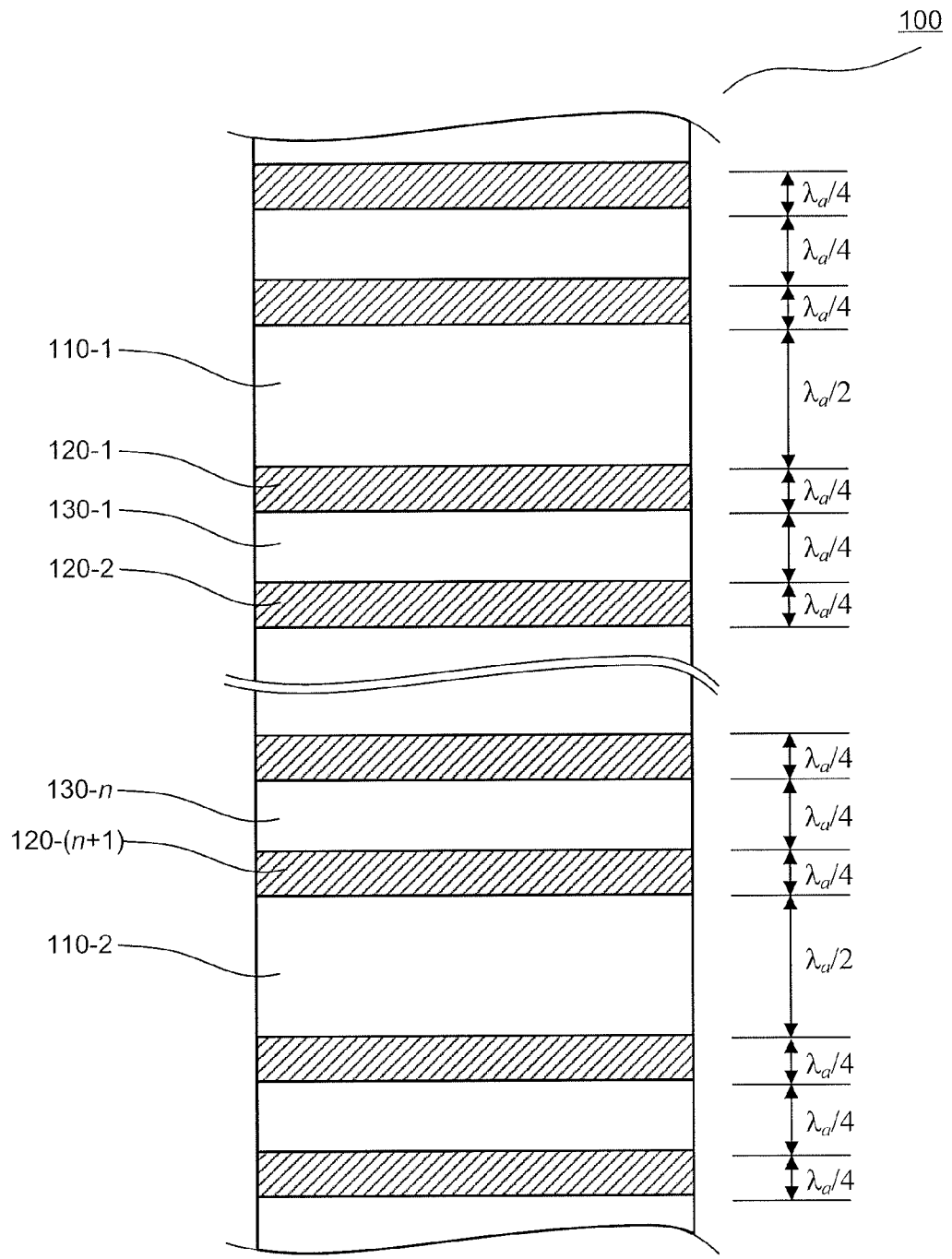
FIG. 1 depicts a conventional multi-cavity band-pass filter including quarter-wave layers and cavity layers.
Figure 2:
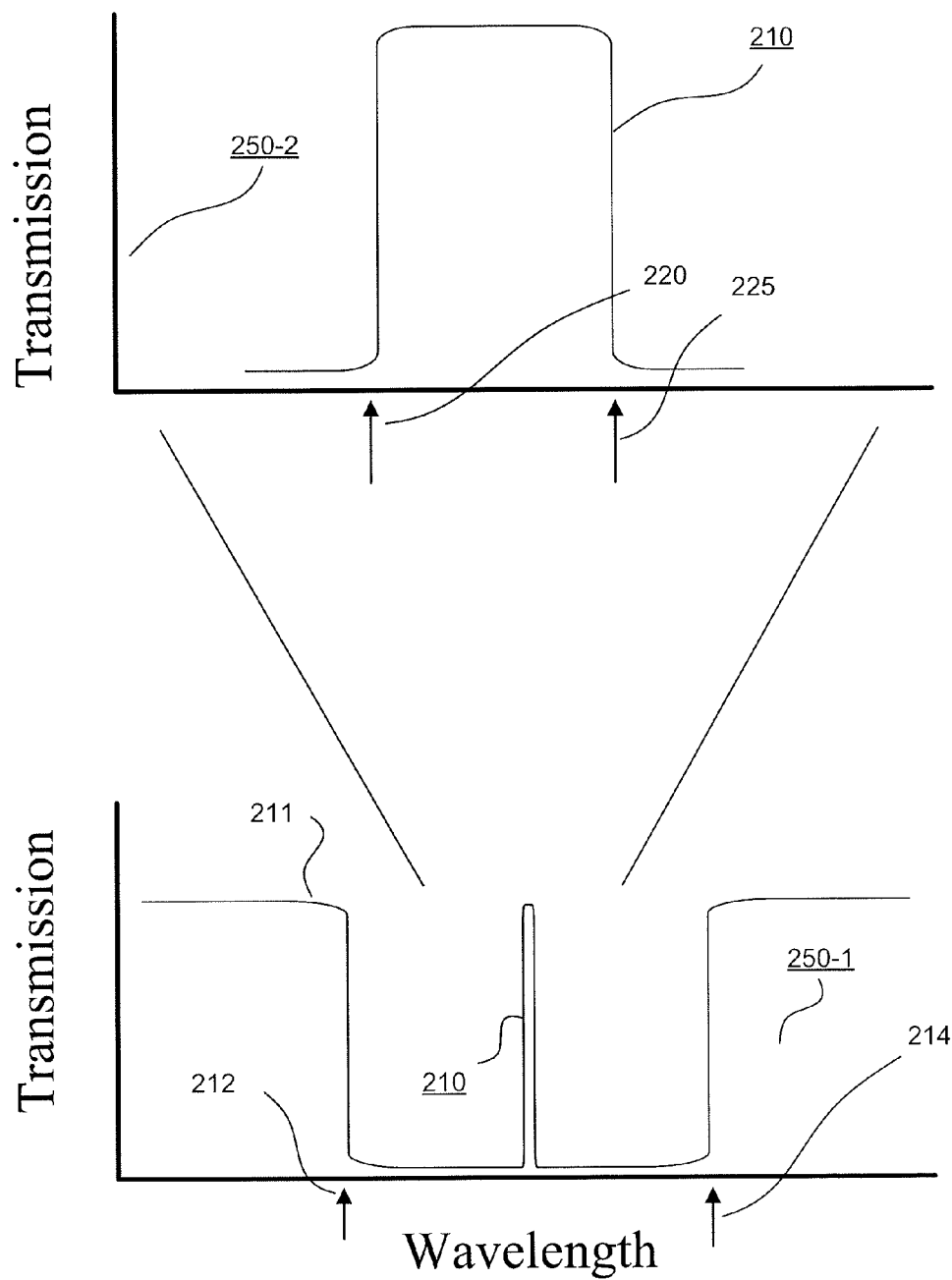
FIG. 2 depicts an exemplary transmission curve for s-polarized light incident on the multi-cavity band-pass filter of FIG. 1 over a relatively wide range of wavelengths (bottom), and also over a relatively narrow band of wavelengths (top) within the stop band.

As discussed above in connection with the structure of FIG. 1, a series of quarter-wave layers can create a "stop band" in a transmission spectrum. Such a stop band can exhibit two edges: a cut-off edge (associated with the wavelength that is approximately half-way between the 90% transmission point and the 10% transmission point of the falling edge of the transmission curve at the lower edge of the stop band) and a cut-on edge (associated with the wavelength that is approximately half-way between the 10% transmission point and the 90% transmission point of the rising edge of the transmission curve at the upper edge of the stop band). For purposes of clarification, the relevant stop band edges of the structure in FIG. 1 are depicted in FIG. 2 as the cut-off edge 212 and the cut-on edge 214. Although not depicted in graph 250-2, the cut-off edge 212 associated with the lower bound of the relevant stop band lies to the left of the cut-on wavelength 220, and the cut-on edge 214 associated with the upper bound of the relevant stop band lies to the right of the cut-off wavelengths 225.

Where a filter includes a series of materials layers that exhibit thicknesses that deviate from a quarter wave-length value, the stop band edges can be configured to exhibit certain characteristics as a function of the angle at which light is incident on the filter.

Figure 6:
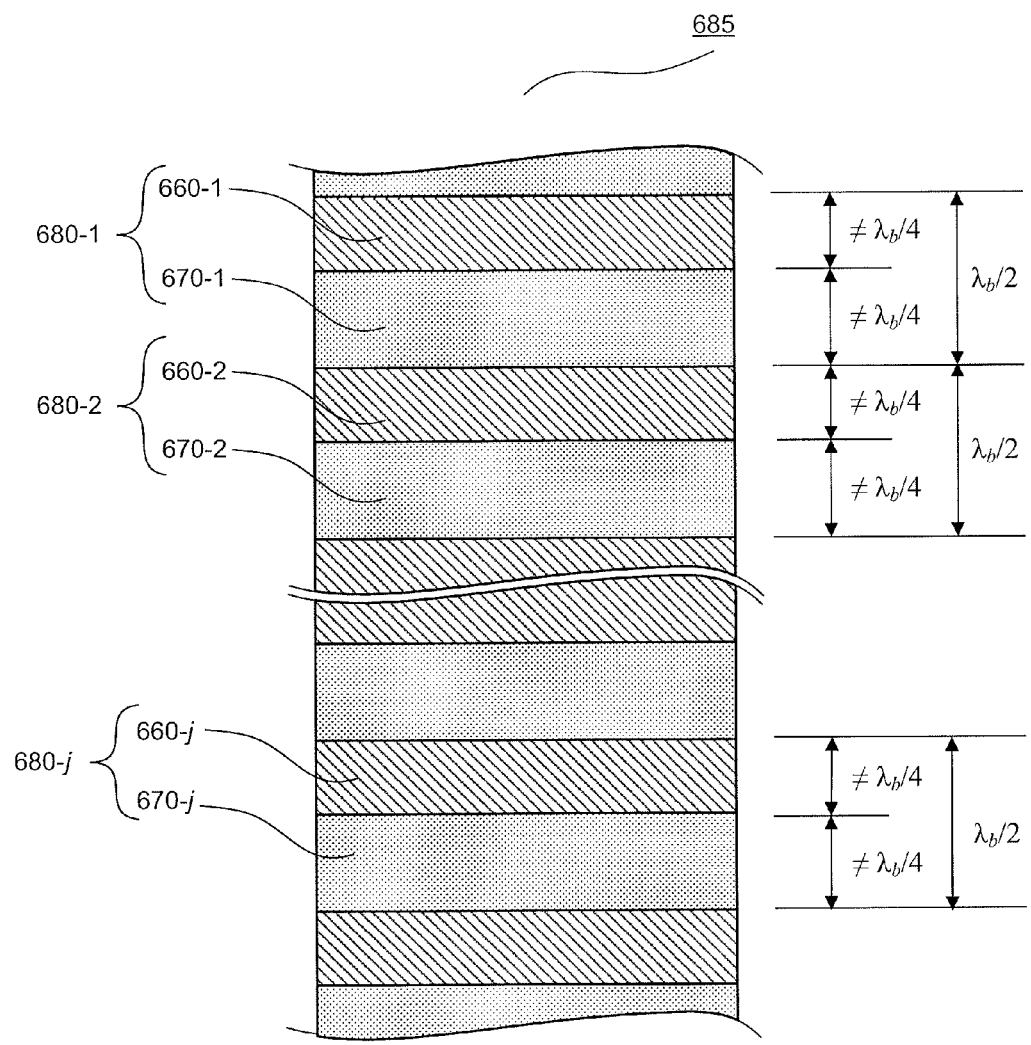
FIG. 6 depicts a short-wave pass filter with a plurality of mismatched layer pairs consistent with the disclosure.

FIG. 6 depicts a plurality of layers referred to herein as "mismatched layer pairs." In particular, mismatched layer pair 680-1 includes first material layer 660-1 and second material layer 670-1. Each of the first material layer 660-1 and the second material layer 670-1 exhibit a total thickness which deviates from a quarter wave-length value. For example, where a reference wavelength is $\lambda_b$, then each of the first material layer 660-1 and the second material layer 670-1 can exhibit a thickness which is different from approximately ¼ $\lambda_b$ (or $(2z+1)$ (¼ $\lambda_a$) where z can be 0, 1, 2, . . . ). The mismatched layer pair 680-1, however, is configured such that the combined optical thickness of the first material layer 660-1 and the second material layer 670-1 is approximately ½ $\lambda_b$ (or an integer multiple of ½ $\lambda_b$). By way of example only, where the optical thickness of the first material layer 660-1 is chosen to be approximately ⅛ $\lambda_b$ (which is different from approximately $(2z+1)$¼ $\lambda_b$ where z can be 0, 1, 2, . . . ) and the optical thickness of the second material layer 670-1 is chosen to be approximately ⅜ $\lambda_b$ (which is also different from approximately $(2z+1)$¼ $\lambda_b$ where z can be 0, 1, 2, . . . ), then the combined optical thickness of the first material layer 660-1 and the second material layer 670-1 is approximately ½ $\lambda_b$. The exemplary optical thicknesses of approximately ⅛ $\lambda_b$ and approximately ⅜ $\lambda_b$, of course, are not restrictive of the teachings of the present disclosure. Rather, they are cited here merely as an illustration of the disclosed mismatched pair 680-1. Consistent with this disclosure, the optical thickness of the first material layer 660-1 and the optical thickness of the second material layer 670-1 can take on any value different from a quarter-wave thickness of a reference wavelength $\lambda_b$, with the constraint that the combined optical thickness of the first material layer 660-1 and the second material layer 670-1 is approximately ½ $\lambda_b$ (or an integer multiple of ½ $\lambda_b$).

Introduction of mismatch can be a useful, constrained way of allowing layer thicknesses to deviate from a quarter-wave thickness while maintaining the same position of the stopband with respect to the quarter-wave reference wavelength. For example, mismatch can be introduced in an optical filter design to intentionally create a second-order stopband (a harmonic of a fundamental stopband which occurs at approximately one half of the fundamental stopband wavelength) where a strictly quarter-wave stack will conventionally not exhibit harmonic stopbands with even orders. Consistent with this disclosure, mismatch can be used here to modify a dependence of the change in wavelength of the edges of the stopband on the angle-of-incidence.

The entire structure of FIG. 6 will be referred to as short wave pass filter 685. As discussed further below, we will be interested in the characteristics of the cut-off wavelength provided by the structure of FIG. 6. Generally, the fabrication of an edge filter (such as a short-wave-pass filter) can involve minor adjustments of layer thicknesses in order to avoid or suppress pass-band ripple, which can occur just outside the stopband. For example, a short-wave-pass filter can generally comprise a set of quarter-wave layers, but with the thickness of some or all of the quarter-wave layers varying by a small amount about the typical value of one quarter wave (or an odd-multiple of one quarter wave). In the context of mismatch layers discussed herein, the total thickness of a pair of adjacent mismatch layers can also vary by a small amount about the typical value of one half-wave (or an integer multiple of one half-wave). One of ordinary skill in the art would appreciate that the use of such adjustments in layer thicknesses to avoid or suppress passband ripple is consistent with all embodiments disclosed herein.

Figure 7:
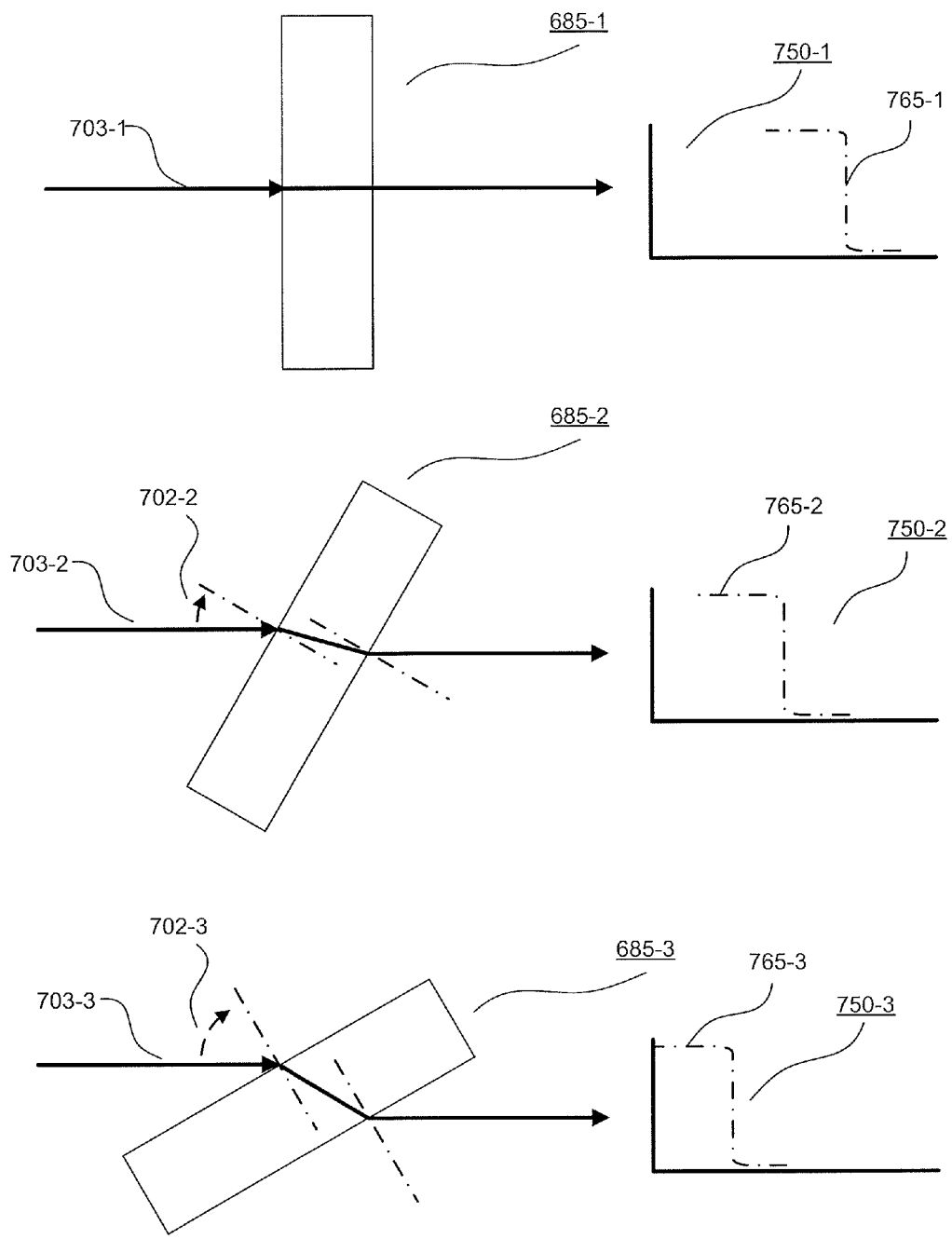
FIG. 7 depicts exemplary transmission curves for s-polarized light as a function of angle, where the s-polarized light is depicted as incident on the short-wave pass filter of FIG. 6 at three different angles-of-incidence.
Figure 8:
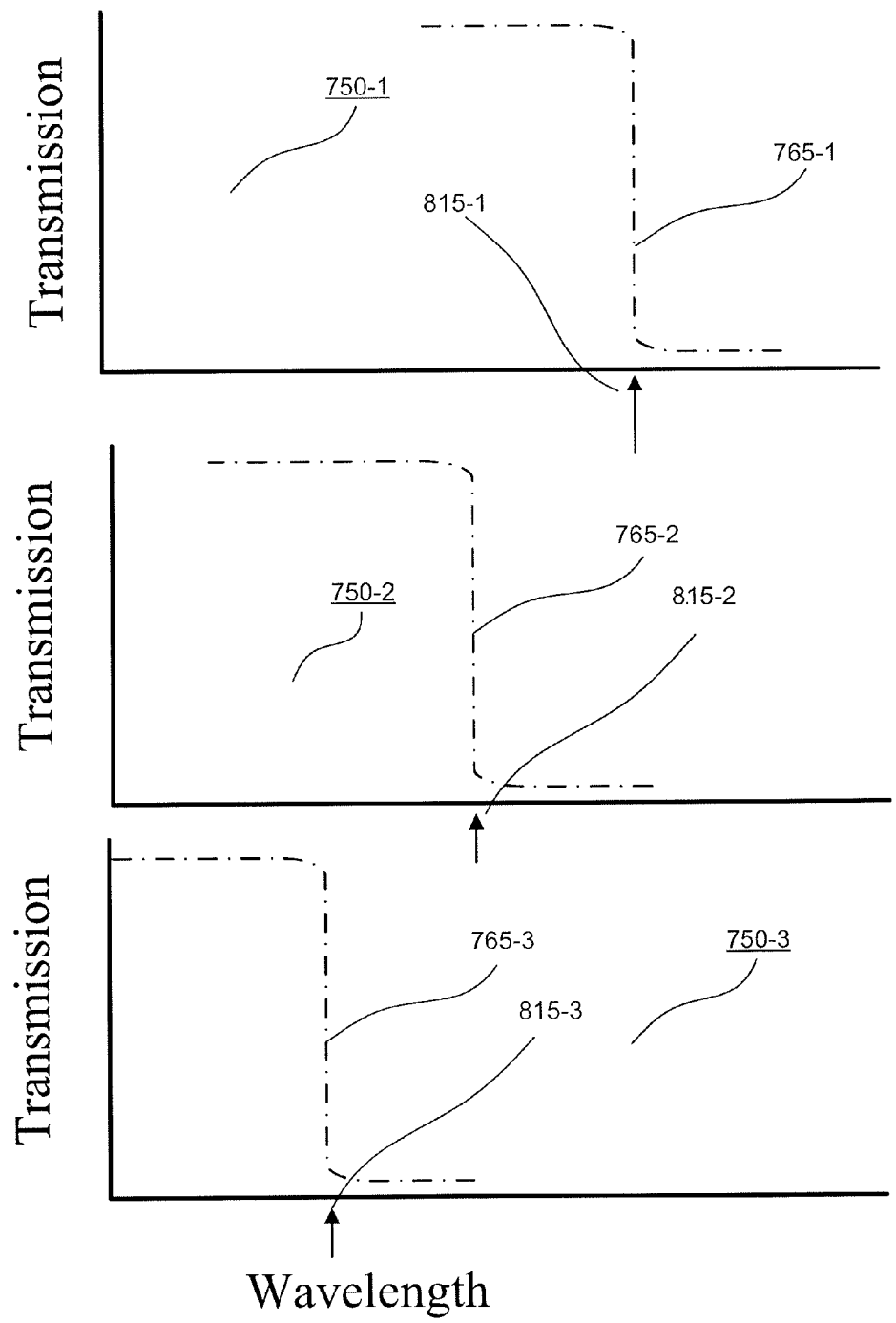
FIG. 8 depicts the exemplary transmission curves of FIG. 7 in further detail.

FIGS. 7 and 8 depict a set of exemplary transmission curves 765-1, 765-2, and 765-3 in the vicinity of a cut-off wavelength 815-X associated with the short wave pass filter 685 for s-polarized light, where s-polarized incident light 703-1, 703-2, and 703-3 strikes the short wave pass filter 685 at different incident angles. The short wave pass filter 685 at a particular angle of incidence is indicated in FIG. 7 by a suffix "X" in the reference number 685-X, where: short wave pass filter 685-1 is at normal incidence to incident s-polarized radiation 703-1; short wave pass filter 685-2 is between normal incidence and 60 degrees angle-of-incidence to incident s-polarized radiation 703-2; and short wave pass filter 685-3 is at approximately 60 degrees angle-of-incidence to incident s-polarized radiation 703-3. Each transmission curve 765-X (where "X" can take on the values of "1," "2," and "3") has an associated cut-off wavelength 815-X.

Graph 750-1 in FIGS. 7 and 8 depicts an exemplary transmission curve 765-1 for s-polarized light where the incident s-polarized radiation 703-1 strikes the short wave pass filter 685-1 at normal incidence. Graph 750-2 depicts an exemplary transmission curve 765-2 for s-polarized light where the incident s-polarized radiation 703-2 strikes the short wave pass filter 685-2 at an angle of incidence 702-2 that is between normal incidence and approximately 60 degrees from normal incidence. Graph 750-3 depicts an exemplary transmission curve 765-3 for s-polarized light where the incident s-polarized radiation 703-3 strikes the short wave pass filter 685-3 at an angle of incidence 702-3 that is approximately 60 degrees from normal incidence.

As depicted in FIGS. 7 and 8, a feature of the transmission curves 765-X for s-polarized light as a function of the angle of incidence 702-X is that the cut-off wavelengths 815-X moves from higher to lower wavelength values. By way of example only, the material of the first material layer 660-x and the second material layer 670-x (where "x" can be any integer) can be selected from any of the following materials: $Ta_2O_5$; $Nb_2O_5$; $TiO_2$; $SiO_2$; $Al_2O_3$; $HfO_2$; and/or any other suitable material.

Figure 9:
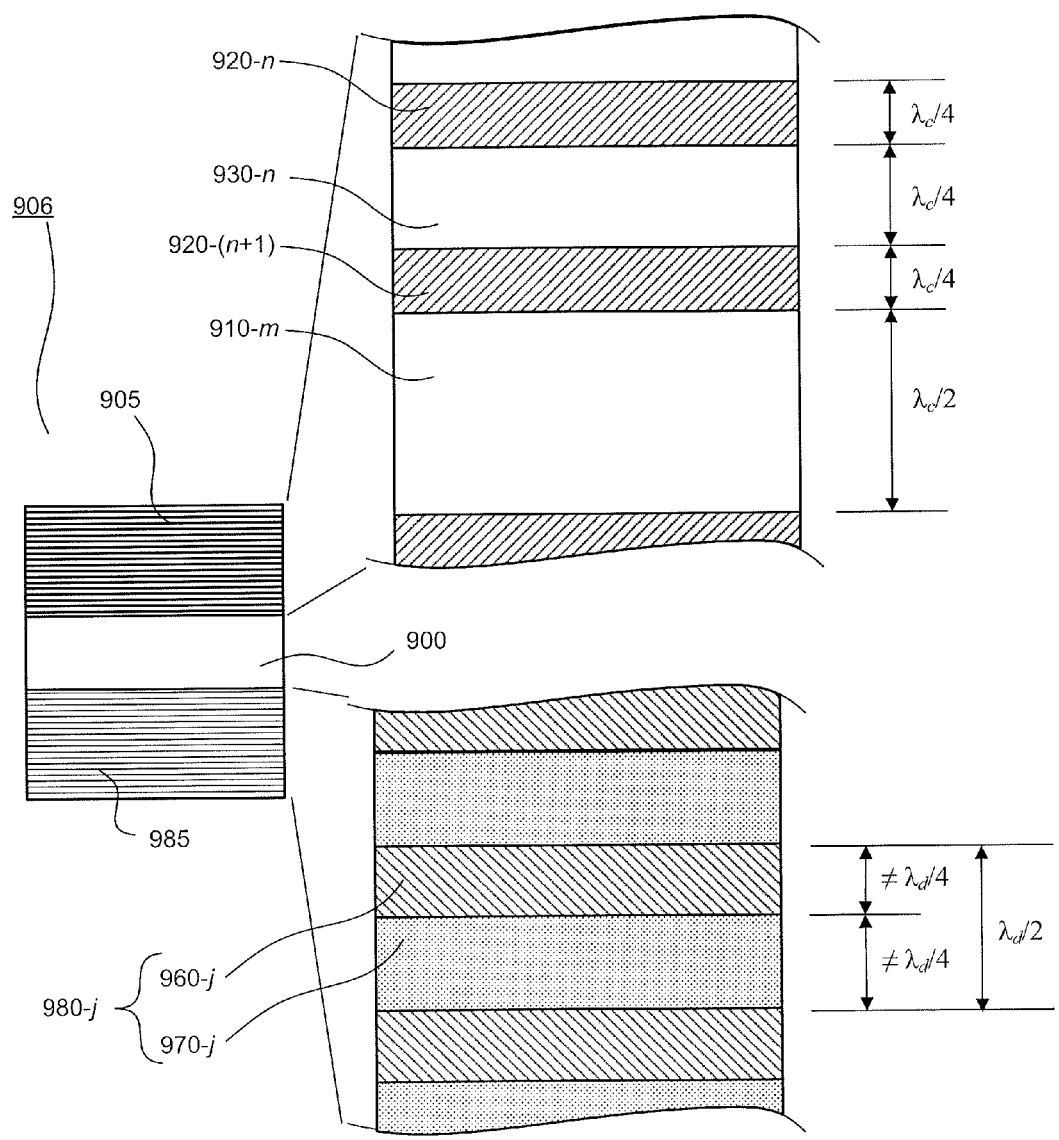
FIG. 9 depicts a filter that includes both a short-wave pass filter with a plurality of mismatched layer pairs and a multi-cavity band-pass filter consistent with the disclosure.

FIG. 9 depicts an embodiment of a tunable band-pass filter 906 consistent with this disclosure. The tunable band-pass filter 906 includes a multi-cavity band-pass filter 905, a substrate 900, and a short-wave pass filter 985.

The multi-cavity band-pass filter 905 includes a half-wave cavity layer 910-$m$, which is adjacent to a quarter-wave layer 920-($n$+1), which is adjacent to a quarter-wave layer 930-$n$, which is adjacent to a quarter-wave layer 920-$n$, etc. The variables "n" and "m" as used in connection with FIG. 9 can be integers. For example, the suffix "n" can correspond to an "nth" repeated quarter-wave layer adjacent to (or "below") a similar quarter-wave layer (n−1). The suffix "m" can correspond to an "mth" repeated cavity layer. The reference wavelength associated with the multi-cavity band-pass filter 905 in FIG. 9 is $\lambda_c$. Accordingly, the optical thickness of each quarter-wave layer is approximately (2z+1) (¼ $\lambda_c$) (where z can be 0, 1, 2, . . . ), and the optical thickness of each cavity layer is approximately ½ $\lambda_c$ (or an integer multiple of approximately ½ $\lambda_c$). As indicated by the hash-fill in the drawing, the material of the quarter-wave layer 920-$n$ in the depicted example can be the same as the material of the quarter-wave layer 920-($n$+1). Furthermore, the material of the half-wave cavity layer 910-$m$ in the depicted example can be the same as the material of the quarter-wave layer 930-$n$.

The short-wave pass filter 985 includes plurality of mismatched layer pairs. In particular, mismatched layer pair 980-$j$ includes first material layer 960-$j$ and second material layer 970-$j$. Each of the first material layer 960-$j$ and the second material layer 970-$j$ can exhibit a total thickness which deviates from a quarter wave-length value. For example, where the reference wavelength is $\lambda_d$, then each of the first material layer 960-$j$ and the second material layer 970-$j$ can exhibit a thickness which is different from approximately (2z+1) (¼ $\lambda_d$) (where z can be 0, 1, 2, . . . ). Consistent with this disclosure, the optical thickness of any first material layer (such as 960-$j$, 960-($j$−1), 960-($j$+1), etc.) and the optical thickness of any second material layer (such as 970-$j$, 970-($j$−1), 970-($j$+1), etc.) can take on values different from a quarter-wave thickness of a reference wavelength $\lambda_d$, with the constraint that the combined optical thickness of a mismatched pair of a first material layer and a second material layer is approximately ½ $\lambda_d$ (or an integer multiple of ½ $\lambda_d$). Consistent with this disclosure, the optical thickness of a first material layer 960-($j$+1), that is adjacent to the first material layer 960-$j$, can be different from both the optical thickness of the first material layer 960-$j$ and approximately (2z+1) (¼ $\lambda_d$), where z can be 0, 1, 2, . . . . Likewise, the optical thickness of a second material layer 970-($j$+1), that is adjacent to the second material layer 970-$j$, can be different from both the optical thickness of the second material layer 970-$j$ and approximately (2z+1) (¼ $\lambda_d$) where z can be 0, 1, 2, . . . ). However, the combined optical thickness of the first material layer 960-(j+1) and the second material layer 970-(j+1) (to the extent they are components of a mismatched layer pair 980-(j+1)) will be approximately an integer multiple of ½ $\lambda_d$. A further design constraint associated with the short wave pass filter 985 will be discussed in connection with FIGS. 10-12.

Figure 10:
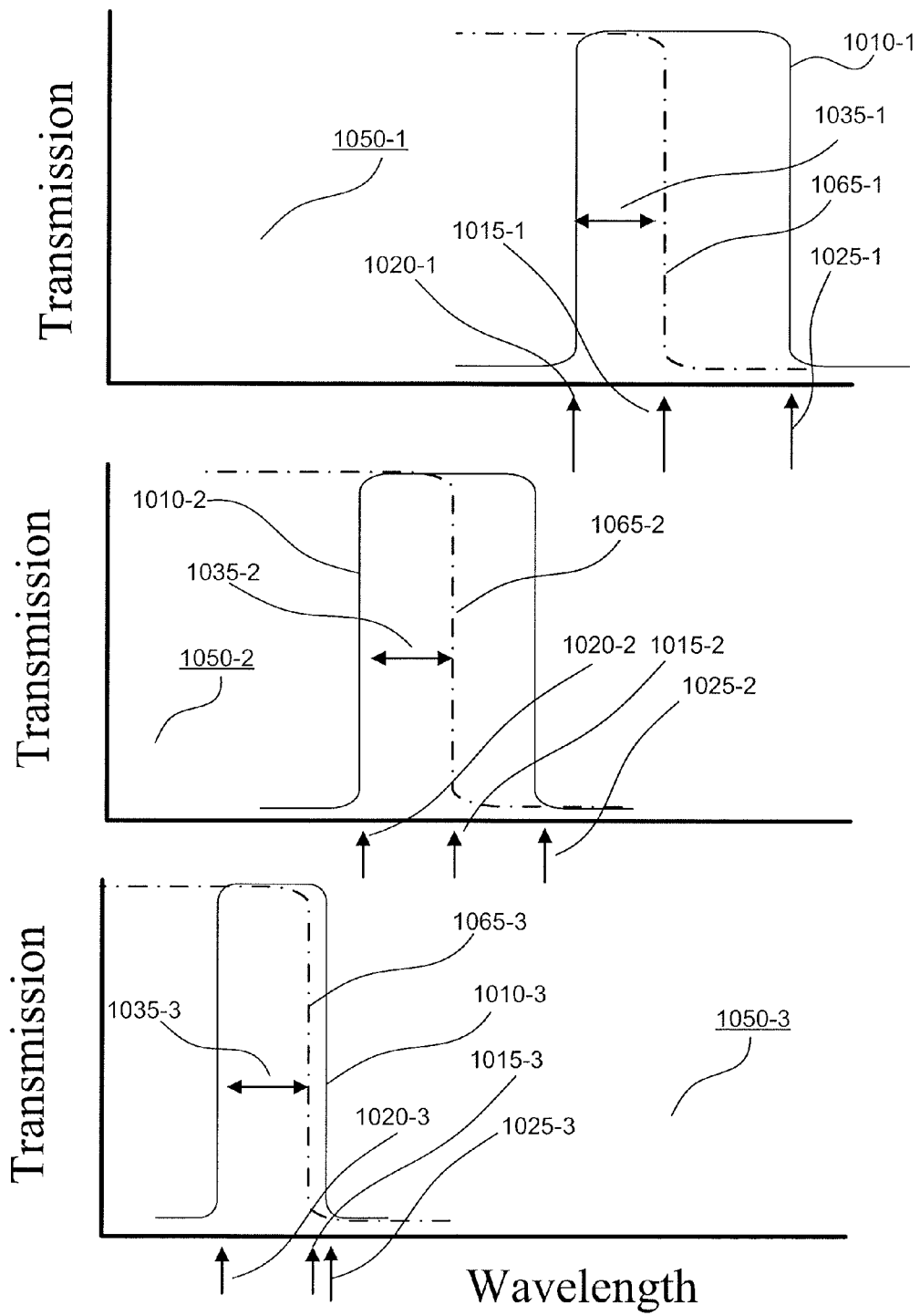
FIG. 10 depicts exemplary transmission curves for s-polarized light as a function of angle, where the s-polarized light is incident on the filter of FIG. 9.

FIG. 10 depicts a set of exemplary transmission curves 1010-1, 1010-2, and 1010-3 associated with the multi-cavity band-pass filter 905 for s-polarized light, and transmission curves 1065-1, 1065-2, and 1065-3 associated with the short wave pass filter 985 for s-polarized light. Each transmission curve 1010-X (where "X" can take on the values of "1," "2," and "3") has an associated cut-on wavelength 1020-X and a cut-off wavelength 1025-X. In addition, each transmission curve 1065-X (where "X" can take on the values of "1," "2," and "3") has an associated cut-off wavelength 1015-X. Together, the pair of curves 1010-X and 1065-X represent the overall transmission of the structure that includes both the multi-cavity band-pass filter 905 and the short wave pass filter 985. Accordingly, the pair of curves 1010-X and 1065-X, together, represent the overall transmission of the tunable band-pass filter 906 to s-polarized radiation. Where a cut-off edge of a short wave pass filter is configured to lie in a transmission region of a band-pass filter, the transmission region of the combined filter will acquire the cut-off edge of the short wave pass filter. Accordingly, the pair of curves 1010-X and 1065-X, together, will have an associated FWHM value 1035-X approximately bound by the cut-on wavelength 1020-X of the multi-cavity band-pass filter 905, and the smaller of the cut-off wavelength 1025-X of the multi-cavity band-pass filter 905 and the cut-off wavelength 1015-X of the short wave pass filter 985. Consequently, the FWHM value 1035-X can be less than or equal to the overall width of the transmission pass-band of the curve 1010-X in the vicinity of the narrow-band-pass region.

Graph 1050-1 in FIG. 10 depicts exemplary transmission curves 1010-1 and 1065-1 for s-polarized light where incident s-polarized light strikes the tunable band-pass filter 906 at normal incidence. The pair of transmission curves 1010-1 and 1065-1 depict a cut-on wavelength 1020-1 and a cut-off wavelength 1015-1 and a FWHM value 935-1.

Graph 1050-2 depicts exemplary transmission curves 1010-2 and 1065-2 for s-polarized light where incident s-polarized light strikes the tunable band-pass filter 906 at between normal incidence and approximately 60 degrees from normal incidence. The pair of transmission curves 1010-2 and 1065-2 depict a cut-on wavelength 1020-2 and a cut-off wavelength 1015-2 and a FWHM value 1035-2.

Graph 1050-3 depicts exemplary transmission curves 1010-3 and 1065-3 for s-polarized light where incident s-polarized light strikes the tunable band-pass filter 906 at approximately 60 degrees from normal incidence. The pair of transmission curves 1010-3 and 1065-3 depict a cut-on wavelength 1020-3 and a cut-off wavelength 1015-3 and a FWHM value 1035-3.

Figure 3:
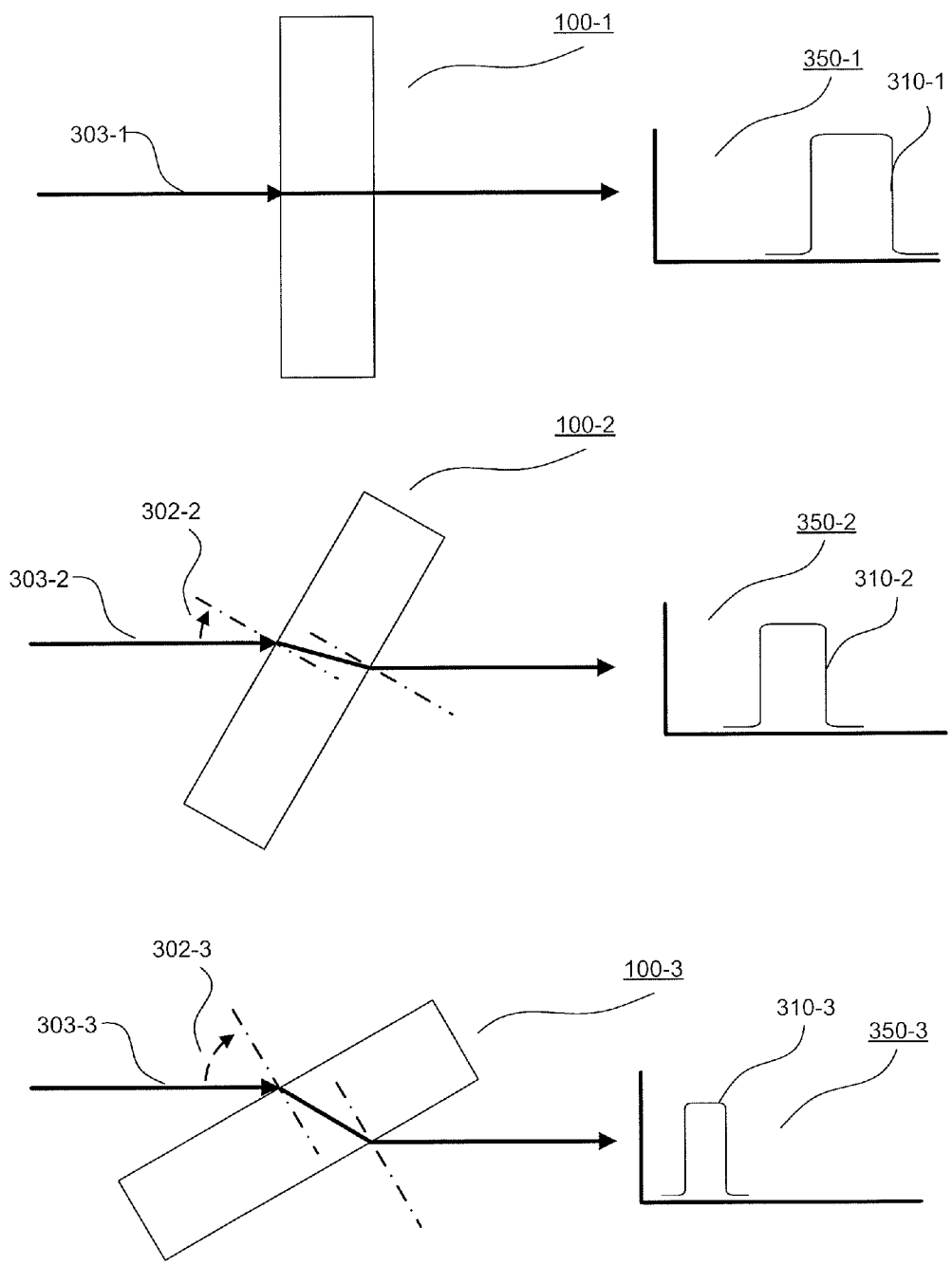
FIG. 3 depicts exemplary transmission curves for s-polarized light as a function of angle over the relatively narrow band of wavelengths within the stop band, where the s-polarized light is depicted as incident on the multi-cavity band-pass filter of FIG. 1 at three different angles-of-incidence.
Figure 4:
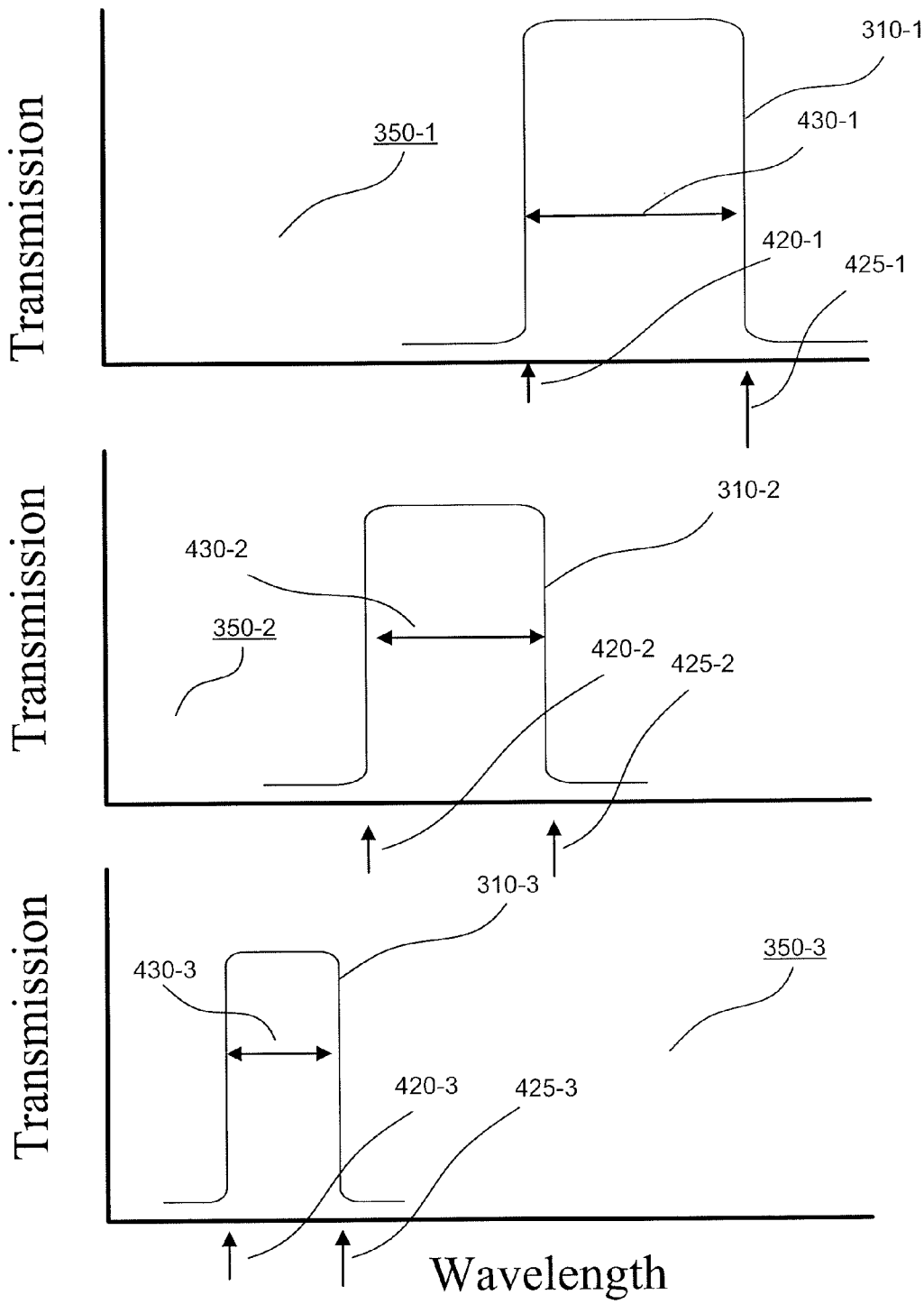
FIG. 4 depicts the exemplary transmission curves of FIG. 3 in further detail.
Figure 5:
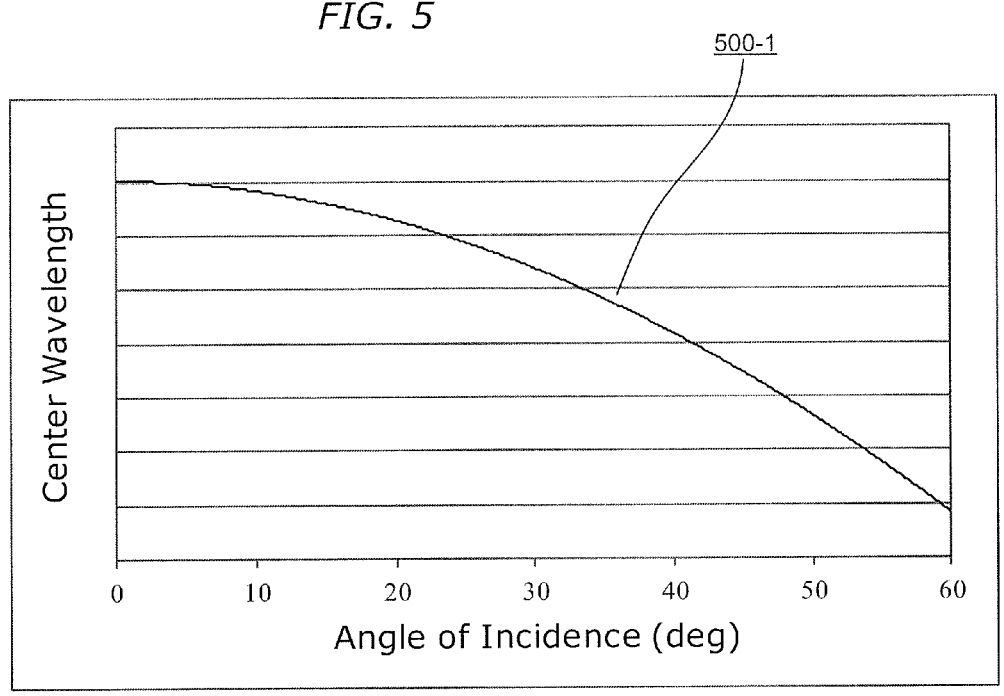
FIG. 5 depicts a trend of conventional multi-cavity band-pass filters to exhibit both decreasing center wavelength and FWHM values as a function of angle-of-incidence for s-polarized light.
Figure 5:
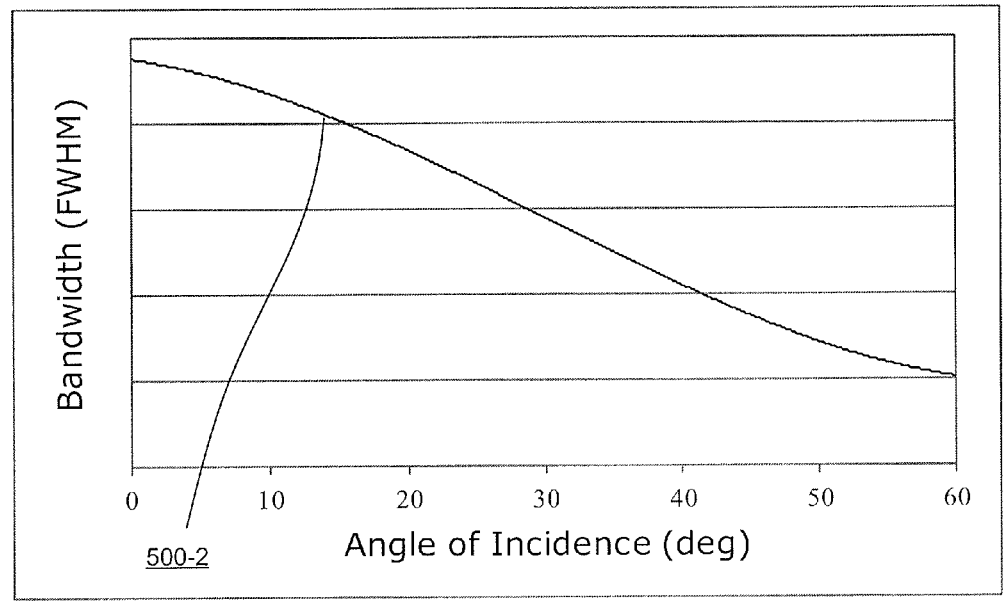

As depicted in FIG. 10, and consistent with FIGS. 3, 4, and 5, the transmission curves 1010-X for s-polarized light can change as the angle of incidence progresses between approximately normal angle of incidence and approximately 60 degrees angle of incidence. One general feature that can change is that the separation between the cut-on wavelength 1020-X and the cut-off wavelength 1025-X will tend to narrow as the angle of incidence progresses from approximately normal to approximately 60 degrees from normal. Moreover, the cut-on wavelength 1020-X will tend to shift to lower wavelengths. Because of the tendency of the separation between the cut-on wavelength 1020-X and the cut-off wavelength 1025-X to narrow as the angle of incidence increases, the "rate" (as a function of angle of incidence) of the tendency of the cut-off wavelength 1025-X to shift to lower wavelengths is "higher" than the "rate" (as a function of angle of incidence) of the tendency of the cut-on wavelength 1020-X to shift to lower wavelengths.

Consistent with this disclosure, the cut-off wavelength 1015-X of the short wave pass curves 1065-X for s-polarized light will also tend to shift to lower wavelengths as the angle of incidence progresses from approximately normal to approximately 60 degrees from normal. Consistent with this disclosure, each mismatched layer pair 980-j (which includes the first material layer 960-j and the second material layer 970-j) can be configured such that the "rate" (as a function of angle of incidence) of the tendency of the cut-off wavelength 1015-X to shift to lower wavelengths more closely matches the "rate" (as a function of angle of incidence) of the tendency of the cut-on wavelength 1020-X to shift to lower wavelengths. By placing the cut-off wavelength 1015-1 at normal incidence of the short wave pass filter 985 within the passband of the multi-cavity filter 905 at normal incidence (i.e., by placing the cut-off wavelength 1015-1 between the cut-on wavelength 1020-1 and the cut-off wavelength 1025-1, as depicted in FIG. 10), then there will be a range of angles of incidence over which the overall transmission width (represented by the FWHM value 1035-X) is relatively constant.

Figure 11:
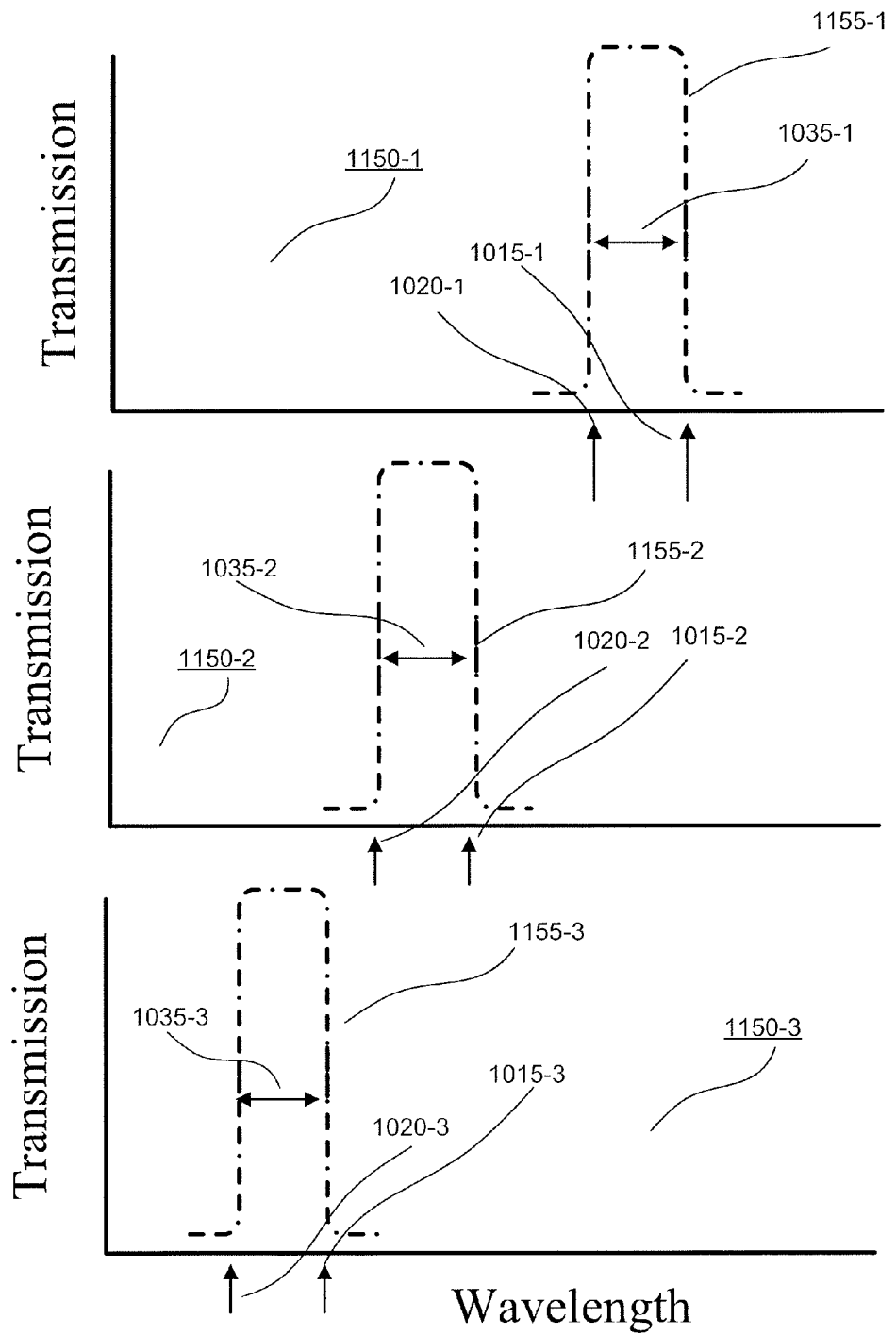
FIG. 11 depicts exemplary composite transmission curves for s-polarized light as a function of angle, where the s-polarized light is incident on the filter of FIG. 9.
Figure 12:
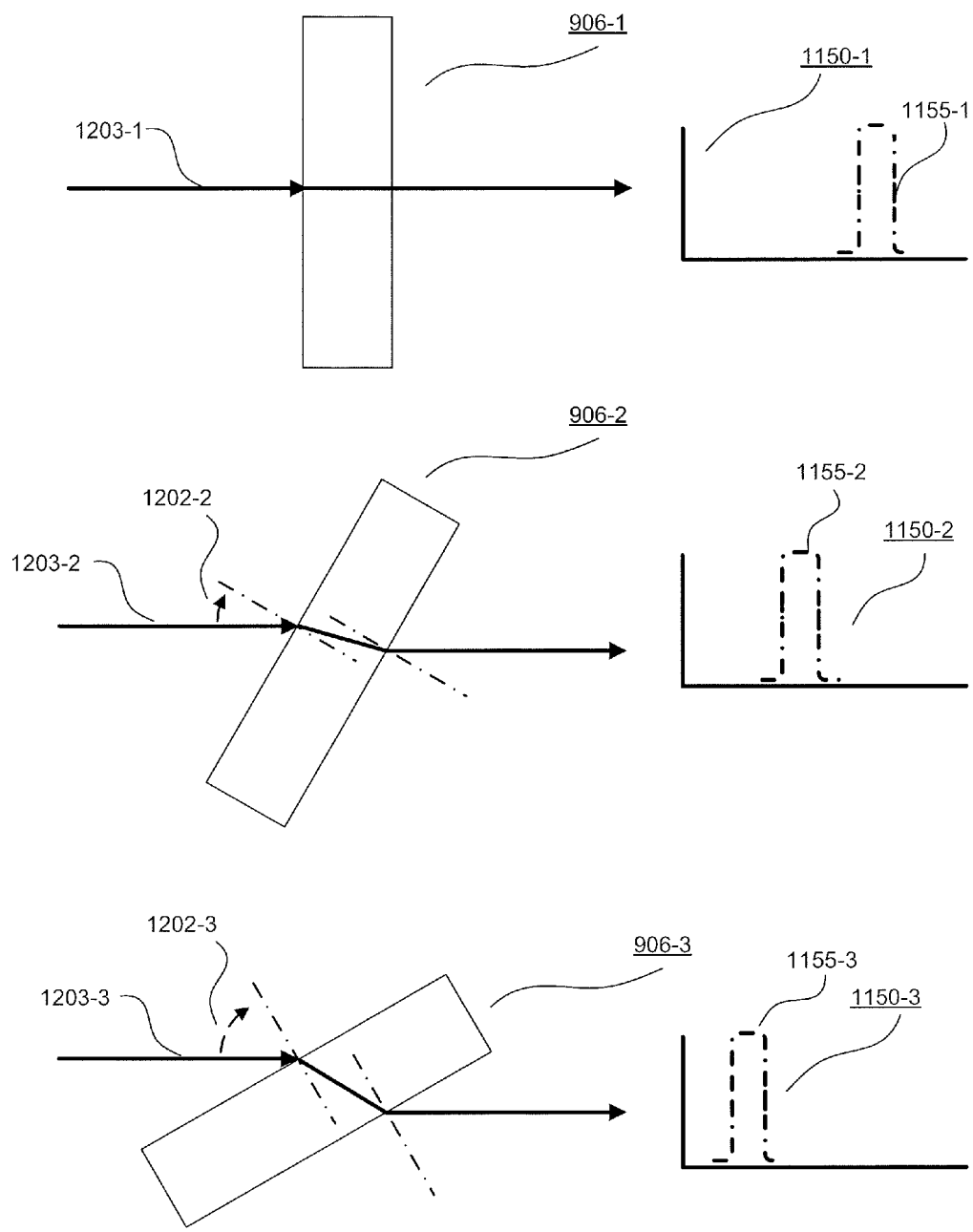
FIG. 12 depicts the exemplary composite transmission curves for s-polarized light as a function of angle of FIG. 11, where the s-polarized light is depicted as incident on the filter of FIG. 9 at three different angles-of-incidence.

This is further illustrated in FIGS. 11 and 12, where composite transmission curve 1155-X represents the combination of transmission curve 1010-X and short wave pass curve 1065-X. Consistent with this disclosure, the tunable band-pass filter 906 can be configured to provide a range of transmission pass-bands with a relatively constant width for s-polarized light as a function of the angle of incidence. Consistent with this disclosure, the material of quarter-wave layer 920-t, quarter-wave layer 930-u, half-wave cavity layer 910-v, first material layer 960-x and the second material layer 970-x (where "t," "u," "v," and "x" can be any integer) can be selected from any of the following materials: $Ta_2O_5$; $Nb_2O_5$; $TiO_2$; $SiO_2$; $Al_2O_5$; $HfO_2$; and/or any other suitable material. Further, the thicknesses of the first material layer 960-x and the second material layer 970-x (where "x" can be any integer) can be selected and/or determined by, for example, increasing the mismatch between the material layers 960-x and 970-x and calculating the effect of the increase on the "rate" (as a function of angle of incidence) of the tendency of the cut-off wavelength 1015-X to shift to lower wavelengths, versus the "rate" (as a function of angle of incidence) of the tendency of the cut-on wavelength 1020-X to shift to lower wavelengths.

Graph 1150-1 in FIGS. 11 and 12 depicts exemplary composite transmission curve 1155-1 for s-polarized light where incident s-polarized light 1203-1 strikes the tunable band-pass filter 906-1 at normal incidence. The composite transmission curve 1155-1 depicts the cut-on wavelength 1020-1 and the cut-off wavelength 1015-1 and a FWHM value 1035-1.

Graph 1150-2 in FIGS. 11 and 12 depicts exemplary composite transmission curve 1155-2 for s-polarized light where incident s-polarized light 1203-2 strikes the tunable band-pass filter 906-2 at an angle of incidence 1202-2 that is between normal incidence and approximately 60 degrees from normal incidence. The composite transmission curve 1155-2 depicts the cut-on wavelength 1020-2 and the cut-off wavelength 1015-2 and a FWHM value 1035-2.

Graph 1150-3 in FIGS. 11 and 12 depicts exemplary composite transmission curve 1155-3 for s-polarized light where incident s-polarized light 1203-3 strikes the tunable band-pass filter 906-3 at an angle of incidence 1202-3 that is approximately 60 degrees from normal incidence. The composite transmission curve 1155-3 depicts the cut-on wavelength 1020-3 and the cut-off wavelength 1015-3 and a FWHM value 1035-3.

As discussed above in connection with FIGS. 11 and 12, and consistent with this disclosure, the multi-cavity band-pass filter 905 and the short wave pass filter 985 have been configured to provide a substantially constant FWHM value 1035-X as a function of the changing angle of incidence 1202-X and a changing center wavelength. In a further embodiment consistent with this disclosure, a multi-cavity band-pass filter and a short wave pass filter can be configured to provide a set of FWHM values that can vary as a function of the changing angle of incidence 1202-X. For example, a multi-cavity band-pass filter and a short wave pass filter can be configured to provide a tunable filter with a set of FWHM values that substantially increase as a function of increasing angle of incidence 1202-X and decreasing center wavelength (rather than the set of FWHM values 1035-X that remain substantially constant as a function of increasing angle of incidence 1202-X and decreasing center wavelength). For example, the "rate" at which the cut-off wavelength 1015-X changes as a function of a changing angle-of-incidence can be "slower" than the "rate" at which the cut-off wavelength 1025-X changes as a function of the changing angle-of-incidence.

Tables 1 and 2 below provide a design for an exemplary multi-cavity band-pass filter 905 (Table 1) and an exemplary short wave pass filter 985 (Table 2) consistent with this disclosure.

TABLE 1

Multi-cavity Fabry-Pérot coating;
Coating thickness (µm) 26.261; Total layers: 201

| Layer | Material | Thickness (nm) |
|---|---|---|
| 1 | $Ta_2O_5$ | 84.86081847 |
| 2 | $SiO_2$ | 242.0063157 |
| 3 | $Ta_2O_5$ | 79.42262492 |
| 4 | $SiO_2$ | 124.4585928 |
| 5 | $Ta_2O_5$ | 98.49994188 |
| 6 | $SiO_2$ | 482.2535555 |
| 7 | $Ta_2O_5$ | 86.18339815 |
| 8 | $SiO_2$ | 128.8366589 |
| 9 | $Ta_2O_5$ | 91.26983873 |
| 10 | $SiO_2$ | 495.8306305 |
| 11 | $Ta_2O_5$ | 83.73917985 |
| 12 | $SiO_2$ | 133.9510664 |
| 13 | $Ta_2O_5$ | 89.67562027 |
| 14 | $SiO_2$ | 497.6094517 |
| 15 | $Ta_2O_5$ | 89.56426749 |
| 16 | $SiO_2$ | 129.0725954 |
| 17 | $Ta_2O_5$ | 92.54758274 |
| 18 | $SiO_2$ | 498.3105473 |
| 19 | $Ta_2O_5$ | 89.83976397 |
| 20 | $SiO_2$ | 129.6009309 |
| 21 | $Ta_2O_5$ | 91.86261249 |
| 22 | $SiO_2$ | 498.7498621 |
| 23 | $Ta_2O_5$ | 90.58246314 |
| 24 | $SiO_2$ | 129.6391882 |
| 25 | $Ta_2O_5$ | 91.07205556 |
| 26 | $SiO_2$ | 504.908109 |
| 27 | $Ta_2O_5$ | 86.36801319 |
| 28 | $SiO_2$ | 127.3278425 |
| 29 | $Ta_2O_5$ | 89.48722992 |
| 30 | $SiO_2$ | 505.7028994 |
| 31 | $Ta_2O_5$ | 87.83756488 |
| 32 | $SiO_2$ | 123.2350193 |
| 33 | $Ta_2O_5$ | 92.99874763 |
| 34 | $SiO_2$ | 506.1396887 |
| 35 | $Ta_2O_5$ | 87.62785566 |
| 36 | $SiO_2$ | 118.8570863 |
| 37 | $Ta_2O_5$ | 89.08871776 |
| 38 | $SiO_2$ | 507.5157997 |
| 39 | $Ta_2O_5$ | 84.18934247 |
| 40 | $SiO_2$ | 122.9064083 |
| 41 | $Ta_2O_5$ | 87.56974342 |
| 42 | $SiO_2$ | 495.5316447 |
| 43 | $Ta_2O_5$ | 96.11290528 |
| 44 | $SiO_2$ | 125.6276134 |
| 45 | $Ta_2O_5$ | 84.42611361 |
| 46 | $SiO_2$ | 245.376971 |
| 47 | $Ta_2O_5$ | 85.17539746 |
| 48 | $SiO_2$ | 125.3561605 |
| 49 | $Ta_2O_5$ | 85.77776718 |
| 50 | $SiO_2$ | 241.0440754 |
| 51 | $Ta_2O_5$ | 80.17803568 |
| 52 | $SiO_2$ | 126.1808114 |
| 53 | $Ta_2O_5$ | 80.67886398 |
| 54 | $SiO_2$ | 246.4613311 |
| 55 | $Ta_2O_5$ | 82.82086413 |
| 56 | $SiO_2$ | 124.1378397 |
| 57 | $Ta_2O_5$ | 84.20414434 |
| 58 | $SiO_2$ | 244.7598598 |
| 59 | $Ta_2O_5$ | 83.24183681 |
| 60 | $SiO_2$ | 125.3043896 |
| 61 | $Ta_2O_5$ | 85.05296429 |
| 62 | $SiO_2$ | 243.1875317 |
| 63 | $Ta_2O_5$ | 81.62000763 |
| 64 | $SiO_2$ | 123.6508804 |
| 65 | $Ta_2O_5$ | 80.87128041 |
| 66 | $SiO_2$ | 246.9984732 |
| 67 | $Ta_2O_5$ | 82.66773587 |
| 68 | $SiO_2$ | 122.2395585 |
| 69 | $Ta_2O_5$ | 83.73871702 |
| 70 | $SiO_2$ | 245.0218029 |
| 71 | $Ta_2O_5$ | 84.04191299 |
| 72 | $SiO_2$ | 125.0745989 |
| 73 | $Ta_2O_5$ | 84.38382 |
| 74 | $SiO_2$ | 245.4488202 |
| 75 | $Ta_2O_5$ | 81.40988499 |
| 76 | $SiO_2$ | 123.2370617 |
| 77 | $Ta_2O_5$ | 80.74870225 |
| 78 | $SiO_2$ | 246.0992803 |
| 79 | $Ta_2O_5$ | 82.56107494 |
| 80 | $SiO_2$ | 121.1195379 |
| 81 | $Ta_2O_5$ | 81.80872849 |
| 82 | $SiO_2$ | 243.044139 |
| 83 | $Ta_2O_5$ | 87.08816818 |
| 84 | $SiO_2$ | 123.7955743 |
| 85 | $Ta_2O_5$ | 79.58437908 |
| 86 | $SiO_2$ | 249.3612135 |
| 87 | $Ta_2O_5$ | 81.54557665 |
| 88 | $SiO_2$ | 122.5788581 |
| 89 | $Ta_2O_5$ | 78.1127788 |
| 90 | $SiO_2$ | 244.7623545 |
| 91 | $Ta_2O_5$ | 84.06679124 |
| 92 | $SiO_2$ | 121.5921577 |
| 93 | $Ta_2O_5$ | 78.18397929 |
| 94 | $SiO_2$ | 237.7754913 |
| 95 | $Ta_2O_5$ | 84.32523065 |
| 96 | $SiO_2$ | 126.6252909 |
| 97 | $Ta_2O_5$ | 76.35118584 |
| 98 | $SiO_2$ | 235.237847 |
| 99 | $Ta_2O_5$ | 82.22449137 |
| 100 | $SiO_2$ | 118.3300528 |
| 101 | $Ta_2O_5$ | 80.53985793 |
| 102 | $SiO_2$ | 232.7352757 |
| 103 | $Ta_2O_5$ | 79.16991688 |
| 104 | $SiO_2$ | 109.3111112 |
| 105 | $Ta_2O_5$ | 80.40032356 |
| 106 | $SiO_2$ | 230.7191088 |

TABLE 1-continued

Multi-cavity Fabry-Pérot coating;
Coating thickness (μm) 26.261; Total layers: 201

| Layer | Material | Thickness (nm) |
|---|---|---|
| 107 | $Ta_2O_5$ | 78.08665461 |
| 108 | $SiO_2$ | 109.7377281 |
| 109 | $Ta_2O_5$ | 79.77747453 |
| 110 | $SiO_2$ | 227.3529728 |
| 111 | $Ta_2O_5$ | 78.14762903 |
| 112 | $SiO_2$ | 108.008723 |
| 113 | $Ta_2O_5$ | 75.28645741 |
| 114 | $SiO_2$ | 227.7596559 |
| 115 | $Ta_2O_5$ | 81.62369506 |
| 116 | $SiO_2$ | 109.9909626 |
| 117 | $Ta_2O_5$ | 74.96948428 |
| 118 | $SiO_2$ | 220.4548295 |
| 119 | $Ta_2O_5$ | 81.50158776 |
| 120 | $SiO_2$ | 114.7449162 |
| 121 | $Ta_2O_5$ | 76.60255205 |
| 122 | $SiO_2$ | 227.9314326 |
| 123 | $Ta_2O_5$ | 75.00200878 |
| 124 | $SiO_2$ | 111.4559394 |
| 125 | $Ta_2O_5$ | 82.57420051 |
| 126 | $SiO_2$ | 218.0532375 |
| 127 | $Ta_2O_5$ | 77.48278661 |
| 128 | $SiO_2$ | 109.7106373 |
| 129 | $Ta_2O_5$ | 76.33108977 |
| 130 | $SiO_2$ | 229.4819377 |
| 131 | $Ta_2O_5$ | 79.07137772 |
| 132 | $SiO_2$ | 110.2401432 |
| 133 | $Ta_2O_5$ | 72.66899455 |
| 134 | $SiO_2$ | 231.8507966 |
| 135 | $Ta_2O_5$ | 76.02817167 |
| 136 | $SiO_2$ | 105.1880111 |
| 137 | $Ta_2O_5$ | 79.12557344 |
| 138 | $SiO_2$ | 238.3501039 |
| 139 | $Ta_2O_5$ | 72.62702229 |
| 140 | $SiO_2$ | 106.3584034 |
| 141 | $Ta_2O_5$ | 63.47126092 |
| 142 | $SiO_2$ | 243.3791797 |
| 143 | $Ta_2O_5$ | 88.87155429 |
| 144 | $SiO_2$ | 106.2863105 |
| 145 | $Ta_2O_5$ | 28.0537894 |
| 146 | $SiO_2$ | 267.1666469 |
| 147 | $Ta_2O_5$ | 68.63695426 |
| 148 | $SiO_2$ | 244.9239384 |
| 149 | $Ta_2O_5$ | 55.11033871 |
| 150 | $SiO_2$ | 259.3367099 |
| 151 | $Ta_2O_5$ | 58.82697325 |
| 152 | $SiO_2$ | 258.9311476 |
| 153 | $Ta_2O_5$ | 61.63500866 |
| 154 | $SiO_2$ | 245.0050404 |
| 155 | $Ta_2O_5$ | 59.83624845 |
| 156 | $SiO_2$ | 254.6262607 |
| 157 | $Ta_2O_5$ | 56.74833709 |
| 158 | $SiO_2$ | 237.1361173 |
| 159 | $Ta_2O_5$ | 55.91158808 |
| 160 | $SiO_2$ | 237.24455 |
| 161 | $Ta_2O_5$ | 64.54536039 |
| 162 | $SiO_2$ | 261.1886986 |
| 163 | $Ta_2O_5$ | 30.93920151 |
| 164 | $Ta_2O_5$ | 26.17467032 |
| 165 | $SiO_2$ | 71.74202862 |
| 166 | $Ta_2O_5$ | 44.31106545 |
| 167 | $SiO_2$ | 74.39597715 |
| 168 | $Ta_2O_5$ | 44.1552258 |
| 169 | $SiO_2$ | 72.5097595 |
| 170 | $Ta_2O_5$ | 44.83655928 |
| 171 | $SiO_2$ | 73.87528424 |
| 172 | $Ta_2O_5$ | 50.00461964 |
| 173 | $SiO_2$ | 73.63773417 |
| 174 | $Ta_2O_5$ | 50.62910386 |
| 175 | $SiO_2$ | 71.53351773 |
| 176 | $Ta_2O_5$ | 46.42699144 |
| 177 | $SiO_2$ | 67.20593124 |
| 178 | $Ta_2O_5$ | 44.98705768 |
| 179 | $SiO_2$ | 70.04290462 |
| 180 | $Ta_2O_5$ | 48.2527291 |
| 181 | $SiO_2$ | 71.11919523 |
| 182 | $Ta_2O_5$ | 24.98314182 |
| 183 | $Ta_2O_5$ | 20.44068687 |
| 184 | $SiO_2$ | 61.00635595 |
| 185 | $Ta_2O_5$ | 41.9213522 |
| 186 | $SiO_2$ | 55.22409435 |
| 187 | $Ta_2O_5$ | 32.89172432 |
| 188 | $SiO_2$ | 49.22399604 |
| 189 | $Ta_2O_5$ | 35.13711347 |
| 190 | $SiO_2$ | 57.65548671 |
| 191 | $Ta_2O_5$ | 46.13957499 |
| 192 | $SiO_2$ | 67.23007385 |
| 193 | $Ta_2O_5$ | 46.46092828 |
| 194 | $SiO_2$ | 62.23726407 |
| 195 | $Ta_2O_5$ | 45.8796702 |
| 196 | $SiO_2$ | 65.51509692 |
| 197 | $Ta_2O_5$ | 42.78428694 |
| 198 | $SiO_2$ | 56.53085414 |
| 199 | $Ta_2O_5$ | 42.98960645 |
| 200 | $SiO_2$ | 60.76601494 |
| 201 | $Ta_2O_5$ | 16.92825592 |

TABLE 2

Short-wave-pass coating;
Coating thickness (μm) 10.231; Total layers: 85

| Layer | Material | Thickness (nm) |
|---|---|---|
| 1 | $SiO_2$ | 32.564985 |
| 2 | $Ta_2O_5$ | 103.536924 |
| 3 | $SiO_2$ | 187.227674 |
| 4 | $Ta_2O_5$ | 96.291084 |
| 5 | $SiO_2$ | 70.582116 |
| 6 | $Ta_2O_5$ | 99.265249 |
| 7 | $SiO_2$ | 184.493378 |
| 8 | $Ta_2O_5$ | 87.921806 |
| 9 | $SiO_2$ | 110.111808 |
| 10 | $Ta_2O_5$ | 96.475114 |
| 11 | $SiO_2$ | 138.036553 |
| 12 | $Ta_2O_5$ | 94.445712 |
| 13 | $SiO_2$ | 157.957375 |
| 14 | $Ta_2O_5$ | 90.035192 |
| 15 | $SiO_2$ | 100.044427 |
| 16 | $Ta_2O_5$ | 95.402498 |
| 17 | $SiO_2$ | 147.524957 |
| 18 | $Ta_2O_5$ | 96.746509 |
| 19 | $SiO_2$ | 142.149296 |
| 20 | $Ta_2O_5$ | 84.390197 |
| 21 | $SiO_2$ | 121.860362 |
| 22 | $Ta_2O_5$ | 98.533075 |
| 23 | $SiO_2$ | 140.872471 |
| 24 | $Ta_2O_5$ | 93.838854 |
| 25 | $SiO_2$ | 138.831744 |
| 26 | $Ta_2O_5$ | 88.400528 |
| 27 | $SiO_2$ | 122.433322 |
| 28 | $Ta_2O_5$ | 98.464968 |
| 29 | $SiO_2$ | 142.204252 |
| 30 | $Ta_2O_5$ | 91.166333 |
| 31 | $SiO_2$ | 131.861957 |
| 32 | $Ta_2O_5$ | 93.752429 |
| 33 | $SiO_2$ | 130.614148 |
| 34 | $Ta_2O_5$ | 94.267412 |
| 35 | $SiO_2$ | 135.75648 |
| 36 | $Ta_2O_5$ | 93.851254 |
| 37 | $SiO_2$ | 134.422693 |
| 38 | $Ta_2O_5$ | 93.886106 |
| 39 | $SiO_2$ | 132.370066 |
| 40 | $Ta_2O_5$ | 92.229273 |
| 41 | $SiO_2$ | 134.507066 |
| 42 | $Ta_2O_5$ | 95.511939 |
| 43 | $SiO_2$ | 135.095002 |
| 44 | $Ta_2O_5$ | 94.470606 |

TABLE 2-continued

Short-wave-pass coating;
Coating thickness (μm) 10.231; Total layers: 85

| Layer | Material | Thickness (nm) |
|---|---|---|
| 45 | $SiO_2$ | 132.785913 |
| 46 | $Ta_2O_5$ | 90.220537 |
| 47 | $SiO_2$ | 135.120942 |
| 48 | $Ta_2O_5$ | 98.754587 |
| 49 | $SiO_2$ | 136.422237 |
| 50 | $Ta_2O_5$ | 91.533641 |
| 51 | $SiO_2$ | 129.910015 |
| 52 | $Ta_2O_5$ | 97.020346 |
| 53 | $SiO_2$ | 135.23393 |
| 54 | $Ta_2O_5$ | 97.994888 |
| 55 | $SiO_2$ | 138.151546 |
| 56 | $Ta_2O_5$ | 97.711187 |
| 57 | $SiO_2$ | 133.307795 |
| 58 | $Ta_2O_5$ | 101.849842 |
| 59 | $SiO_2$ | 178.374941 |
| 60 | $Ta_2O_5$ | 98.818091 |
| 61 | $SiO_2$ | 200.139903 |
| 62 | $Ta_2O_5$ | 101.1450992 |
| 63 | $SiO_2$ | 163.4784126 |
| 64 | $Ta_2O_5$ | 104.696583 |
| 65 | $SiO_2$ | 168.2931682 |
| 66 | $Ta_2O_5$ | 108.054437 |
| 67 | $SiO_2$ | 180.8520501 |
| 68 | $Ta_2O_5$ | 107.4487676 |
| 69 | $SiO_2$ | 159.5593569 |
| 70 | $Ta_2O_5$ | 108.7649352 |
| 71 | $SiO_2$ | 146.296938 |
| 72 | $Ta_2O_5$ | 114.4862676 |
| 73 | $SiO_2$ | 170.399124 |
| 74 | $Ta_2O_5$ | 113.3191848 |
| 75 | $SiO_2$ | 167.3166132 |
| 76 | $Ta_2O_5$ | 110.4086364 |
| 77 | $SiO_2$ | 135.9390598 |
| 78 | $Ta_2O_5$ | 113.3216614 |
| 79 | $SiO_2$ | 161.7299328 |
| 80 | $Ta_2O_5$ | 117.060421 |
| 81 | $SiO_2$ | 204.8519718 |
| 82 | $Ta_2O_5$ | 112.3593131 |
| 83 | $SiO_2$ | 180.3759619 |
| 84 | $Ta_2O_5$ | 117.245507 |
| 85 | $SiO_2$ | 26.14269536 |

Figure 13:
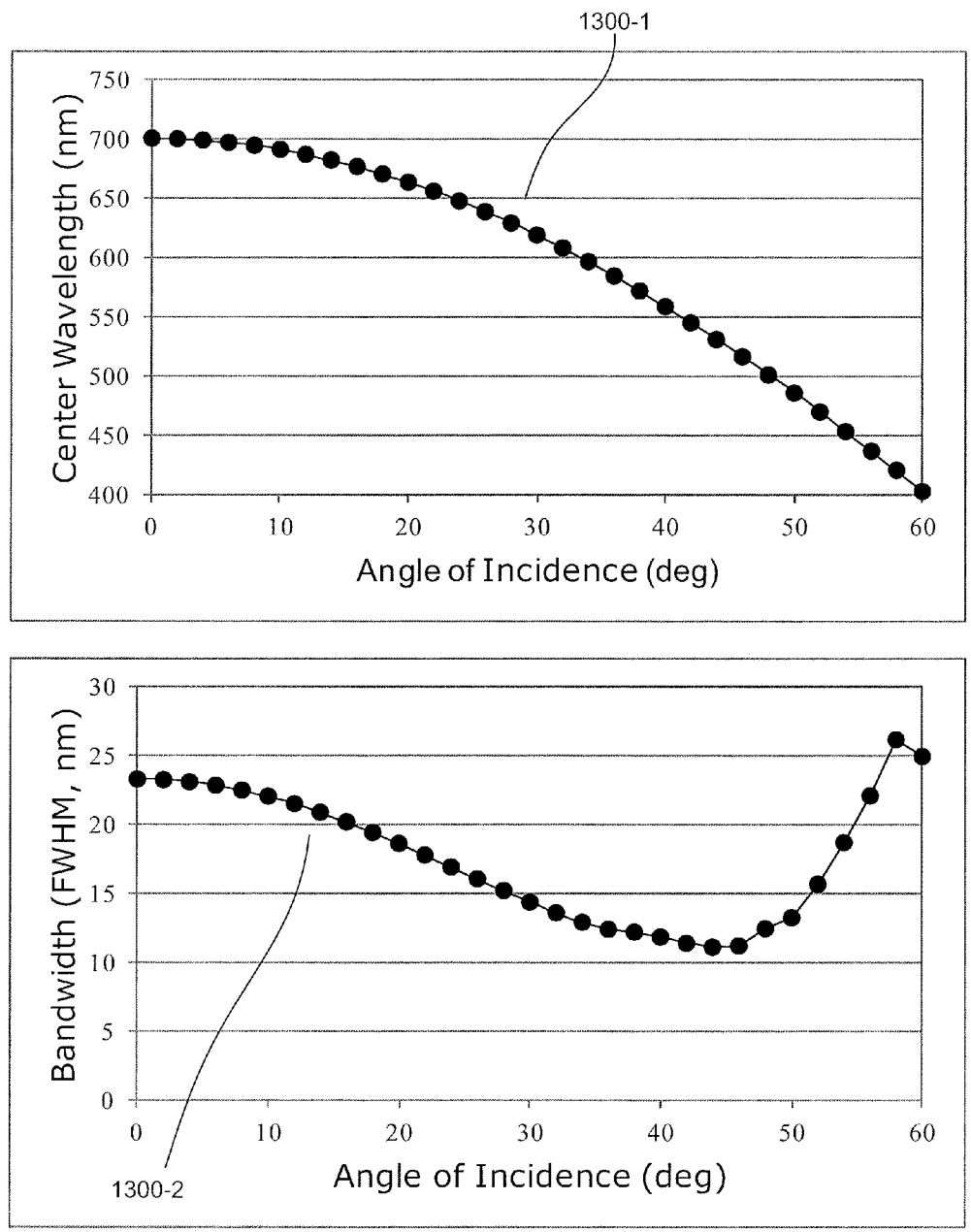
FIG. 13 depicts an aspect of filters consistent this disclosure, where filters consistent with this disclosure can exhibit a decreasing center wavelength and can also exhibit FWHM values that exhibit a minimum as a function of angle-of-incidence for s-polarized light.

FIG. 13 depicts two graphs associated with an exemplary tunable band-pass filter 906 including a multi-cavity band-pass filter 905 constructed consistent with the design of Table 1, and a short-wave pass filter 985 constructed consistent with the design of Table 2. Curve 1300-1 depicts the value of a "center wavelength" of tunable band-pass filter 906 as a function of the angle of incidence, where the value of the "center wavelength" is the wavelength that lies half-way between the cut-on wavelength 920-X and the cut-off wavelength 915-X, and thereby lies in a transmission region of composite transmission curve 1155-X. Curve 1300-2 depicts the value of a "full-width-half-max" ("FWHM") of the tunable band-pass filter 906 as a function of the angle of incidence (based upon the designs of Tables 1 and 2).

As compared with the corresponding graphs 500-1 and 500-2 associated with prior art filter 100, the curve 1300-2 (which depicts a set of FWHM values of s-polarized light as a function of the angle-of-incidence) exhibits a region of non-normal angle of incident values with a minimum—that is, there is a region of non-normal angle of incident values where the first derivative of the curve 1300-2, describing the FWHM as a function of angle-of-incidence values greater than zero degrees and less than sixty degrees, goes from the negative value of the prior art curve 500-2, to a value that is substantially zero (or is otherwise substantially flat), and then to values that are substantially positive (i.e., the region between 40-50 degrees in curve 1300-2). Moreover, the second derivative of the curve 1300-2, describing the FWHM as a function of angle-of-incidence values greater than zero degrees and less than sixty degrees, is substantially zero as the first derivative of the FWHM curve changes sign from negative to positive values in the region of non-normal angle of incidence values. As used herein, the term "angle of incidence" is used exclusively to refer to positive angle-of-incidence values (rather than angle-of-incidence values than might extend to the left of the "0 degrees" axes in FIGS. 5 and 13, for example).

As can be derived from the curves 1300-1 and 1300-2 in FIG. 13, between the angle-of-incidence values of 30 degrees and 50 degrees, the center wavelength value changes from approximately 625 nm to approximately 480 nm. In this same interval (i.e., between 30 degrees and 50 degrees angle-of-incidence), the FWHM value (as depicted in curve 1300-2) varies by less than approximately 10%. Over a larger interval (i.e., between 25 degrees and 50 degrees angle-of-incidence) the FWHM value varies by less than approximately 20%.

Figure 14:
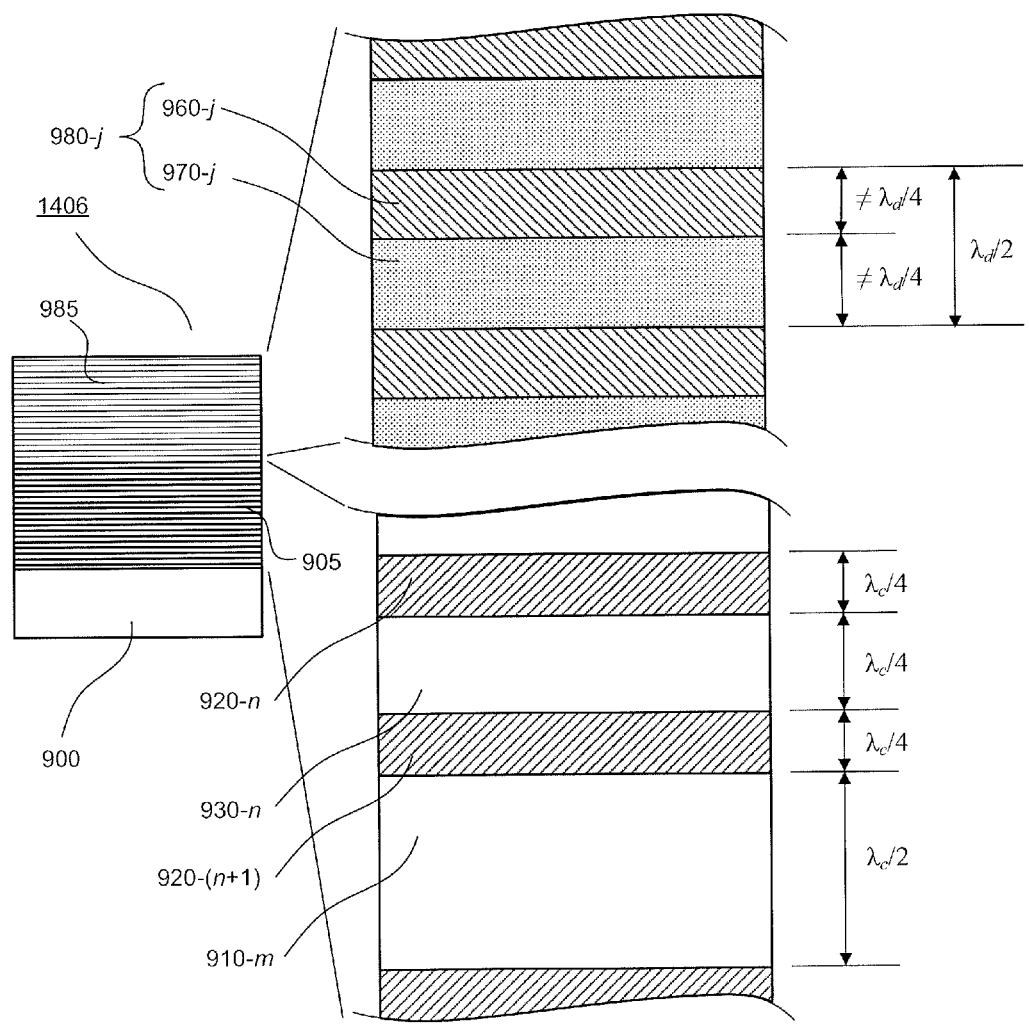
FIG. 14 depicts another filter that includes both a short-wave pass filter with a plurality of mismatched layer pairs and a multi-cavity band-pass filter consistent with the disclosure.

As depicted in FIG. 9, the substrate 900 can lie between the short wave pass filter 985 and the multi-cavity band-pass filter 905. Consistent with another embodiment, and as depicted in FIG. 14, the substrate 900 can lie to one side of both the short wave pass filter 985 and the multi-cavity band-pass filter 905 to form tunable band-pass filter 1406. Moreover, although the multi-cavity band-pass filter 905 is depicted as lying between the short wave pass filter 985 and the substrate 900 in FIG. 14, the short wave pass filter 985 can also lie between the substrate 900 and the multi-cavity band-pass filter 905 consistent with the disclosure. The general effect of the substrate 900, the multi-cavity band-pass filter 905 and the short wave pass filter 985 on incident s-polarized light as depicted in FIGS. 10-13 is independent of this order of the component filters. Consequently, although a particular order is depicted in the figures for purposes of illustration, the particular arrangement of the component filters that is depicted in FIGS. 9 and 14 is not limiting.

Further still, although the embodiments associated with FIGS. 9 and 14 disclose the use of a mismatched short wave pass filter, one can also—for a suitable set of materials—use a substantially quarter-wave short wave pass filter rather than a mismatched short wave pass filter, provided that, generally, at least one material used in the quarter-wave short wave pass filter is different from the materials used in the multi-cavity band-pass filter.

Figure 15:
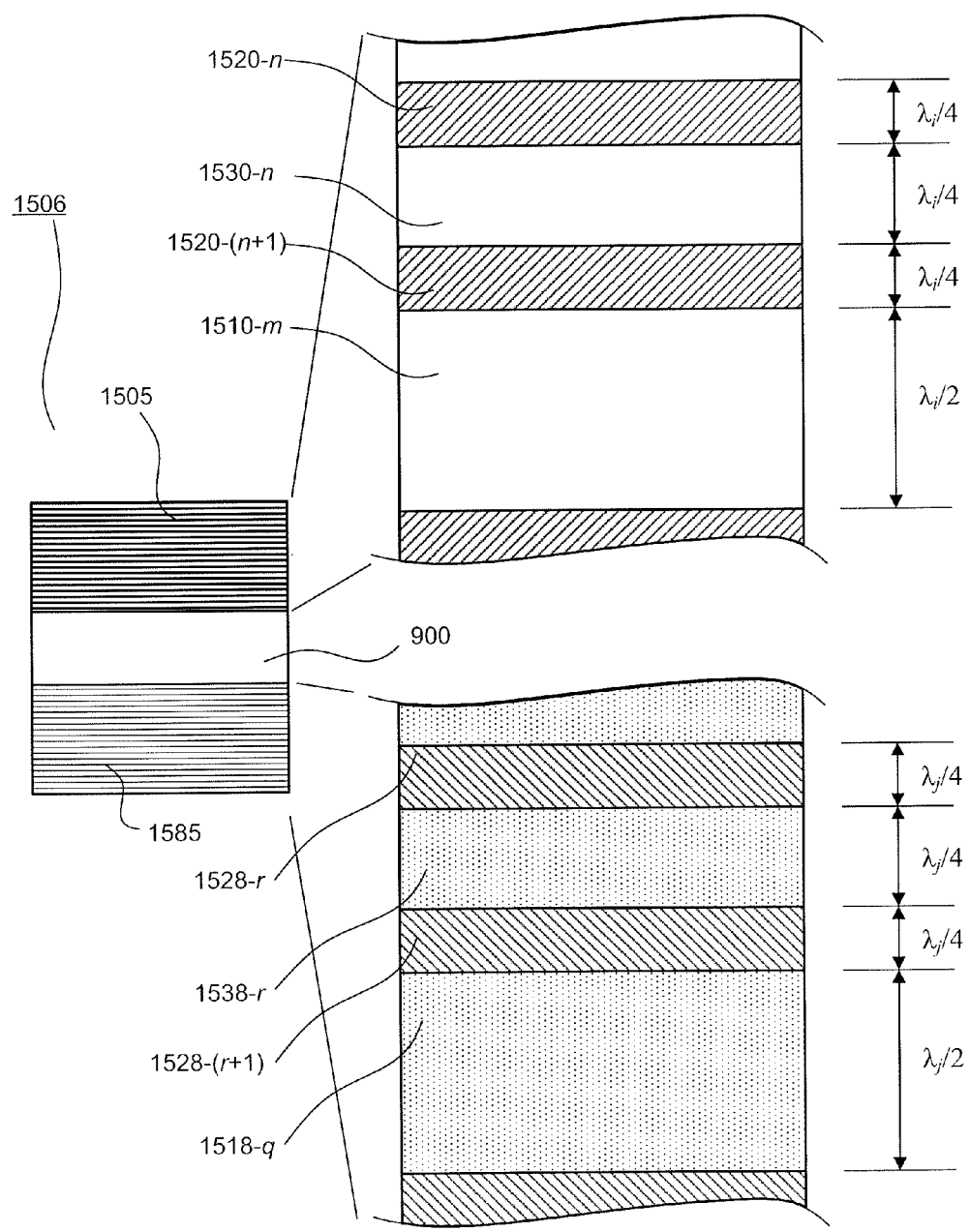
FIG. 15 depicts a filter that includes two multi-cavity band-pass filters consistent with the disclosure.

FIG. 15 depicts a further embodiment of a tunable band-pass filter 1506 consistent with this disclosure. The tunable band-pass filter 1506 includes a multi-cavity band-pass filter 1505, a substrate 900, and a multi-cavity band-pass filter 1585.

The multi-cavity band-pass filter 1505 includes a half-wave cavity layer 1510-$m$, which is adjacent to a quarter-wave layer 1520-($n$+1), which is adjacent to a quarter-wave layer 1530-$n$, which is adjacent to a quarter-wave layer 1520-$n$, etc. As with FIGS. 9 and 14, the variables "n" and "in" as used in connection with FIG. 15 can be integers. For example, the suffix "n" can correspond to an "nth" repeated quarter-wave layer adjacent to (or "below") a similar quarter-wave layer (n−1). The suffix "m" can correspond to an "mth" repeated cavity layer. The reference wavelength associated with the multi-cavity band-pass filter 1505 in FIG. 15 is $\lambda_i$. Accordingly, the optical thickness of each quarter-wave layer is approximately $(2z+1)(\frac{1}{4} \lambda_i)$ (where z can be 0, 1, 2, . . . ) and the optical thickness of each cavity layer is approximately $\frac{1}{2} \lambda_i$ (or an integer multiple of approximately $\frac{1}{2} \lambda_i$). As indicated by the hash-fill in the drawing, the material of the quarter-wave layer 1520-$n$ in the depicted example can be the same as the material of the quarter-wave layer 1520-($n$+1). Furthermore, the material of the half-wave cavity layer 1510-$m$ in the depicted example can be the same as the material of the quarter-wave layer 1530-$n$.

The multi-cavity band-pass filter 1585 includes a half-wave cavity layer 1518-$q$, which is adjacent to a quarter-wave layer 1528-($r$+1), which is adjacent to a quarter-wave layer 1538-$r$, which is adjacent to a quarter-wave layer 1528-$r$, etc. The variables "q" and "r" as used in connection with FIG. 15 can be integers. For example, the suffix "r" can correspond to an "rth" repeated quarter-wave layer adjacent to (or "below") a similar quarter-wave layer ($r$−1). The suffix "q" can correspond to a "qth" repeated cavity layer. The reference wavelength associated with the multi-cavity band-pass filter 1585 in FIG. 15 is $\lambda_j$. Accordingly, the optical thickness of each quarter-wave layer is approximately $(2z+1)(\frac{1}{4}\lambda_j)$ (where z can be 0, 1, 2, . . . ), and the optical thickness of each cavity layer is approximately $\frac{1}{2}\lambda_j$ (or an integer multiple of approximately $\frac{1}{2}\lambda_j$). As indicated by the fill in the drawing, the material of the quarter-wave layer 1528-$r$ in the depicted example can be the same as the material of the quarter-wave layer 1528-($r$+1). Furthermore, the material of the half-wave cavity layer 1518-$q$ in the depicted example can be the same as the material of the quarter-wave layer 1538-$r$. Further still, the material of any half-wave cavity layer 1518-$t$, any quarter-wave layer 1528-$u$, and any quarter-wave layer 1538-$v$ can be different from any of the material of any half-wave cavity layer 1510-$x$, any quarter-wave layer 1520-$y$, and any quarter-wave layer 1530-$w$, where "t," "u," "v," "x," "y," and "w" can take on any integer value. A further design constraint associated with the multi-cavity band-pass filter 1585 will be discussed in connection with FIGS. 16-18.

Figure 16:
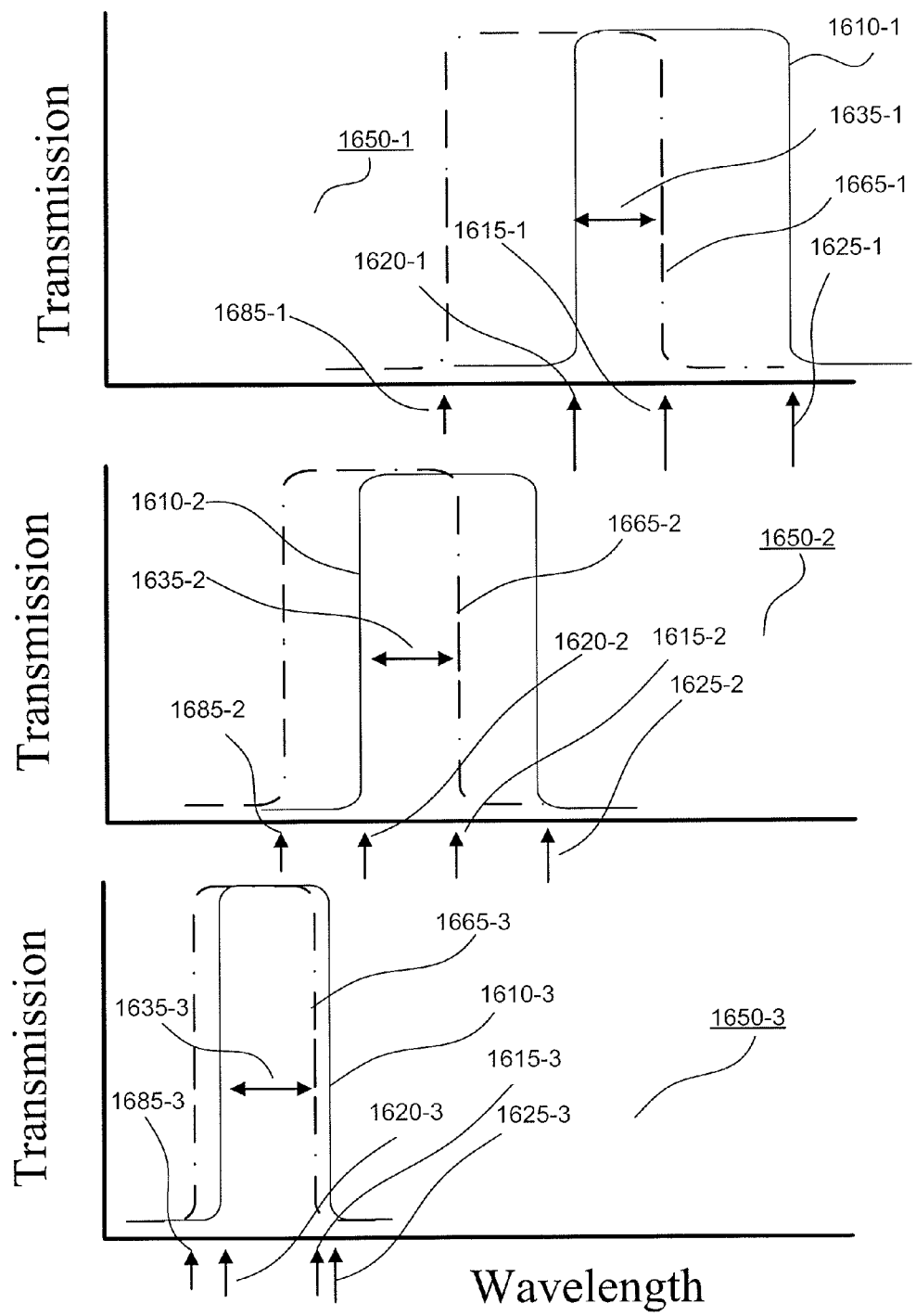
FIG. 16 depicts exemplary transmission curves for s-polarized light as a function of angle, where the s-polarized light is incident on the filter of FIG. 15.

FIG. 16 depicts a set of exemplary transmission curves 1610-1, 1610-2, and 1610-3 associated with the multi-cavity band-pass filter 1505 for s-polarized light, and transmission curves 1665-1, 1665-2, and 1665-3 associated with the multi-cavity band-pass filter 1585 for s-polarized light. Each transmission curve 1610-X (where "X" can take on the values of "1," "2," and "3") has an associated cut-on wavelength 1620-X and a cut-off wavelength 1625-X. In addition, each transmission curve 1665-X (where "X" can take on the values of "1," "2," and "3") has an associated cut-on wavelength 1685-X and a cut-off wavelength 1615-X. Together, the pair of curves 1610-X and 1665-X represent the overall transmission of the structure that includes both the multi-cavity band-pass filter 1505 and the multi-cavity band-pass filter 1585. Accordingly, the pair of curves 1610-X and 1665-X, together, represent the overall transmission of the tunable band-pass filter 1506. Where a cut-off edge of a first multi-cavity band-pass filter is configured to lie in a transmission region of a second band-pass filter, the transmission region of the combined filter will acquire the cut-off edge of the first multi-cavity band-pass filter. Accordingly, the pair of curves 1610-X and 1665-X, together, will have an associated FWHM value 1635-X approximately bound by the larger of the cut-on wavelength 1620-X of the multi-cavity band-pass filter 1505 and the cut-on wavelength 1685-X of the multi-cavity band-pass filter 1585, and approximately the smaller of the cut-off wavelength 1625-X of the multi-cavity band-pass filter 1505 and the cut-off wavelength 1615-X of the multi-cavity band-pass filter 1585. Consequently, the FWHM value 1635-X can be less than or equal to the overall transmission width of the curve 1610-X and it can be less than or equal to the overall transmission width of the curve 1665-X.

Graph 1650-1 in FIG. 16 depicts exemplary transmission curves 1610-1 and 1665-1 for s-polarized light where incident s-polarized light strikes the tunable band-pass filter 1506 at normal incidence. The pair of transmission curves 1610-1 and 1665-1 depict a cut-on wavelength 1620-1 and a cut-off wavelength 1615-1 and a FWHM value 1635-1.

Graph 1650-2 depicts exemplary transmission curves 1610-2 and 1665-2 for s-polarized light where incident s-polarized light strikes the tunable band-pass filter 1506 at between normal incidence and approximately 60 degrees from normal incidence. The pair of transmission curves 1610-2 and 1665-2 depict a cut-on wavelength 1620-2 and a cut-off wavelength 1615-2 and a FWHM value 1635-2.

Graph 1650-3 depicts exemplary transmission curves 1610-3 and 1665-3 for s-polarized light where incident s-polarized light strikes the tunable band-pass filter 1506 at approximately 60 degrees from normal incidence. The pair of transmission curves 1610-3 and 1665-3 depict a cut-on wavelength 1620-3 and a cut-off wavelength 1615-3 and a FWHM value 1635-3.

As depicted in FIG. 16, and consistent with FIGS. 3-5, and 10, the transmission curves 1610-X and 1665-X for s-polarized light can change as the angle of incidence progresses between approximately normal angle of incidence and approximately 60 degrees angle of incidence. One general feature that can change is that the separation between the cut-on wavelength 1620-X and the cut-off wavelength 1625-X (and the separation between the cut-on wavelength 1685-X and the cut-off wavelength 1615-X) will tend to narrow as the angle of incidence progresses from approximately normal to approximately 60 degrees from normal. Because of the tendency of the separation between the cut-on wavelength 1620-X and the cut-off wavelength 1625-X to narrow as the angle of incidence increases, the "rate" (as a function of angle of incidence) of the tendency of the cut-off wavelength 1625-X to shift to lower wavelengths is "higher" than the "rate" (as a function of angle of incidence) of the tendency of the cut-on wavelength 1620-X to shift to lower wavelengths.

Consistent with this disclosure, the multi-cavity band-pass filter 1585 can be configured such that the "rate" (as a function of angle of incidence) of the tendency of the cut-off wavelength 1615-X to shift to lower wavelengths more closely matches the "rate" (as a function of angle of incidence) of the tendency of the cut-on wavelength 1620-X to shift to lower wavelengths. By placing the cut-off wavelength 1615-1 at normal incidence of the multi-cavity band-pass filter 1585 within the pass-band of the multi-cavity filter 1505 at normal incidence (i.e., by placing the cut-off wavelength 1615-1 between the cut-on wavelength 1620-1 and the cut-off wavelength 1625-1, as depicted in FIG. 16), then there will be a range of angles of incidence over which the overall transmission width (represented by the FWHM value 1635-X) is relatively constant.

Figure 17:
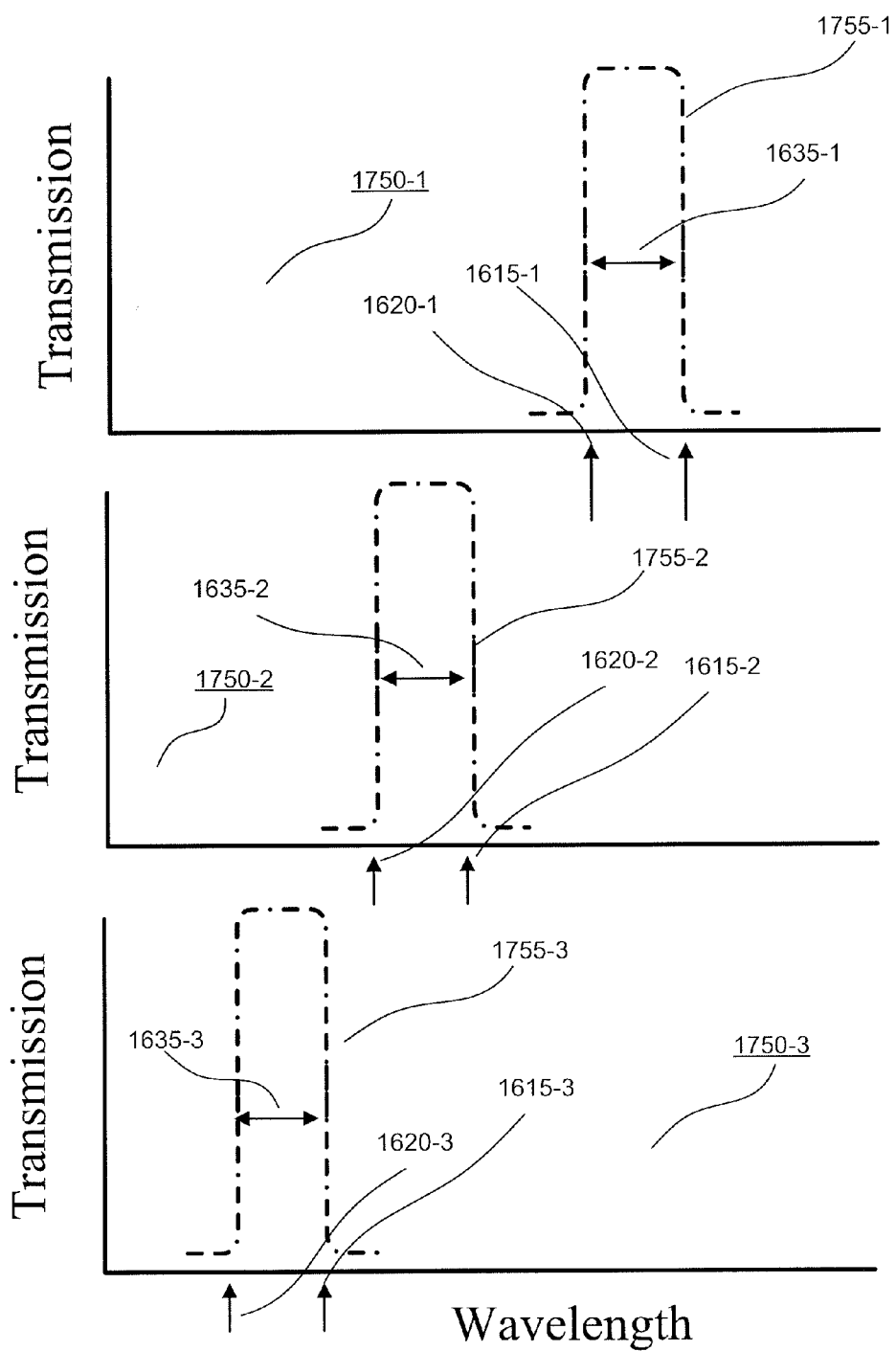
FIG. 17 depicts exemplary composite transmission curves for s-polarized light as a function of angle, where the s-polarized light is incident on the filter of FIG. 15.
Figure 18:
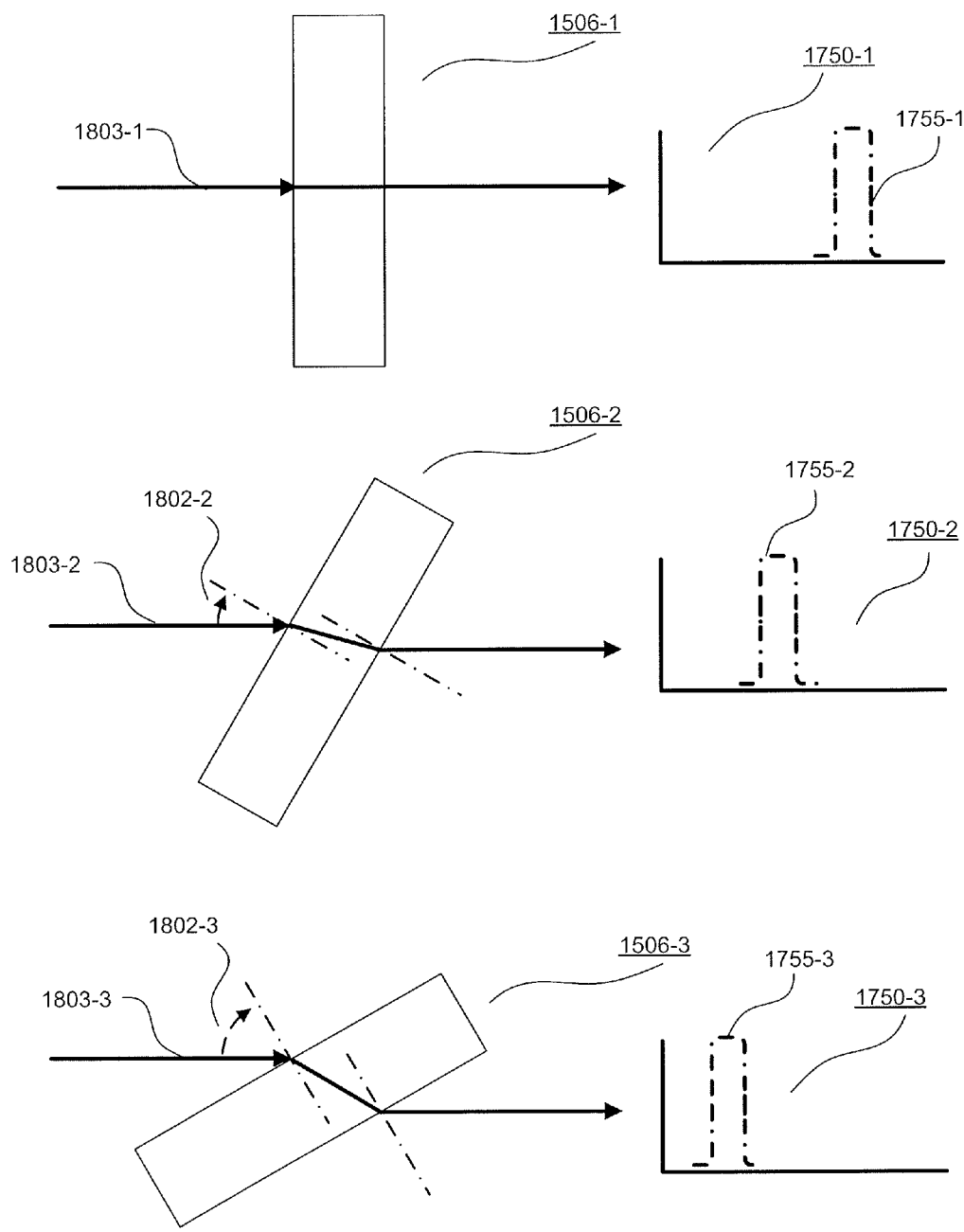
FIG. 18 depicts the exemplary composite transmission curves for s-polarized light as a function of angle of FIG. 17, where the s-polarized light is depicted as incident on the filter of FIG. 15 at three different angles-of-incidence.

This is further illustrated in FIGS. 17 and 18, where composite transmission curve 1755-X represents the combination of transmission curve 1610-X and transmission curve 1665-X. Consistent with this disclosure, the tunable band-pass filter 1506 can be configured to provide a range of transmission pass-bands with a relatively constant width for s-polarized light as a function of the angle of incidence.

Graph 1750-1 in FIGS. 17 and 18 depicts exemplary composite transmission curve 1755-1 for s-polarized light where the incident s-polarized light 1803-1 strikes the tunable band-pass filter 1506-1 at normal incidence. The composite transmission curve 1755-1 depicts the cut-on wavelength 1620-1 and the cut-off wavelength 1615-1 and a FWHM value 1635-1.

Graph 1750-2 in FIGS. 17 and 18 depicts exemplary composite transmission curve 1755-2 for s-polarized light where the incident s-polarized light 1803-2 strikes the tunable band-pass filter 1506-2 at an angle of incidence 1802-2 between normal incidence and approximately 60 degrees from normal incidence. The composite transmission curve 1755-2 depicts the cut-on wavelength 1620-2 and the cut-off wavelength 1615-2 and a FWHM value 1635-2.

Graph 1750-3 in FIGS. 17 and 18 depicts exemplary composite transmission curve 1755-3 for s-polarized light where the incident s-polarized light 1803-3 strikes the tunable band-pass filter 1506-3 at an angle of incidence 1802-3 approximately 60 degrees from normal incidence. The composite transmission curve 1755-3 depicts the cut-on wavelength 1620-3 and the cut-off wavelength 1615-3 and a FWHM value 1635-3.

As discussed above in connection with FIGS. 17 and 18, and consistent with this disclosure, the multi-cavity band-pass filter 1505 and the multi-cavity band-pass filter 1585 have been configured to provide a substantially constant difference value 1635-X as a function of the changing angle of incidence 1802-X and a changing center wavelength. In a further embodiment consistent with this disclosure, a multi-cavity band-pass filter and another multi-cavity band-pass filter can be configured to provide a set of FWHM values that can vary as a function of the changing angle of incidence 1802-X. For example, a multi-cavity band-pass filter and another multi-cavity band-pass filter can be configured to provide a tunable filter with a set of FWHM values that substantially increase as a function of increasing angle of incidence 1802-X and decreasing center wavelength (rather than the set of FWHM values 1635-X that remain substantially constant as a function of increasing angle of incidence 1802-X and decreasing center wavelength). For example, the "rate" at which the cut-off wavelength 1665-X changes as a function of a changing angle-of-incidence can be "slower" than the "rate" at which the cut-off wavelength 1625-X changes as a function of the changing angle-of-incidence—while maintaining sufficient separation between the cut-on wavelength 1685-X and the cut-on wavelength 1620-X.

Figure 19:
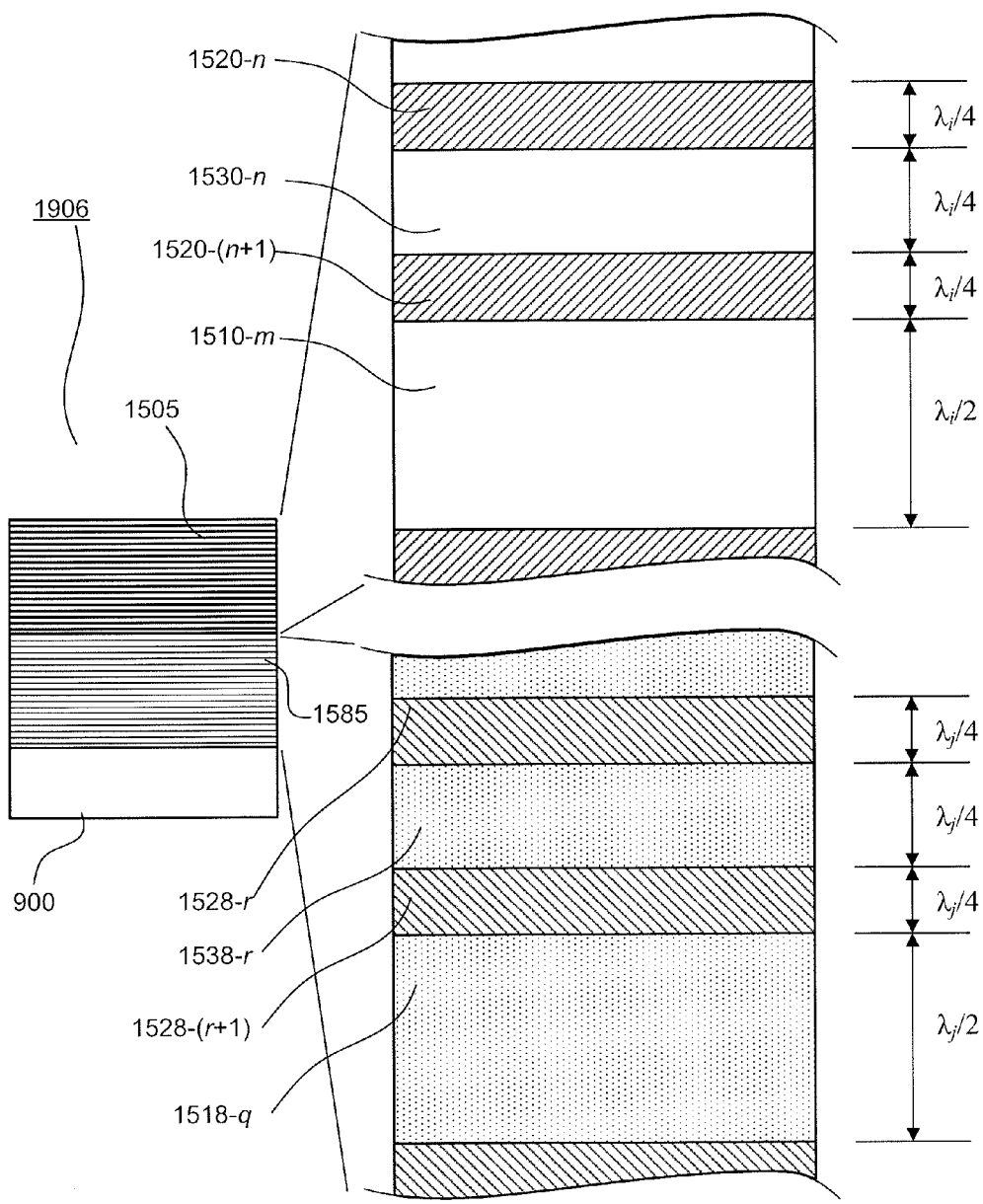
FIG. 19 depicts another filter that includes two multi-cavity band-pass filters consistent with the disclosure.

As depicted in FIG. 15, the substrate 900 can lie between the multi-cavity band-pass filter 1585 and the multi-cavity band-pass filter 1505. Consistent with another embodiment, and as depicted in FIG. 19, the substrate 900 can lie to one side of both the multi-cavity band-pass filter 1585 and the multi-cavity band-pass filter 1505 to form tunable band-pass filter 1906. Moreover, although the multi-cavity band-pass filter 1585 is depicted as lying between the multi-cavity band-pass filter 1505 and the substrate 900 in FIG. 19, the multi-cavity band-pass filter 1505 can also lie between the substrate 900 and the multi-cavity band-pass filter 1585 consistent with the disclosure. In an embodiment, the general effect of the substrate 900, the multi-cavity band-pass filter 1505 and the multi-cavity band-pass filter 1585 on incident light is independent of this order of the component filters. Consequently, although a particular order is depicted in FIGS. 15 and 19 for purposes of illustration, the arrangement of the component filters depicted in the figures is not limiting. Consistent with this disclosure, the material of quarter-wave layer 1520-t, quarter-wave layer 1530-u, half-wave cavity layer 1510-v, quarter-wave layer 1528-x, quarter-wave layer 1538-y, and half-wave cavity layer 1518-w (where "t," "u," "v," "x," "y," and "w" can be any integer) can be selected from any of the following materials: $Ta_2O_5$; $Nb_2O_5$; $TiO_2$; $SiO_2$; $Al_2O_3$; $HfO_2$; and/or any other suitable material.

Figure 20:
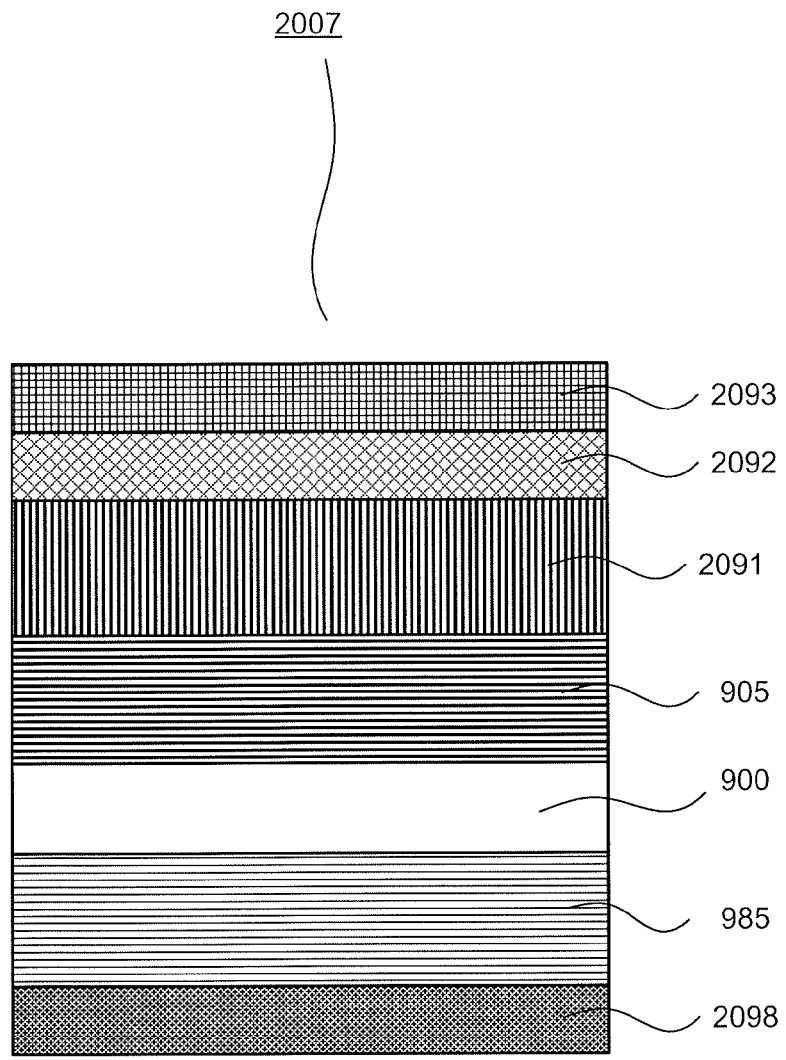
FIG. 20 depicts another tunable band-pass filter that includes a short-wave pass filter with a plurality of mismatched layer pairs, and a multi-cavity band-pass filter consistent with the disclosure; the tunable band-pass filter of FIG. 20 also includes a chirped long-wave pass filter, a mismatched long-wave pass filter, a shifted multi-cavity band-pass filter, and a chirped short-wave pass filter.
Figure 21:
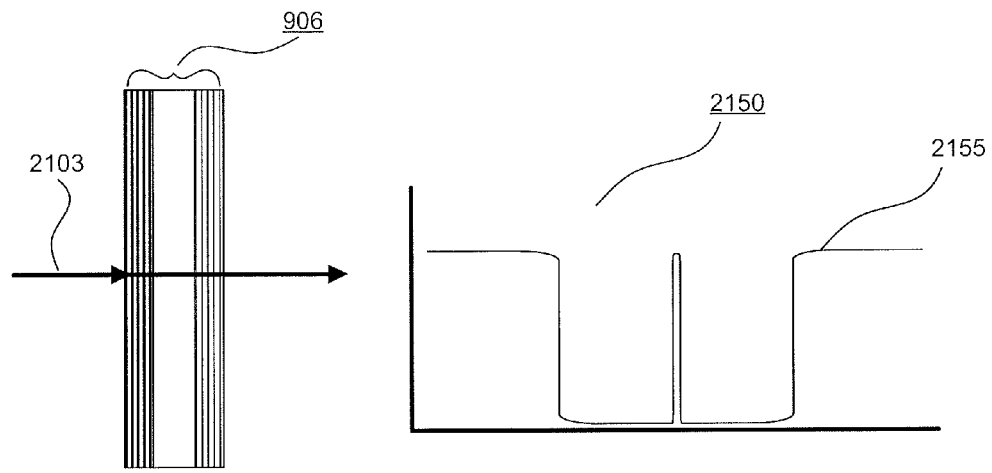
FIG. 21 depicts a transmission curve associated with the short-wave pass filter with a plurality of mismatched layer pairs and the multi-cavity band-pass filter components of FIG. 20.

Consistent with a further embodiment, FIG. 20 depicts a tunable band-pass filter 2007, which can include the substrate 900, the multi-cavity band-pass filter 905, and the short wave pass filter 985. The tunable band-pass filter 2007 can also include a chirped long-wave pass filter 2093, a mismatched long-wave pass filter 2092, and a shifted multi-cavity band-pass filter 2091. Further still, the tunable band-pass filter 2007 can include a chirped short-wave pass filter 2098. Where the substrate 900, the multi-cavity band-pass filter 905, and the short wave pass filter 985 make up the tunable filter 906 of FIG. 8, graph 2150 of FIG. 21 depicts a transmission curve 2155 of s-polarized light associated with incident s-polarized light 2103 on the tunable filter 906 at normal incidence over a large wavelength range. FIGS. 22-26 depict the additive effect of the remaining filter components of FIG. 20.

Figure 22:
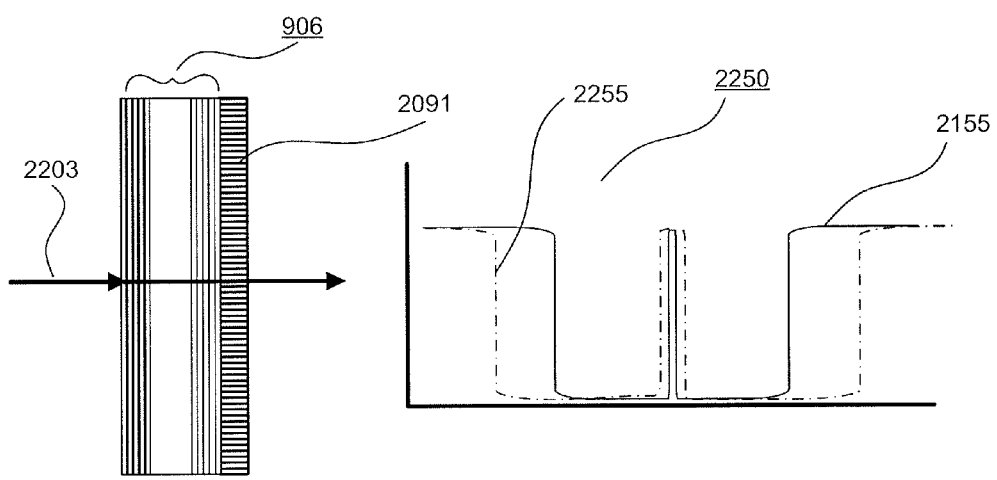
FIG. 22 depicts a transmission curve associated with the short-wave pass filter with a plurality of mismatched layer pairs and the multi-cavity band-pass filter components of FIG. 18, as well as the shifted multi-cavity band-pass filter of FIG. 20.

For example, graph 2250 of FIG. 22 depicts transmission curve 2255 associated with the s-polarized transmission of incident s-polarized light 2203 on the combination of the tunable filter 906 and the shifted multi-cavity band-pass filter 2091 of FIG. 20. Relative to the transmission curve 2155 of FIG. 21, the transmission curve 2255 can provide additional blocking of s-polarized light immediately outside the stop bands associated with the tunable filter 906.

Figure 23:
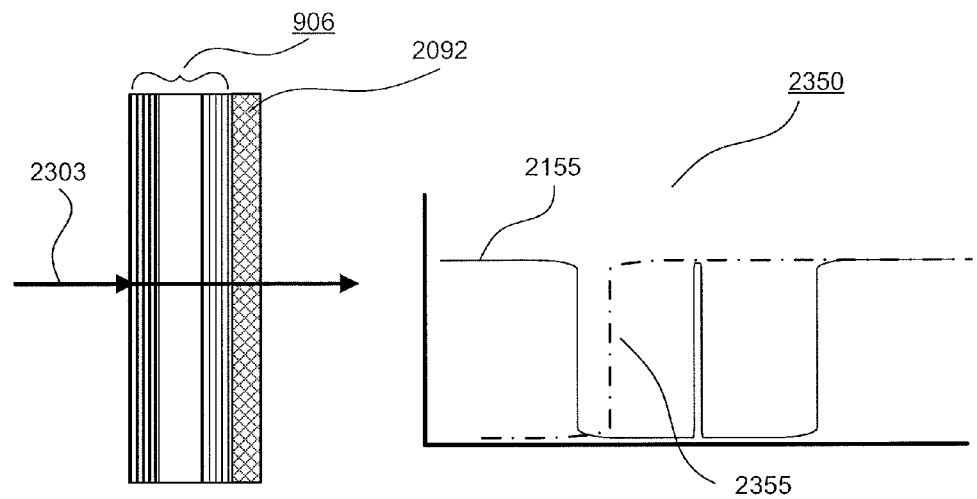
FIG. 23 depicts a transmission curve associated with the short-wave pass filter with a plurality of mismatched layer pairs and the multi-cavity band-pass filter components of FIG. 18, as well as the mismatched long-wave pass filter of FIG. 20.

Graph 2350 of FIG. 23 depicts transmission curve 2355 associated with the s-polarized transmission of incident s-polarized light 2303 on the combination of the tunable filter 906 and the mismatched long-wave pass filter 2092 of FIG. 20. Consistent with this disclosure and this embodiment, mismatch can be used as described with reference to FIGS. 6-8 as a means of adjusting a rate of change of a long-wave-pass edge wavelength with respect to the angle of incidence of light on the filter. Relative to the transmission curve 2155 of FIG. 21, the transmission curve 2355 can provide additional intermediate-range blocking of s-polarized light on the short wavelength side of the transmission curves 1155-X (of FIG. 11) associated with the tunable filter 906.

Figure 24:
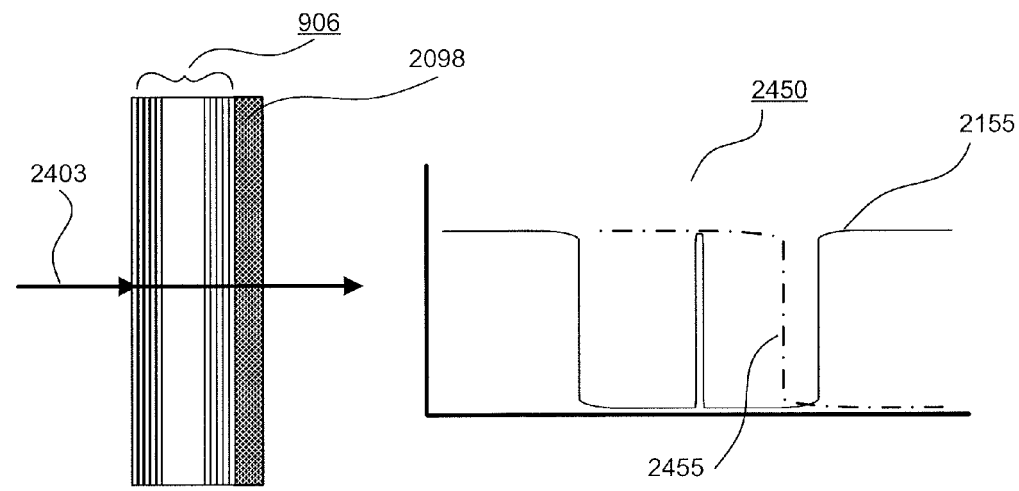
FIG. 24 depicts a transmission curve associated with the short-wave pass filter with a plurality of mismatched layer pairs and the multi-cavity band-pass filter components of FIG. 18, as well as the chirped short-wave pass filter of FIG. 20.

Graph 2450 of FIG. 24 depicts transmission curve 2455 associated with the s-polarized transmission of incident s-polarized light 2403 on the combination of the tunable filter 906 and the chirped short-wave pass filter 2098 of FIG. 20. Relative to the transmission curve 2155 of FIG. 21, the transmission curve 2455 can provide additional blocking of s-polarized light on the long wavelength side of the transmission curves 1155-X (of FIG. 11) associated with the tunable filter 906.

Figure 25:
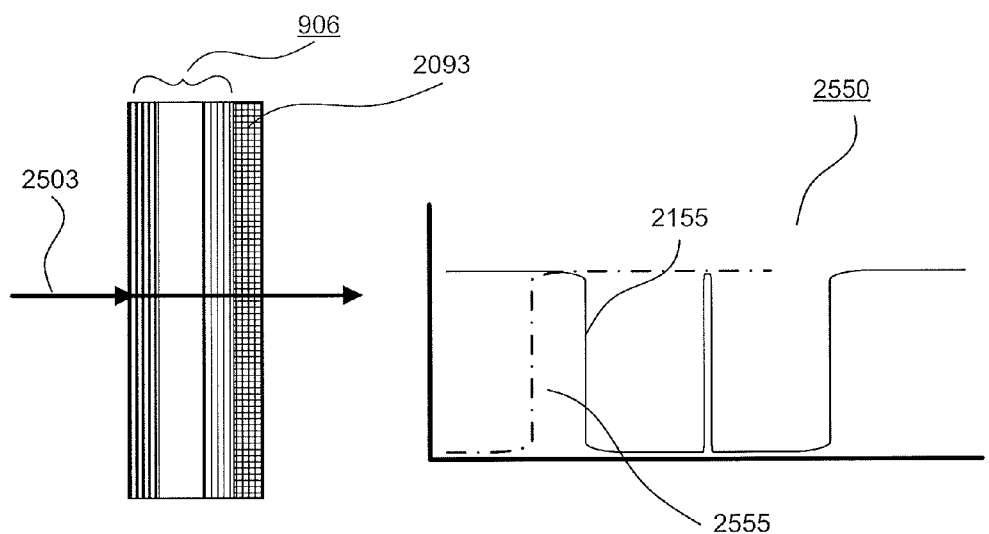
FIG. 25 depicts a transmission curve associated with the short-wave pass filter with a plurality of mismatched layer pairs and the multi-cavity band-pass filter components of FIG. 18, as well as the chirped long-wave pass filter of FIG. 20.

Graph 2550 of FIG. 25 depicts transmission curve 2555 associated with the s-polarized transmission of incident s-polarized light 2503 on the combination of the tunable filter 906 and the chirped long-wave pass filter 2093 of FIG. 20. Relative to the transmission curve 2155 of FIG. 21, the transmission curve 2555 can provide additional blocking of s-polarized light on the short wavelength side of the transmission curves 1155-X (of FIG. 11) associated with the tunable filter 906, at wavelengths furthest away from the passband.

Figure 26:
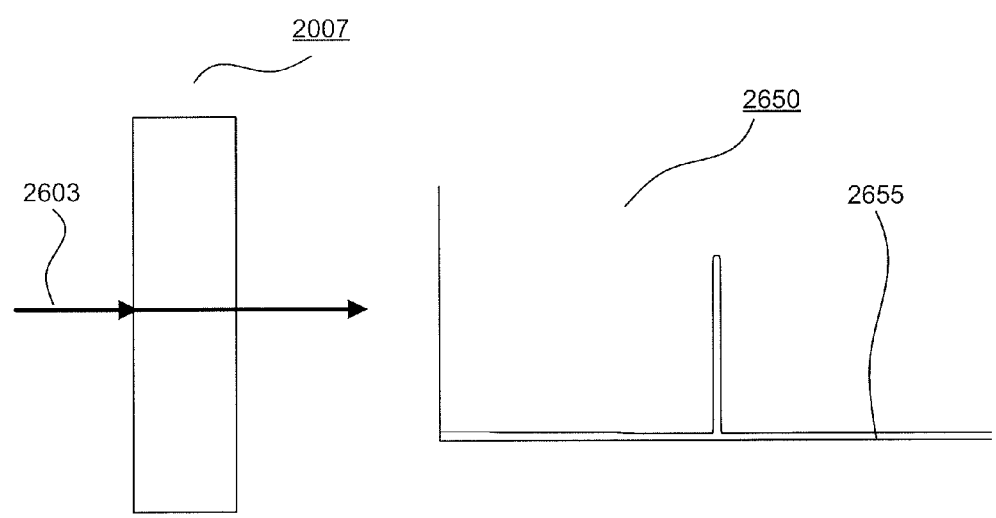
FIG. 26 depicts a composite transmission curve associated with the short-wave pass filter with a plurality of mismatched layer pairs and the multi-cavity band-pass filter components of FIG. 20, as well as the chirped long-wave pass filter, the chirped short-wave pass filter, the mismatched long-wave pass filter, and the shifted multi-cavity band-pass filter of FIG. 20.

Furthermore, graph 2650 of FIG. 26 depicts composite transmission curve 2655 associated with the s-polarized transmission of incident s-polarized light 2603 on the tunable band-pass filter 2007 of FIG. 20, which includes the additive effect of the transmission curves 2155, 2255, 2355, 2455, and 2555.

Figure 27:
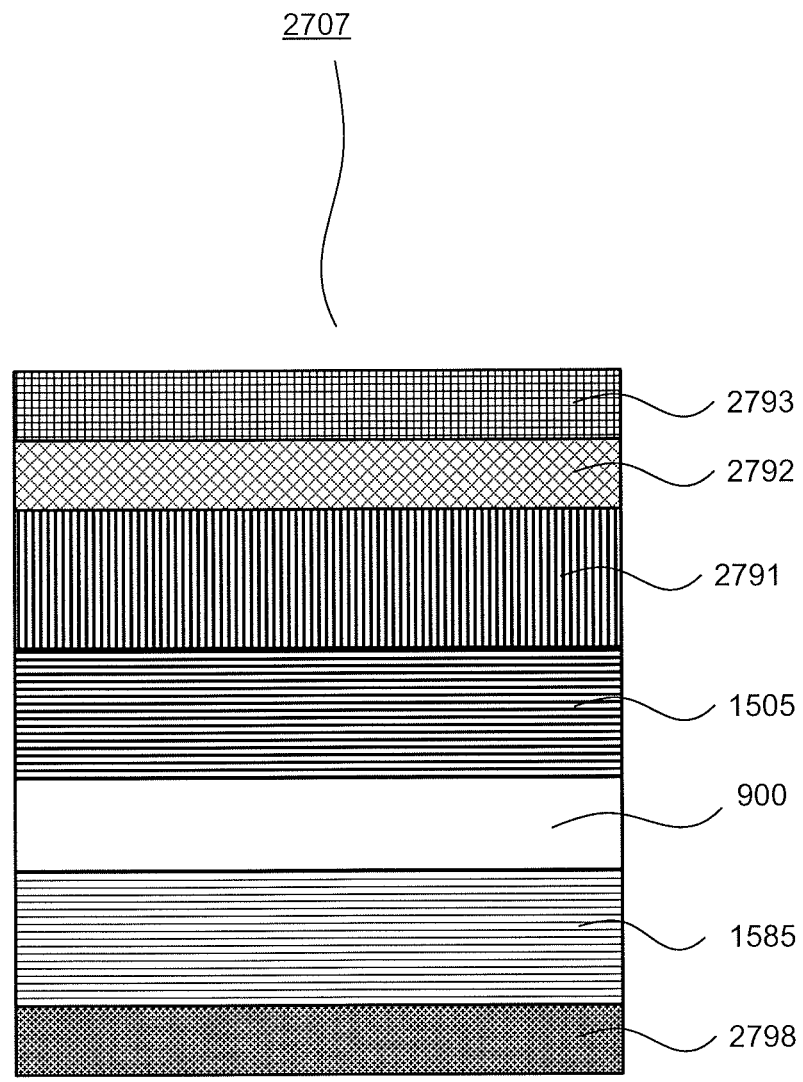
FIG. 27 depicts another tunable filter that includes two multi-cavity band-pass filters consistent with the disclosure; the tunable band-pass filter of FIG. 27 also includes a chirped long-wave pass filter, a mismatched long-wave pass filter, a shifted multi-cavity band-pass filter, and a chirped short-wave pass filter.

FIG. 27 depicts a further tunable band-pass filter 2707, which can include the substrate 900, the multi-cavity band-pass filter 1505, and the multi-cavity band-pass filter 1585. The tunable band-pass filter 2707 can also include a chirped long-wave pass filter 2793, a mismatched long-wave pass filter 2792, and a shifted multi-cavity band-pass filter 2591. Further still, the tunable band-pass filter 2707 can include a chirped short-wave pass filter 2798. As in FIGS. 21-26, the additive effects of the filter components (i.e., the chirped long-wave pass filter 2793, the mismatched long-wave pass filter 2792, the shifted multi-cavity band-pass filter 2791, and the chirped short-wave pass filter 2798) can provide extended blocking over a larger wavelength range than the components depicted in FIG. 15. The shifted multi-cavity band-pass filter 2091, the mismatched long-wave pass filter 2092, the chirped long-wave pass filter 2093, the chirped short-wave pass filter 2098, the shifted multi-cavity band-pass filter 2791, the mismatched long-wave pass filter 2792, the chirped long-wave pass filter 2793, and the chirped short-wave pass filter 2798 can include materials be selected from any of the following: $Ta_2O_5$; $Nb_2O_5$; $TiO_2$; $SiO_2$; $Al_2O_3$; $HfO_2$; and/or any other suitable material.

Figure 28:
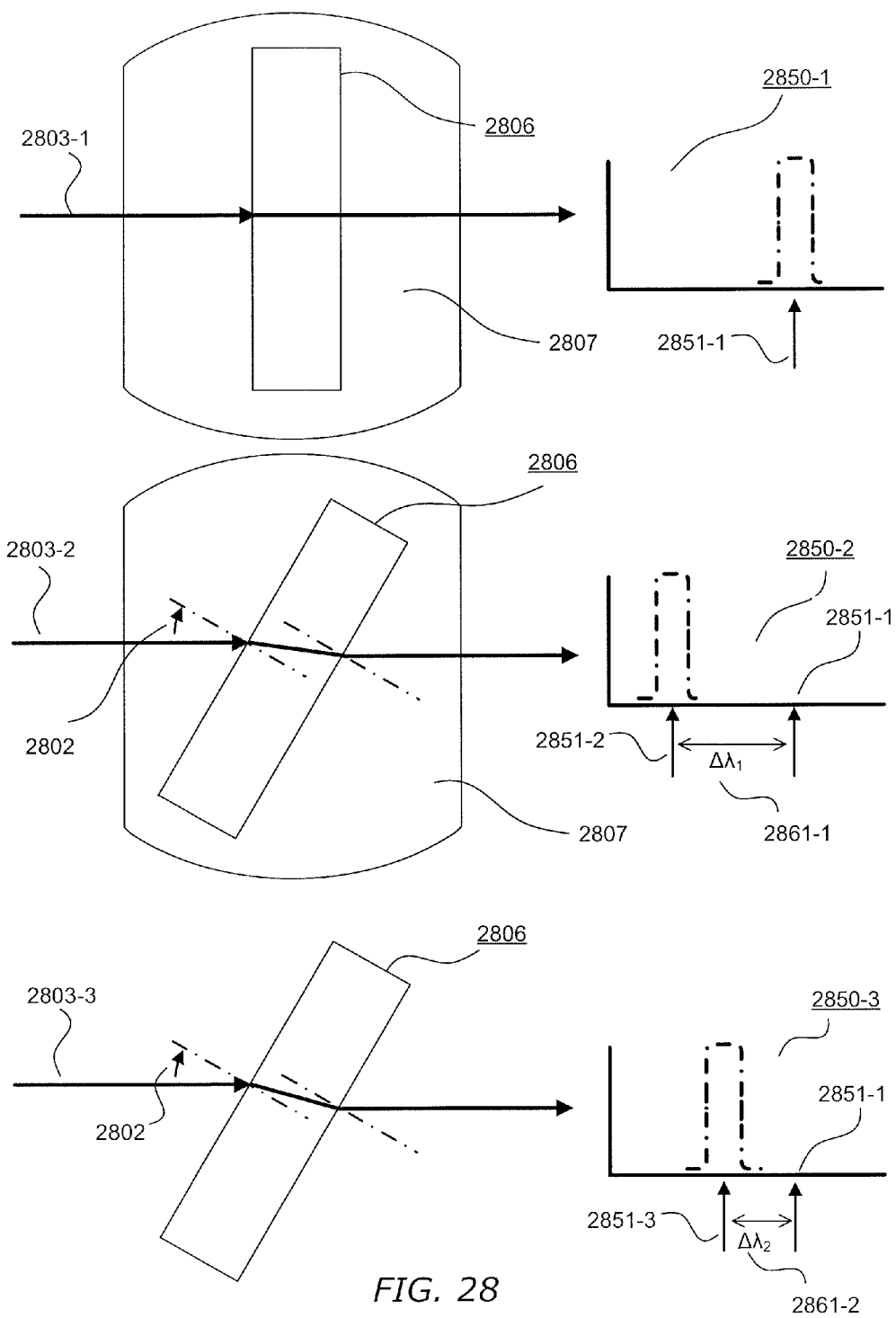
FIG. 28 depicts the effect that embedding or immersing a tunable filter consistent with the disclosure can have on the transmission curve as a function of the angle of incidence.

FIG. 28 depicts one effect associated with embedding and/or immersing a tunable filter consistent with this disclosure in a material with an index of refraction greater than that of air (i.e., an index of refraction greater than approximately 1). Specifically, FIG. 28 depicts an increase in the range of tuning where a tunable filter is immersed and/or embedded in a material (such as a liquid or glass) with an index of refraction greater than air. For example, FIG. 28 first depicts incident s-polarized light 2803-1 as striking a tunable filter 2806 at a normal angle of incidence, where a surface of the tunable filter 2806 where the incident s-polarized light 2803-1 enters or exits is flush with a medium 2807. Graph 2850-1 depicts a resulting transmission curve for s-polarized light approximately centered at wavelength 2851-1.

FIG. 28 next depicts incident light 2803-2 as striking the tunable filter 2806 at an angle of incidence 2802, where, again, the tunable filter 2806 is embedded and/or immersed in the medium 2807, such that a surface of the tunable filter 2806 where the incident s-polarized light 2803-2 enters or exits is flush with a medium 2807. Graph 2850-2 depicts a resulting transmission curve for s-polarized light approximately centered at wavelength 2851-2, which is separated from wavelength 2851-1 by a range 2861-1 given by $\Delta\lambda_1$. For comparison, FIG. 28 also depicts incident s-polarized light 2803-3 as striking the tunable filter 2806 at an angle of incidence 2802, where the tunable filter 2806 is not embedded and/or immersed in the medium 2807. (That is, a surface of the tunable filter 2806 where the incident light 2803-3 enters or exits is flush with air only.) Graph 2850-3 depicts a resulting transmission curve for s-polarized light approximately centered at wavelength 2851-3, which is separated from wavelength 2851-1 by a range 2861-2 given by $\Delta\lambda_2$, and which is less than the range 2861-1. Accordingly, when the tunable filter 2806 is embedded and/or immersed in the medium 2807, the available tuning range (represented by the value $\Delta\lambda_1$) as a function of the angle of incidence can be increased relative to the tuning range (represented by the value $\Delta\lambda_2$) over the same angle of incidence provided by the same tunable filter 2806 in air.

To understand how the tuning range 2861-1 can increase over the tuning range 2861-2, consider that Snell's Law governs the refraction of light at an interface between media of two different indexes of refraction. Accordingly, the angle-of-incidence of light within a set of thin-film coating layers can be smaller than the angle-of-incidence at the air interface with the thin-film coating layer. (That is, where a surface of a thin-film coating layer is flush with air.) For example, when light is incident upon a tunable filter at an angle-of-incidence in air of $\theta$, within the thin-film coating layers the angle will be approximately $\theta_{eff} = \sin^{-1}(\sin\theta/n_{eff})$ where $n_{eff}$ represents an effective index of refraction within the thin-film coating layers. Where an effective index of refraction within the thin-film coating layers is approximately $n_{eff} = 1.84$, and if the angle of incidence with air is $\theta = 60$ degrees, then $\theta_{eff} = 28$ degrees.

In contrast, if the air-interface to a tunable filter is replaced with an interface to a medium comprising a material other than air (such as a liquid or glass), then the angle-of-incidence within the layers can be larger, leading to a greater wavelength tuning sensitivity. For example, where the tunable filter is embedded and/or immersed in a material other than air (an "embedded geometry" such that a surface of the tunable filter where incident light enters or exits is flush with a material other than air), such as a liquid or glass, where the liquid or glass has an index of approximately n=1.5, then the angle inside the layers can be approximately $\theta_{eff} = \sin^{-1}(n\sin\theta/n_{eff})$, or $\theta_{eff} = 45$ degrees for an incident angle on a tunable filter embedded and/or immersed in glass of $\theta = 60$ degrees. The effect that such a change in the internal angle of incidence can have on a "ray" path of light is approximately depicted in FIG. 28 by the difference in the depicted paths of incident s-polarized light 2803-2 and incident s-polarized light 2803-3. A lower value of $\theta_{eff}$ (as can be associated with the path of incident s-polarized light 2803-3) can cause the path of the light to deviate more from a straight line than that where $\theta_{eff}$ has a larger value (as can be associated with the path of incident s-polarized light 2803-2).

Figure 29:
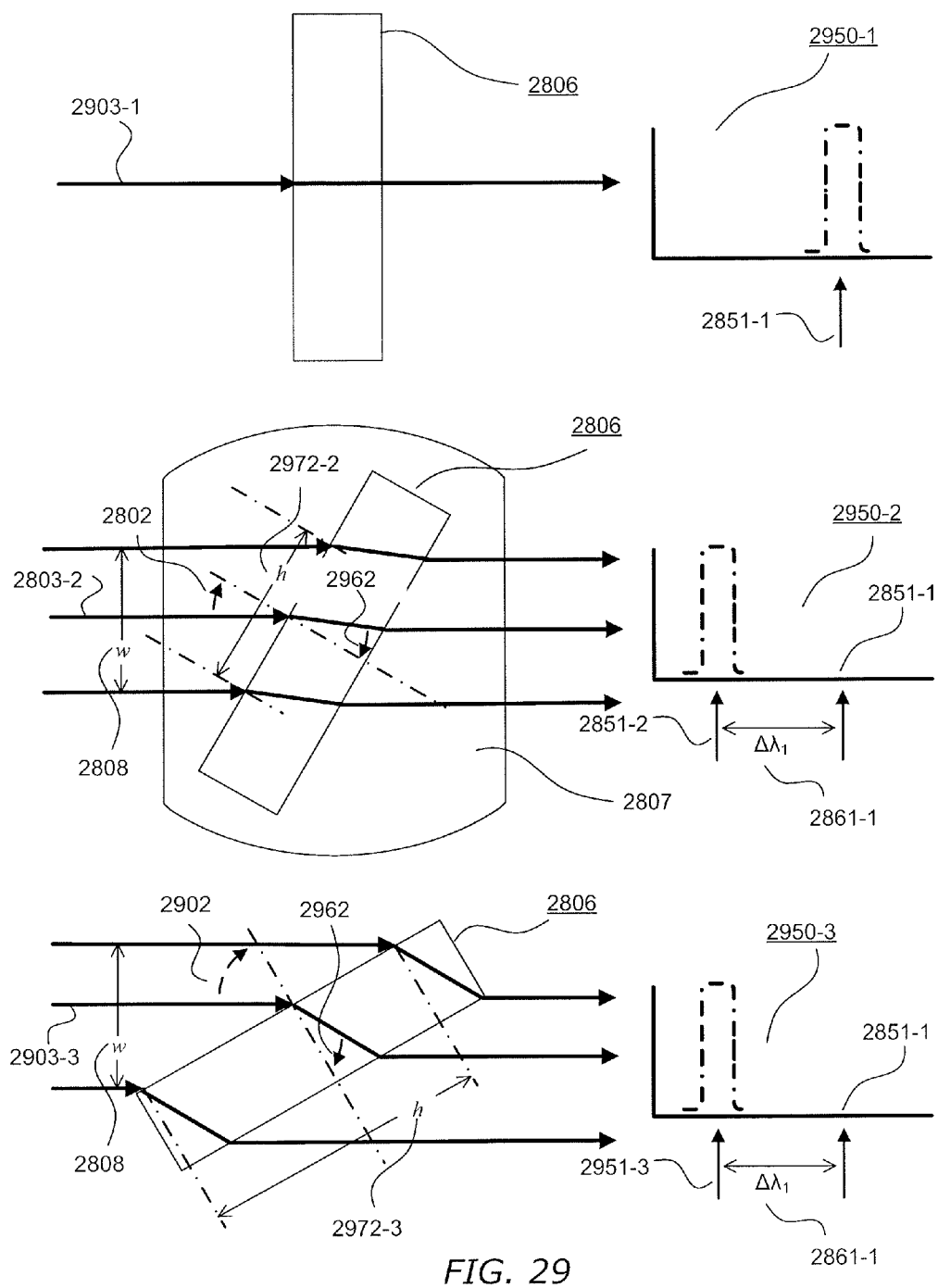
FIG. 29 depicts the effect that embedding or immersing a tunable filter consistent with the disclosure can have on the usable transmission area of the tunable filter as a function of the angle of incidence.

A further advantage of this increased sensitivity is that the tunable filter coating area does not need to be as large in the embedded and/or immersed case for a given wavelength tuning range as it does for the same coating in air on a glass plate. This latter effect is depicted in FIG. 29. FIG. 29 illustrates two systems utilizing a tunable filter 2806. In one system, the tunable filter 2806 is embedded and/or immersed in the medium 2807, and thus can require a relatively small angle of incidence 2802 to achieve a certain value of $\theta_{eff}$ (2962) and therefore achieve a tunable range 2861-1 for s-polarized light. In another system, the tunable filter 2806 is not in medium 2807, but is in air, and thus the tunable filter 2806 can require a much larger angle of incidence 2902 to achieve the same value $\theta_{eff}$ (2962) and therefore achieve the same tunable range 2861-1. In order for the tunable filter 2806 to be large enough to accommodate a beam of width w (denoted by 2808), the tunable filter 2806 will require a relatively small height h (denoted by 2972-2) when used in the system where the tunable filter 2806 is embedded and/or immersed in medium 2807. Alternatively, the tunable filter 2806 can require a larger height h (denoted by 2972-3) when used in the system where the tunable filter 2806 is not in medium 2807, but is in air. As illustrated in FIG. 29, the height is given approximately by $h = w/\sin\theta$, where $\theta$ is the angle of incidence denoted by either 2602 or 2702. Because the cost of thin-film coatings can be approximately proportional to coating area, there can be a cost advantage for an approach that uses embedded tunable filters.

Generally, when the incident medium has an index of n, the tuning dependence changes to $$\lambda(\theta) = \lambda(0)\sqrt{1 - \frac{n^2\sin^2(\theta)}{n_{eff}^2}} = \lambda(0)\sqrt{1 - \frac{\sin^2(\theta)}{(n_{eff}/n)^2}} \quad (1)$$

In other words, it is as if the effective index $n_{eff}$ has changed from $n_{eff}$ to $n_{eff}/n$. Thus, for an exemplary tunable filter a new effective index can be approximately 1.84/1.5=1.23. Consistent with an embodiment, accordingly, there can also be an increased wavelength tuning range for such an embedded geometry.

Thus, relative to a tunable filter coating in air, there can be a larger change in wavelength value for a given change in angle-of-incidence for the case of a tunable filter coating "immersed" and/or "embedded" in a liquid or glass.

Figure 30:
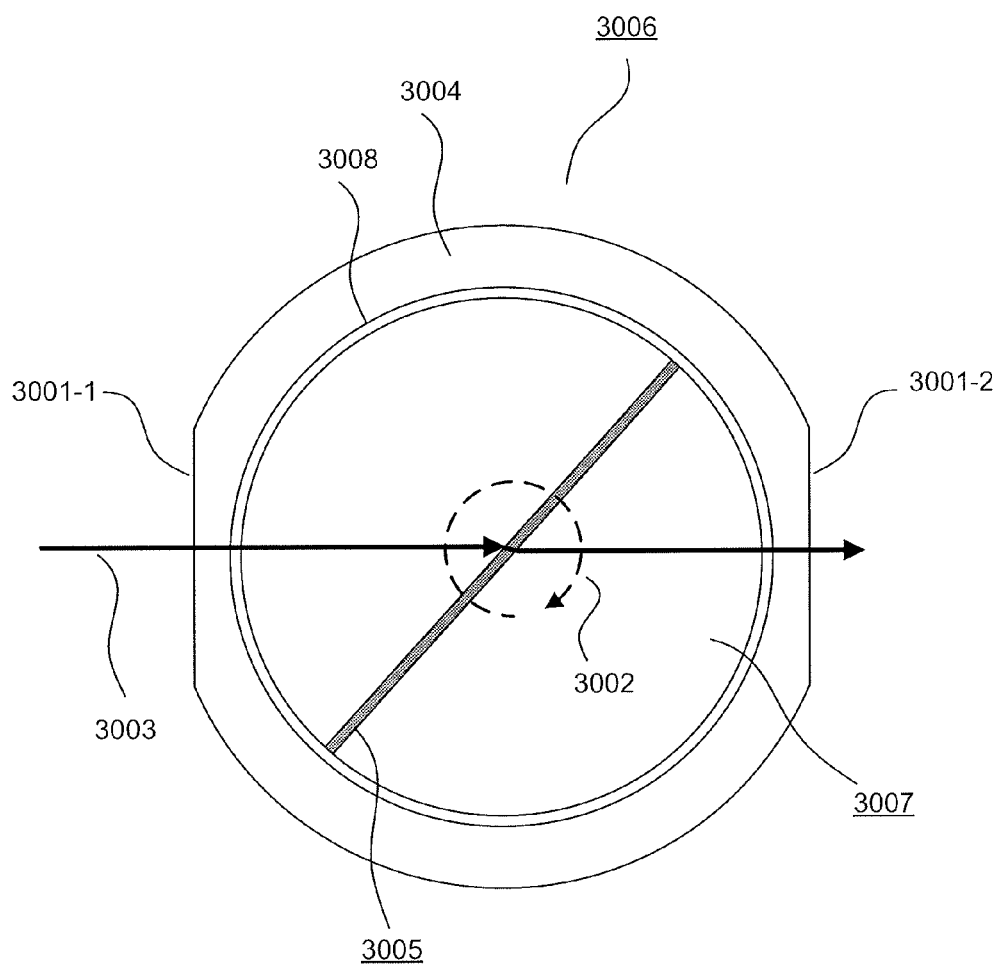
FIG. 30 depicts an embodiment of an embedded or immersed tunable filter consistent with the disclosure.

Consistent with an embodiment, FIG. 30 depicts an exemplary embedded and/or immersed tunable filter 3006. As depicted, hollow glass cylinder 3004 (shown viewed from its end) has flat faces 3001-1 and 3001-2 ground and polished as entrance and exit apertures. Glass cylinder 3007 with tunable filter 3005 (comprising a plurality of layers) applied to a flat plane bisecting the glass cylinder 3007, with a diameter just slightly smaller than the hole in the hollow glass cylinder 3008, can be made to freely rotate (at angles 3002) about its axis. This rotation can be facilitated by applying a very thin layer of index-matching oil in gap 3008. Suitable index-matching oil is available, for example, from Cargille Laboratories in Cedar Grove, N.J. Gap 3008, for example, can exhibit a width of approximately 1 mm or smaller. Consistent with an embodiment, one or both of flat faces 3001-1 and 3001-2 may be coated with anti-reflection coatings.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical filter configured to provide a wavelength-tunable pass-band to incident s-polarized electromagnetic radiation, the optical filter comprising:
   a first stack of layers; and
   a second stack of layers;
   wherein the first stack of layers comprises a plurality of quarter-wave layers and at least two half-wave cavity layers;
   wherein an optical thickness value of each quarter-wave layer in the first stack of layers is approximately an odd-integer multiple of one-fourth of a first wavelength value;
   wherein an optical thickness value of each half-wave cavity layer in the first stack of layers is approximately an integer multiple of one-half of the first wavelength value;
   wherein the first stack of layers is configured to provide a cut-on edge for s-polarized radiation incident on the first stack of layers at a second wavelength value, the second wavelength value being a function of angle-of-incidence for a set of non-normal angle-of-incidence values;
   wherein the first stack of layers is configured to provide a cut-off edge for s-polarized radiation incident on the first stack of layers at a third wavelength value, the third wavelength value being a function of angle-of-incidence for the set of non-normal angle-of-incidence values;
   wherein the third wavelength value is greater than the second wavelength value at the set of non-normal angle-of-incidence values;
   wherein the second stack of layers is configured to provide a cut-off edge for s-polarized radiation incident on the second stack of layers at a fourth wavelength value, the fourth wavelength value being a function of angle-of-incidence for the set of non-normal angle-of-incidence values;
   wherein the fourth wavelength value lies substantially between the second wavelength value and the third wavelength value at the set of non-normal angle-of-incidence values;
   wherein a pass-band determined by the second wavelength value and the fourth wavelength value has a set of associated full-width half-maximum values as a function of angle-of-incidence for the set of non-normal angle-of-incidence values, the set of associated full-width half-maximum values substantially defining at least one of: a FWHM curve as a function of angle-of-incidence and a FWHM line as a function of angle-of-incidence; and
   wherein the at least one of a FWHM curve and a FWHM line define a first derivative with respect to angle-of-incidence values at at least one angle-of-incidence value of the set of non-normal angle-of-incidence values that is at least one of:
   substantially positive and substantially zero.

2. The optical filter of claim 1,
   wherein the pass-band is configured to provide at least 80 percent transmission of incident s-polarized electromagnetic radiation for at least 90 percent of wavelength values between the second wavelength value and the fourth wavelength value at each angle-of-incidence value in the set of non-normal angle-of-incidence values.

3. The optical filter of claim 1,
   wherein the second stack of layers comprises a plurality of mismatched layer pairs;
   wherein an optical thickness value of each mismatched layer pair in the plurality of mismatched layer pairs is approximately one-half of a fifth wavelength value;
   wherein each mismatched layer pair in the plurality of mismatched layer pairs comprises a first material layer adjacent to a second material layer; and
   wherein an optical thickness value of each first material layer in each mismatched layer pair of the plurality of mismatched layer pairs is different from substantially an odd-integer multiple of one-fourth of the fifth wavelength value.

4. The optical filter of claim 1,
   wherein the second stack of layers comprises a second plurality of quarter-wave layers and at least two other half-wave cavity layers;
   wherein an optical thickness value of each quarter-wave layer in the second stack of layers is approximately an odd-integer multiple of one-fourth of a fifth wavelength value; and
   wherein an optical thickness value of each half-wave cavity layer in the second stack of layers is approximately an integer multiple of one-half of the fifth wavelength value.

5. The optical filter of claim 1, comprising:
   at least one substrate.

6. The optical filter of claim 1, comprising:
   a surface with a first normal vector at a first angle-of-incidence value to a first direction of incident s-polarized electromagnetic radiation;
   wherein the surface is configured to be flush with a medium for transmitting the incident s-polarized electromagnetic radiation, the medium configured to exhibit an index of refraction substantially different from approximately 1; and
   wherein the set of non-normal angle-of-incidence values includes the first angle-of-incidence value.

7. The optical filter of claim 1,
   wherein the first stack of layers comprises a first plurality of alternating first and second material layers;
   wherein the second stack of layers comprises a second plurality of alternating first and second material layers; and
   wherein each first material layer in the first plurality of alternating first and second material layers and each first material layer in the second plurality of alternating first and second material layers has a first refractive index value with at least a real first refractive index value that is substantially constant over a wavelength range.

8. The optical filter of claim 7,
wherein each second material layer in the first plurality of alternating first and second material layers and each second material layer in the second plurality of alternating first and second material layers has a second refractive index value with at least a real second refractive index value that is substantially constant over the wavelength range; and
wherein the real second refractive index value is different from the real first refractive index value.

9. The optical filter of claim 1,
wherein the first stack of layers is a multi-cavity band-pass filter.

10. The optical filter of claim 1,
wherein the second stack of layers comprises one other filter, the one other filter comprising at least one of: a short-wave pass filter and at least one other multi-cavity band-pass filter.

11. The optical filter of claim 1,
wherein the set of non-normal angle-of-incidence values includes angle-of-incidence values between approximately 30 degrees and approximately 50 degrees.

12. The optical filter of claim 1,
wherein the set of non-normal angle-of-incidence values includes angle-of-incidence values between approximately 25 degrees and approximately 50 degrees.

13. The optical filter of claim 1,
wherein the at least one of a FWHM curve and a FWHM line define a second derivative with respect to angle-of-incidence values that is substantially zero at at least one angle-of-incidence value of the set of non-normal angle-of-incidence values.

14. The optical filter of claim 1,
wherein each full-width half-maximum value in the set of associated full-width half-maximum values, as compared to an average FWHM value, is:
    less than or equal to approximately 120 percent of the average FWHM value; and
    greater than or equal to approximately 80 percent of the average FWHM value;
wherein the at least one of a FWHM curve and a FWHM line defines a first endpoint and a second endpoint, the first endpoint associated with a smallest angle-of-incidence value in the set of non-normal angle-of-incidence values and the second endpoint associated with a largest angle-of-incidence value in the set of non-normal angle-of-incidence values; and
wherein the average FWHM value is substantially equal to an average value of the at least one of a FWHM curve and a FWHM line between the first endpoint and the second endpoint.

15. The optical filter of claim 14,
wherein each full-width half-maximum value in the set of associated full-width half-maximum values, as compared to the average FWHM value, is:
    less than or equal to approximately 110 percent of the average FWHM value; and
    greater than or equal to approximately 90 percent of the average FWHM value.

16. The optical filter of claim 1, comprising:
an other multi-cavity band-pass filter;
wherein the other multi-cavity band-pass filter is configured to provide extended blocking of s-polarized radiation incident on the first stack of layers at wavelength values less than the second wavelength value, and is further configured to provide extended blocking of s-polarized radiation incident on the first stack of layers at wavelength values greater than the third wavelength value.

17. The optical filter of claim 1, comprising:
a plurality of short-wave-pass extended blocking layers;
wherein the plurality of short-wave-pass extended blocking layers are configured to provide extended blocking of s-polarized radiation incident on the first stack of layers at wavelength values greater than the third wavelength value.

18. The optical filter of claim 1, comprising:
a plurality of long-wave-pass extended blocking layers;
wherein the plurality of long-wave-pass extended blocking layers are configured to provide extended blocking of s-polarized radiation incident on the first stack of layers at wavelength values less than the second wavelength value.

19. An optical filter comprising:
a surface with a normal vector at an angle-of-incidence value to a direction of incident s-polarized electromagnetic radiation;
a multi-cavity band-pass filter; and
at least one other filter;
wherein the multi-cavity band-pass filter is configured to provide a tunable cut-on edge for s-polarized radiation at a first wavelength value as a function of the angle-of-incidence value;
wherein the multi-cavity band-pass filter is configured to provide a tunable cut-off edge for s-polarized radiation at a second wavelength value as a function of the angle-of-incidence value, and wherein the second wavelength value is greater than the first wavelength value;
wherein the at least one other filter is configured to provide a tunable cut-off edge for s-polarized radiation at a third wavelength value as a function of the angle-of-incidence value;
wherein, for a set of non-normal angle-of-incidence values, the third wavelength value lies substantially between the first wavelength value and the second wavelength value;
wherein a tunable pass-band determined by the first wavelength value and the third wavelength value has a set of associated full-width half-maximum values as a function of the angle-of-incidence value, the set of associated full-width half-maximum values substantially defining at least one of: a FWHM curve as a function of the angle-of-incidence value and a FWHM line as a function of the angle-of-incidence value; and
wherein the at least one of a FWHM curve and a FWHM line define a first derivative with respect to the angle-of-incidence value at at least one angle-of-incidence value of the set of non-normal angle-of-incidence values that is at least one of:
substantially positive and substantially zero.

20. The optical filter of claim 19,
wherein the at least one other filter comprises at least one of: a short-wave pass filter and at least one other multi-cavity band-pass filter.

21. The optical filter of claim 19,
wherein the surface is configured to be flush with a medium for transmitting the incident s-polarized electromagnetic radiation, the medium configured to exhibit an index of refraction substantially different from approximately 1.

22. The optical filter of claim 19,
wherein each full-width half-maximum value in the set of associated full-width half-maximum values, as compared to an average FWHM value, is:
  less than or equal to approximately 120 percent of the average FWHM value; and
  greater than or equal to approximately 80 percent of the average FWHM value;
wherein the at least one of a FWHM curve and a FWHM line defines a first endpoint and a second endpoint, the first endpoint associated with a smallest angle-of-incidence value in the set of non-normal angle-of-incidence values and the second endpoint associated with a largest angle-of-incidence value in the set of non-normal angle-of-incidence values; and
wherein the average FWHM value is substantially equal to an average value of the at least one of a FWHM curve and a FWHM line between the first endpoint and the second endpoint.

23. The optical filter of claim 22,
wherein each full-width half-maximum value in the set of associated full-width half-maximum values, as compared to an average FWHM value, is:
  less than or equal to approximately 110 percent of the average FWHM value; and
  greater than or equal to approximately 90 percent of the average FWHM value.

24. The optical filter of claim 22,
wherein the first endpoint is approximately 25 degrees and the second endpoint is approximately 50 degrees.

25. The optical filter of claim 23,
wherein the first endpoint is approximately 30 degrees and the second endpoint is approximately 50 degrees.

26. The optical filter of claim 19,
wherein the set of non-normal angle-of-incidence values includes angle-of-incidence values between approximately 10 degrees and approximately 60 degrees.

27. A method of making an optical filter configured to provide a wavelength-tunable pass-band to incident s-polarized electromagnetic radiation, the method comprising:
  depositing a first stack of layers on a structure, the first stack of layers comprising a plurality of quarter-wave layers and at least two half-wave cavity layers; and
  depositing a second stack of layers;
  wherein an optical thickness value of each quarter-wave layer in the plurality of quarter-wave layers is approximately an odd-integer multiple of one-fourth of a first wavelength value;
  wherein an optical thickness value of each half-wave cavity layer in the at least two half-wave cavity layers is approximately an integer multiple of one-half of the first wavelength value;
  wherein the first stack of layers is configured to provide a cut-on edge for s-polarized radiation incident on the first stack of layers at a second wavelength value, the second wavelength value being a function of angle-of-incidence for a set of non-normal angle-of-incidence values;
  wherein the first stack of layers is configured to provide a cut-off edge for s-polarized radiation incident on the first stack of layers at a third wavelength value, the third wavelength value being a function of angle-of-incidence for the set of non-normal angle-of-incidence values;
  wherein the third wavelength value is greater than the second wavelength value at the set of non-normal angle-of-incidence values;
  wherein the second stack of layers is configured to provide a cut-off edge for s-polarized radiation incident on the second stack of layers at a fourth wavelength value, the fourth wavelength value being a function of angle-of-incidence for the set of non-normal angle-of-incidence values;
  wherein the fourth wavelength value lies substantially between the second wavelength value and the third wavelength value at the set of non-normal angle-of-incidence values;
  wherein a pass-band determined by the second wavelength value and the fourth wavelength value has a set of associated full-width half-maximum values as a function of angle-of-incidence for the set of non-normal angle-of-incidence values, the set of associated full-width half-maximum values substantially defining at least one of: a FWHM curve as a function of angle-of-incidence and a FWHM line as a function of angle-of-incidence; and
  wherein the at least one of a FWHM curve and a FWHM line define a first derivative with respect to angle-of-incidence values at at least one angle-of-incidence value of the set of non-normal angle-of-incidence values that is at least one of:
  substantially positive and substantially zero.

28. The method of claim 27,
wherein the pass-band is configured to provide at least 80 percent transmission of incident s-polarized electromagnetic radiation for at least 90 percent of wavelength values between the second wavelength value and the fourth wavelength value at each angle-of-incidence value in the set of non-normal angle-of-incidence values.

29. The method of claim 27,
wherein the second stack of layers comprises a plurality of mismatched layer pairs;
wherein an optical thickness value of each mismatched layer pair in the plurality of mismatched layer pairs is approximately one-half of a fifth wavelength value;
wherein each mismatched layer pair in the plurality of mismatched layer pairs comprises a first material layer adjacent to a second material layer; and
wherein an optical thickness value of each first material layer in each mismatched layer pair of the plurality of mismatched layer pairs is different from substantially an odd-integer multiple of one-fourth of the fifth wavelength value.

30. The method of claim 27,
wherein the second stack of layers comprises a second plurality of quarter-wave layers and at least two other half-wave cavity layers;
wherein an optical thickness value of each quarter-wave layer in the second stack of layers is approximately an odd-integer multiple of one-fourth of a fifth wavelength value; and
wherein an optical thickness value of each half-wave cavity layer in the second stack of layers is approximately an integer multiple of one-half of the fifth wavelength value.

31. The method of claim 27,
wherein the structure comprises at least one substrate.

32. The method of claim 27,
wherein depositing the second stack of layers comprises depositing the second stack of layers on the structure.

33. The method of claim 27,
wherein depositing the second stack of layers comprises depositing the second stack of layers on the first stack of layers.

34. The method of claim 27,
wherein the optical filter comprises a surface with a first normal vector at a first angle-of-incidence value to a first direction of incident s-polarized electromagnetic radiation;
wherein the surface is configured to be flush with a medium for transmitting the incident s-polarized electromagnetic radiation, the medium configured to exhibit an index of refraction substantially different from approximately 1; and
wherein the set of non-normal angle-of-incidence values includes the first angle-of-incidence value.

35. The method of claim 27,
wherein the first stack of layers comprises a first plurality of alternating first and second material layers;
wherein the second stack of layers comprises a second plurality of alternating first and second material layers;
wherein each first material layer in the first plurality of alternating first and second material layers and each first material layer in the second plurality of alternating first and second material layers has a first refractive index value with at least a real first refractive index value that is substantially constant over a wavelength range.

36. The method of claim 35,
wherein each second material layer in the first plurality of alternating first and second material layers and each second material layer in the second plurality of alternating first and second material layers has a second refractive index value with at least a real second refractive index value that is substantially constant over the wavelength range; and
wherein the real second refractive index value is different from the real first refractive index value.

37. The method of claim 27,
wherein the first stack of layers is a multi-cavity band-pass filter.

38. The method of claim 27,
wherein the second stack of layers comprises one other filter, the one other filter comprising at least one of: a short-wave pass filter and at least one other multi-cavity band-pass filter.

39. The method of claim 27,
wherein the set of non-normal angle-of-incidence values includes angle-of-incidence values between approximately 30 degrees and approximately 50 degrees.

40. The method of claim 27,
wherein the set of non-normal angle-of-incidence values includes angle-of-incidence values between approximately 25 degrees and approximately 50 degrees.

41. The method of claim 27,
wherein the at least one of a FWHM curve and a FWHM line define a second derivative with respect to angle-of-incidence values that is substantially zero at at least one angle-of-incidence value of the set of non-normal angle-of-incidence values.

42. The method of claim 27,
wherein each full-width half-maximum value in the set of associated full-width half-maximum values, as compared to an average FWHM value, is:
less than or equal to approximately 120 percent of the average FWHM value; and
greater than or equal to approximately 80 percent of the average FWHM value;
wherein the at least one of a FWHM curve and a FWHM line defines a first endpoint and a second endpoint, the first endpoint associated with a smallest angle-of-incidence value in the set of non-normal angle-of-incidence values and the second endpoint associated with a largest angle-of-incidence value in the set of non-normal angle-of-incidence values; and
wherein the average FWHM value is substantially equal to an average value of the at least one of a FWHM curve and a FWHM line between the first endpoint and the second endpoint.

43. The method of claim 42,
wherein each full-width half-maximum value in the set of associated full-width half-maximum values, as compared to the average FWHM value, is:
less than or equal to approximately 110 percent of the average FWHM value; and
greater than or equal to approximately 90 percent of the average FWHM value.

44. The method of claim 27, comprising:
depositing a third stack of layers;
wherein the third stack of layers comprises a shifted a multi-cavity band-pass filter; and
wherein the shifted multi-cavity band-pass filter is configured to provide extended blocking of s-polarized radiation incident on the first stack of layers at wavelength values less than the second wavelength value, and is further configured to provide extended blocking of s-polarized radiation incident on the first stack of layers at wavelength values greater than the third wavelength value.

45. The method of claim 27, comprising:
depositing a third stack of layers;
wherein the third stack of layers comprises a plurality of long-wave-pass extended blocking layers; and
wherein the plurality of long-wave-pass extended blocking layers are configured to provide extended blocking of s-polarized radiation incident on the first stack of layers at wavelength values less than the second wavelength value.

46. The method of claim 27, comprising:
depositing a third stack of layers;
wherein the third stack of layers comprises a plurality of short-wave-pass extended blocking layers; and
wherein the plurality of short-wave-pass extended blocking layers are configured to provide extended blocking of s-polarized radiation incident on the first stack of layers at wavelength values greater than the third wavelength value.

47. A method of making an optical filter comprising:
depositing a first stack of layers on a structure, the first stack of layers comprising a multi-cavity band-pass filter; and
depositing a second stack of layers, the second stack of layers comprising at least one other filter;
wherein the optical filter comprises a surface with a normal vector at an angle-of-incidence value to a direction of incident s-polarized electromagnetic radiation;
wherein the multi-cavity band-pass filter is configured to provide a tunable cut-on edge for s-polarized radiation at a first wavelength value as a function of the angle-of-incidence value;
wherein the multi-cavity band-pass filter is configured to provide a tunable cut-off edge for s-polarized radiation at a second wavelength value as a function of the angle-of-incidence value, and wherein the second wavelength value is greater than the first wavelength value;
wherein the at least one other filter is configured to provide a tunable cut-off edge for s-polarized radiation at a third wavelength value as a function of the angle-of-incidence value;

wherein, for a set of non-normal angle-of-incidence values, the third wavelength value lies substantially between the first wavelength value and the second wavelength value;

wherein a tunable pass-band determined by the first wavelength value and the third wavelength value has a set of associated full-width half-maximum values as a function of the angle-of-incidence value for the set of non-normal angle-of-incidence values, the set of associated full-width half-maximum values substantially defining at least one of: a FWHM curve as a function of the angle-of-incidence value and a FWHM line as a function of the angle-of-incidence value; and wherein the at least one of a FWHM curve and a FWHM line define a first derivative with respect to the angle-of-incidence value at at least one angle-of-incidence value of the set of non-normal angle-of-incidence values that is at least one of:

substantially positive and substantially zero.

48. The method of claim 47, wherein the at least one other filter comprises at least one of: a short-wave pass filter and at least one other multi-cavity band-pass filter.

49. The method of claim 48, wherein the surface is configured to be flush with a medium for transmitting the incident s-polarized electromagnetic radiation, the medium configured to exhibit an index of refraction substantially different from approximately 1.

50. The method of claim 48, wherein each full-width half-maximum value in a set of associated full-width half-maximum values, as compared to an average FWHM value, is:

less than or equal to approximately 120 percent of the average FWHM value; and greater than or equal to approximately 80 percent of the average FWHM value;

wherein the at least one of a FWHM curve and a FWHM line defines a first endpoint and a second endpoint, the first endpoint associated with a smallest angle-of-incidence value in the set of non-normal angle-of-incidence values and the second endpoint associated with a largest angle-of-incidence value in the set of non-normal angle-of-incidence values; and wherein the average FWHM value is substantially equal to an average value of the at least one of a FWHM curve and a FWHM line between the first endpoint and the second endpoint.

51. The method of claim 50, wherein each full-width half-maximum value in the set of associated full-width half-maximum values is:

less than or equal to approximately 110 percent of the average FWHM value; and greater than or equal to approximately 90 percent of the average FWHM value.

52. The method of claim 50, wherein the first endpoint is approximately 25 degrees and the second endpoint is approximately 50 degrees.

53. The method of claim 51, wherein the first endpoint is approximately 30 degrees and the second endpoint is approximately 50 degrees.

54. The method of claim 47, wherein the set of non-normal angle-of-incidence values includes angle-of-incidence values between approximately 10 degrees and approximately 60 degrees.

* * * * *